US011629291B2

(12) United States Patent
Ma et al.

(10) Patent No.: US 11,629,291 B2
(45) Date of Patent: Apr. 18, 2023

(54) LIQUID CRYSTAL COMPOSITION AND USE THEREOF

(71) Applicant: Jiangsu Hecheng Display Technology Co., Ltd., Tangzhong (CN)

(72) Inventors: Wenyang Ma, Yangzhong (CN); Liwei Wang, Yangzhong (CN); Haibin Xu, Yangzhong (CN); Wenming Han, Yangzhong (CN); Wenqi Zhang, Yangzhong (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 84 days.

(21) Appl. No.: 16/608,577

(22) PCT Filed: Jun. 28, 2018

(86) PCT No.: PCT/CN2018/093430

§ 371 (c)(1),
(2) Date: Oct. 25, 2019

(87) PCT Pub. No.: WO2019/001525

PCT Pub. Date: Jan. 3, 2019

(65) Prior Publication Data

US 2020/0339884 A1 Oct. 29, 2020

(30) Foreign Application Priority Data

Jun. 30, 2017 (CN) ........................ 201710522697.2

(51) Int. Cl.

| | |
|---|---|
| ***C09K 19/44*** | (2006.01) |
| ***C09K 19/12*** | (2006.01) |
| ***C09K 19/14*** | (2006.01) |
| ***C09K 19/20*** | (2006.01) |
| ***C09K 19/30*** | (2006.01) |
| ***C09K 19/38*** | (2006.01) |

(52) U.S. Cl.

CPC .............. *C09K 19/44* (2013.01); *C09K 19/12* (2013.01); *C09K 19/14* (2013.01); *C09K 19/20* (2013.01); *C09K 19/3003* (2013.01); *C09K 19/3028* (2013.01); *C09K 19/3066* (2013.01); *C09K 19/3809* (2013.01); *C09K 2019/122* (2013.01); *C09K 2019/123* (2013.01); *C09K 2019/2078* (2013.01); *C09K 2019/301* (2013.01); *C09K 2019/3009* (2013.01); *C09K 2019/3016* (2013.01); *C09K 2019/3021* (2013.01); *C09K 2019/3037* (2013.01); *C09K 2219/03* (2013.01)

(58) Field of Classification Search

CPC ........ C09K 19/12; C09K 19/14; C09K 19/20; C09K 19/3003; C09K 19/3028; C09K 19/3066; C09K 2019/3027

See application file for complete search history.

(56) References Cited

U.S. PATENT DOCUMENTS

| | | | | |
|---|---|---|---|---|
| 4,892,393 | A | 1/1990 | Terashima et al. | |
| 5,178,794 | A * | 1/1993 | Takatsu | C07C 43/21 252/299.6 |
| 7,169,449 | B2 | 1/2007 | Nakanishi et al. | |
| 9,212,311 | B2 | 12/2015 | Lee et al. | |
| 9,650,571 | B2 | 5/2017 | Sudo et al. | |
| 2004/0149957 | A1 * | 8/2004 | Kelly | C09K 19/3028 252/299.63 |
| 2004/0206933 | A1 * | 10/2004 | Goodby | C09K 19/3001 252/299.01 |
| 2009/0103011 | A1 * | 4/2009 | Bernatz | C09K 19/12 252/299.61 |
| 2010/0309423 | A1 | 12/2010 | Bernatz et al. | |
| 2015/0069296 | A1 * | 3/2015 | Kuriyama | C09K 19/56 252/299.63 |

(Continued)

FOREIGN PATENT DOCUMENTS

| | | |
|---|---|---|
| CN | 1143638 A | 2/1997 |
| CN | 103361077 A | 10/2013 |

(Continued)

OTHER PUBLICATIONS

English translation of CN 108203584. (Year: 2018).*

*Primary Examiner* — Chanceity N Robinson
*Assistant Examiner* — Anna Malloy
(74) *Attorney, Agent, or Firm* — Hoffmann & Baron, LLP

(57) ABSTRACT

A liquid crystal composition contains: at least one compound of general formula I and at least one polymerizable compound of general formula II. Such a liquid crystal composition has a suitable optical anisotropy, a suitable dielectric anisotropy, and a better pretilt angle consistency while maintaining a relatively high clearing point, and the drop mura is good. When the liquid crystal composition is applied to a PSA liquid crystal display, the liquid crystal composition has an excellent display effect.

I

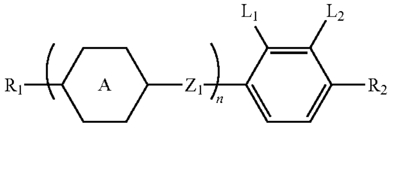

II

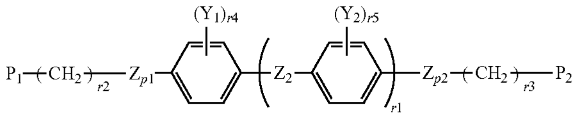

8 Claims, No Drawings

(56) References Cited

U.S. PATENT DOCUMENTS

| | | | | |
|---|---|---|---|---|
| 2015/0146155 | A1 | 5/2015 | Engel et al. | |
| 2016/0152894 | A1 * | 6/2016 | Yoon .................... | C09K 19/542 349/183 |
| 2018/0134959 | A1 * | 5/2018 | Lee .................... | C09K 19/3003 |

FOREIGN PATENT DOCUMENTS

| | | | | | |
|---|---|---|---|---|---|
| CN | 104342165 | A | | 2/2015 | |
| CN | 104364348 | A | | 2/2015 | |
| CN | 104603235 | A | | 5/2015 | |
| CN | 104726107 | A | | 6/2015 | |
| CN | 108138050 | A | | 6/2018 | |
| CN | 108203583 | A | | 6/2018 | |
| CN | 108203584 | A | * | 6/2018 | ......... C09K 19/3003 |
| CN | 101790573 | A | | 7/2020 | |
| EP | 0315455 | A2 | | 5/1989 | |
| JP | H2-172945 | A | | 7/1990 | |

* cited by examiner

LIQUID CRYSTAL COMPOSITION AND USE THEREOF

CROSS-REFERENCE TO RELATED APPLICATIONS

This application is the National Stage of International Application No. PCT/CN2018/093430, filed Jun. 28, 2018, which claims the benefit of Chinese Application No. 201710522697.2, filed Jun. 30, 2017, the contents of which is incorporated by reference herein.

TECHNICAL FIELD

The present invention relates to the field of liquid crystal material, in particular to a liquid crystal composition and uses thereof.

BACKGROUND ARTS

Liquid crystal displays (LCDs) have been rapidly developed due to their small size, light weight, low power consumption and excellent display quality, and in particular have been widely used in portable electronic information products. Based on the types of display mode, liquid crystal displays can be classified into PC (phase change), TN (twisted nematic), STN (super twisted nematic), ECB (electrically controlled birefringence), OCB (optically compensated bend), IPS (in-plane switching), FFS (fringe field switching), VA (vertical alignment), PSA (polymer stable alignment) and so forth.

In which, as for PSA mode, a small amount (e.g., 0.3 wt %, more typically <1 wt %) of one or more polymerizable compounds are added to the liquid crystal composition and, after being filled in the liquid crystal cell, polymerized or crosslinked in situ (usually by UV photopolymerization) with or without a voltage applied between the electrodes. The polymerization is carried out at a temperature at which the liquid crystal composition is in a liquid crystal phase, usually at room temperature. It has been verified that addition of a polymerizable liquid crystal compound to a liquid crystal composition is particularly suitable.

The principle of PSA is currently used in various conventional liquid crystal displays, such as the known PSA-VA, PSA-OCB, PSA-IPS, PSA-FFS, and PSA-TN displays. Like conventional liquid crystal displays, PSA displays can be operated as active matrix or passive matrix displays. Individual pixels are typically addressed by integrated non-linear active elements (such as transistors) for an active matrix display and by multiplex transmission method known in the art for passive matrix displays.

A polymerizable compound of the following formula has been used in the prior art:

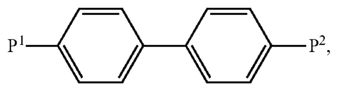

in which, P represents a polymerizable group, typically an acrylate or methacrylate group, as described in U.S. Pat. No. 7,169,449.

However, not all the combinations of liquid crystal composition and polymerizable components (reactive mesogenic, RM) are suitable for PSA displays, since, e.g., tilting cannot be established at all or sufficiently established. Furthermore, it also has been found that the current known liquid crystal compositions and RMs still have some disadvantages when used in PSA displays. Therefore, not every RM known to be soluble in liquid crystal compositions is suitable for use in PSA displays. Further, in addition to directly measuring the pretilt angle in a PSA display, it is often difficult to find a suitable selection criterion for RM. If it is desirable to carry out the polymerization via UV light without adding a photoinitiator, the selection range of a suitable RM will be smaller.

Furthermore, the selected combination of liquid crystal compositions/RMs should have the lowest possible rotational viscosity and the best possible electrical properties, especially the highest possible VHR. A high VHR after irradiation with UV light is particularly desirable for PSA displays, since UV exposure is an essential part of the display production process and is also a normal exposure during the operation of the finished displays.

It is preferred to produce a particularly small pretilt angle for PSA displays. Herein, preferred materials, during polymerization, should be able to produce a pretilt angle smaller than that of the hitherto known materials at a same exposure time, and/or still can achieve a pretilt angle, which can be obtained by known materials, at a shorter exposure time. In this way, the production time of displays can be shortened and the cost can be reduced accordingly. Since the pretilt angles produced by materials at different positions are inconsistent, the positions with large pretilt angles are more liable to leak light and the positions with smaller pretilt angles are less liable to leak light, such that there is display inconformity in liquid crystal displays, which is referred to as drop mura. Therefore, there is a need for developing LC materials with little difference in pretilt angles at different positions to solve such an issue.

SUMMARY OF THE INVENTION

Objects: In view of the deficiencies in the prior art, it is an object of the present invention to provide a liquid crystal composition having high pretilt angle consistency and good performance in drop mura, as well as a liquid crystal display device comprising the same.

Technical solutions of the present invention:

In an aspect, the present invention provides a liquid crystal composition comprising: at least one compound of general formula I

I

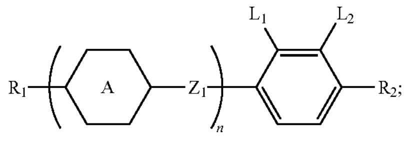

and at least one polymerizable compound of general formula II

II

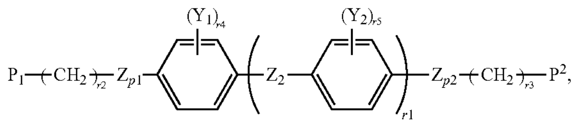

in which, $R_1$ and $R_2$ each independently represents —H, —F, $C_{1-12}$ alkyl or alkoxy, $C_{2-12}$ alkenyl or alkenoxy, —$OR_5OR_6$,

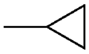,
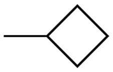 or
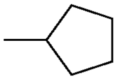, wherein one or more H on the alkyl or alkoxy and the alkenyl or alkenoxy can be substituted by F, and at least one of $R_1$ and $R_2$ is —$OR_5OR_6$;

$R_5$ and $R_6$ each independently represents $C_{1-12}$ alkyl or $C_{2-12}$ alkenyl;

$Z_1$ represents single bond, —COO—, —OCO—, —$CH_2O$—, —$OCH_2$— or —$CH_2CH_2$—;

$L_1$ and $L_2$ each independently represents —F, —Cl, —CN or —NCS;

ring

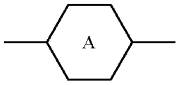

represents

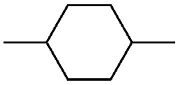 or
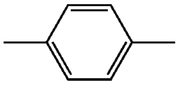, wherein one or more —$CH_2$— in

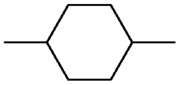

can be replaced by —O—, one or more H on

can be substituted by halogen;

n represents 0, 1, 2 or 3, and when n is 2 or 3, ring

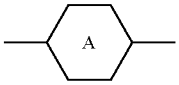

can be same or different, $Z_1$ can be same or different;

$P_1$ and $P_2$ each independently represents

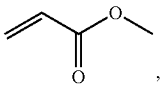,
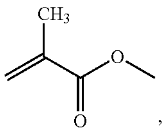,
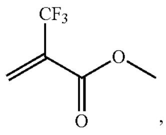,

-continued

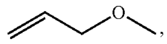,
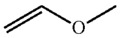,
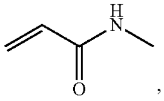,
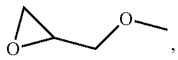,
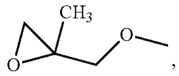,
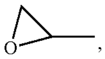,
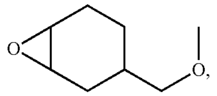
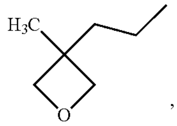,
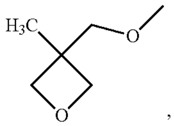,
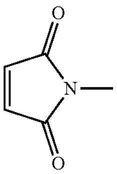

or —SH;

$r_1$ represents 1, 2 or 3;

$r_2$ and $r_3$ each independently represents a positive integer of 0~6;

$r_4$ and $r_5$ each independently represents 0, 1, 2, 3 or 4;

$Z_2$ represents single bond, —$CH_2CH_2$—, —COO—, —OCO—, —$CH_2O$—, —$OCH_2$— or —CH═CH—COO—;

$Z_{p1}$ and $Z_{p2}$ are same or different and each independently selected from a group consisting of single bond, —O—, —S—, —NH—, —NHCOO—, —OCONH—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CF═CH—, —CH═CF—, —CF═CF—, —CO—, —COO—, —OCO—, —OCOO—, —$CH_2$—, —$OCH_2$—, —$SCH_2$—, —$CH_2S$—, —CH═CH—, —C≡C—, —CH═CH—COO— and —OCO—CH═CH—;

$Y_1$ and $Y_2$ each independently represents H, halogen, $C_{1-3}$ alkyl or alkoxy.

Preferably, the compound of general formula I is selected from a group consisting of the following compounds:

I-1

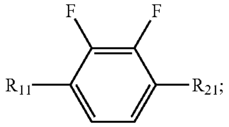

I-2

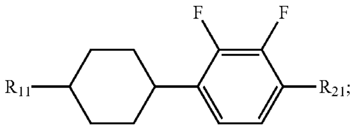

I-3

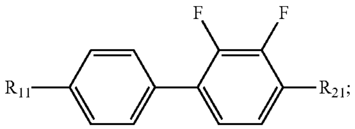

I-4

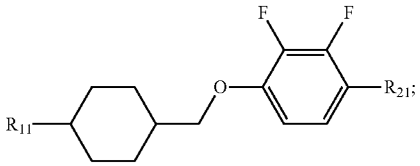

-continued

I-5

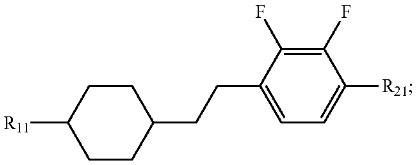

I-6

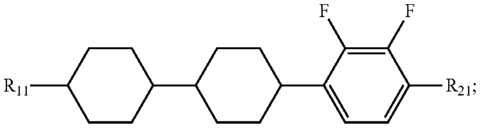

I-7

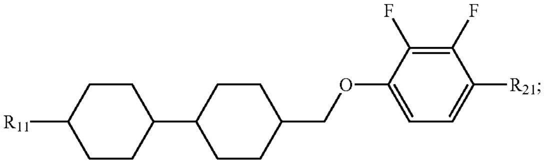

I-8

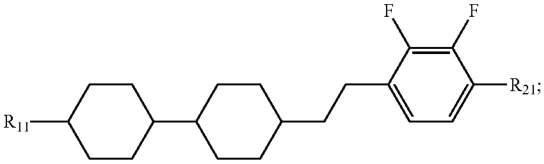

I-9

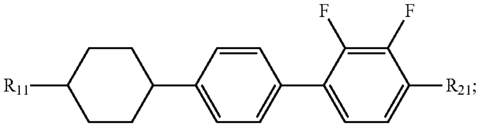

I-10

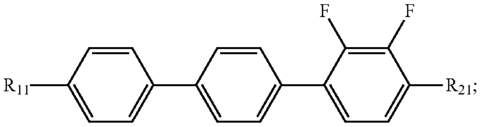

I-11

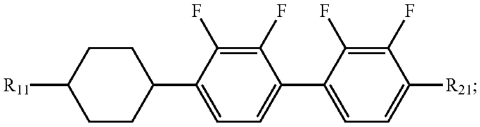

I-12

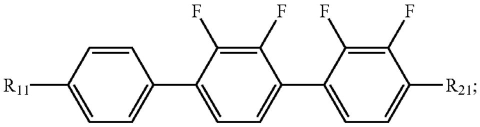

I-13

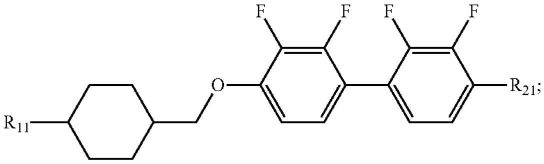

I-14

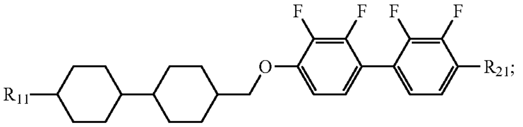

and

-continued

I-15

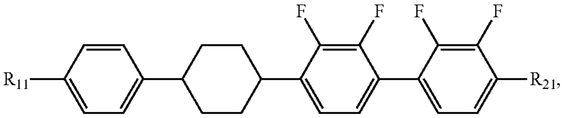

in which, $R_{11}$ and $R_{21}$ each independently represents —H, —F, $C_{1-7}$ alkyl or alkoxy, $C_{2-7}$ alkenyl or alkenoxy, $—OR_{51}OR_{61}$,

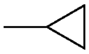 , 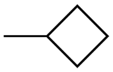 or 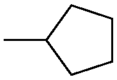 , wherein one or more H on the alkyl or alkoxy and the alkenyl or alkenoxy can be substituted by F, and at least one of $R_{11}$ and $R_{21}$ is $—OR_{51}OR_{61}$;

$R_{51}$ and $R_{61}$ each independently represents $C_{1-10}$ alkyl or $C_{2-10}$ alkenyl;

Further, the compound of general formula I-1 is selected from a group consisting of the following compounds:

I-1-1

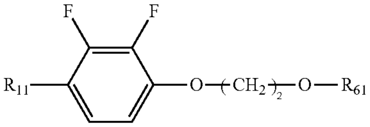

;

I-1-2

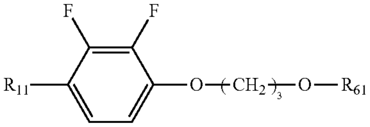

;

I-1-3

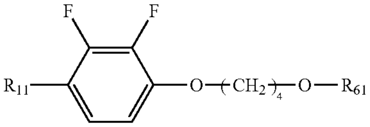

;

I-1-4

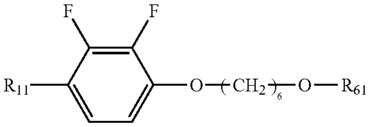

;

I-1-5

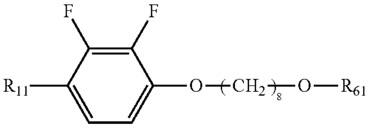

; and

I-1-6

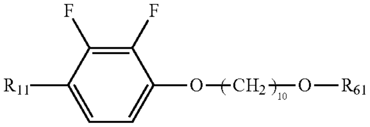

, the compound of general formula I-2 is selected from a group consisting of the following compounds:
I-2-1
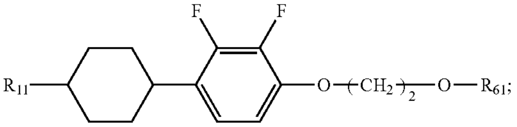
I-2-2
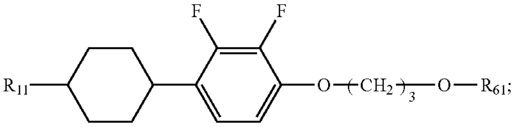
I-2-3
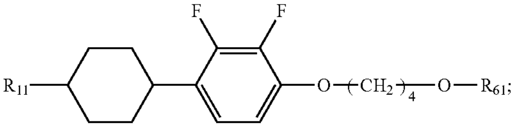
I-2-4
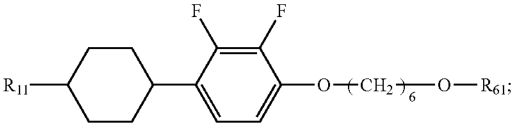
I-2-5
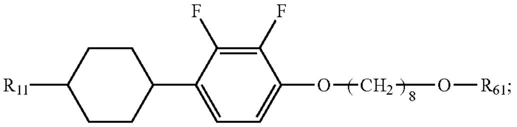
I-2-6
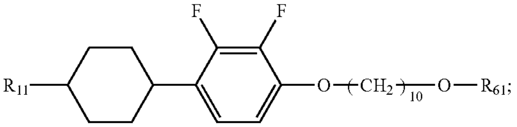
I-2-7
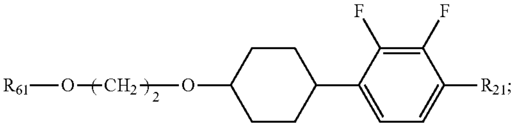
I-2-8
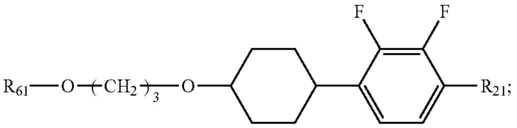
I-2-9
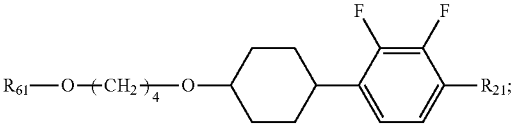
-continued
I-2-10
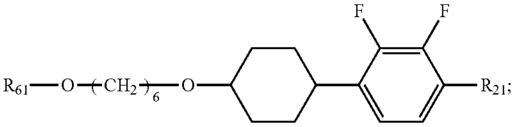
I-2-11
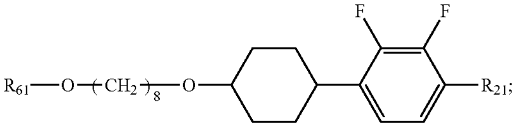
and
I-2-12
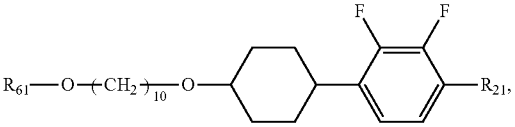
the compound of general formula I-3 is selected from a group consisting of the following compounds:
I-3-1
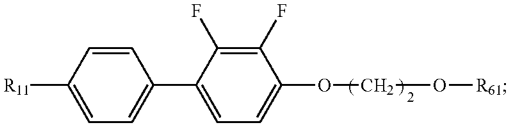
I-3-2
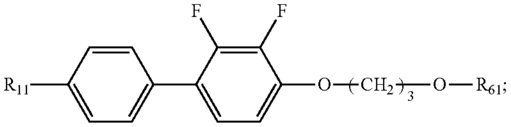
I-3-3
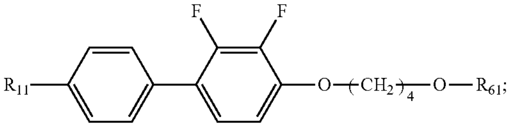
I-3-4
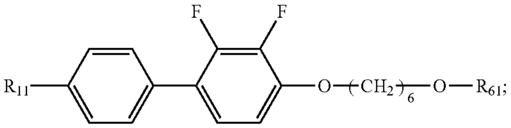
I-3-5
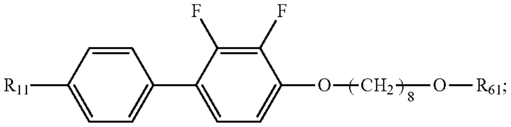
I-3-6
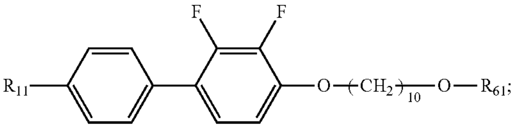

-continued
I-3-7
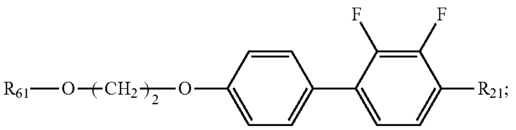
I-3-8
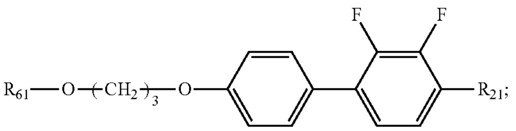
I-3-9
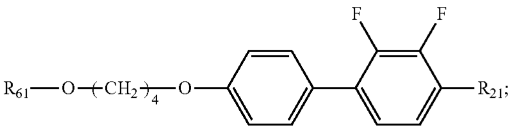
I-3-10
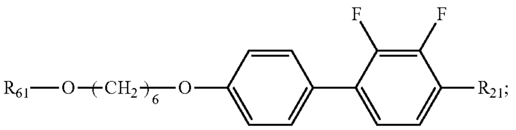
I-3-11
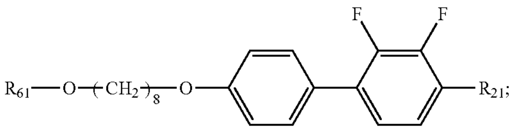
and
I-3-12
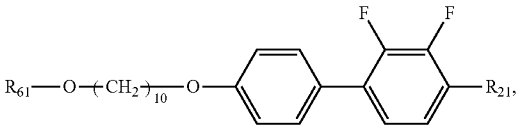
the compound of general formula I-4 is selected from a group consisting of the following compounds:
I-4-1
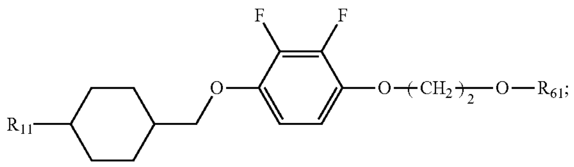
I-4-2
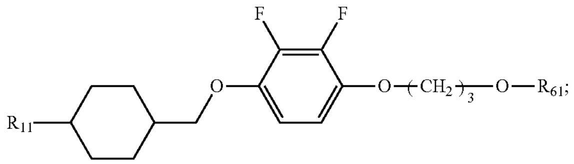
-continued
I-4-3
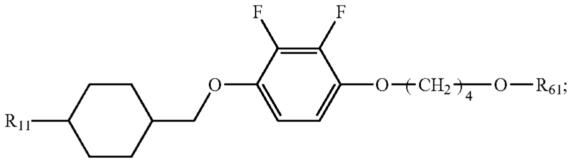
I-4-4
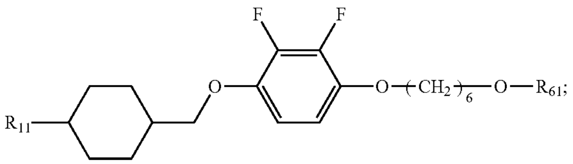
I-4-5
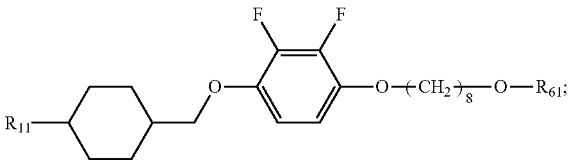
I-4-6
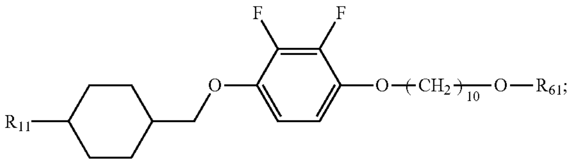
I-4-7
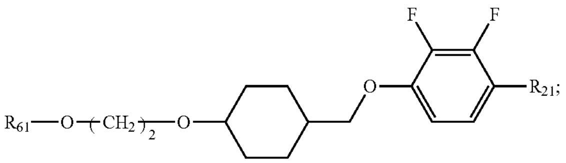
I-4-8
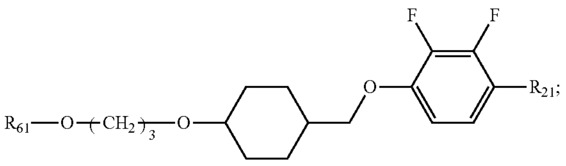
I-4-9
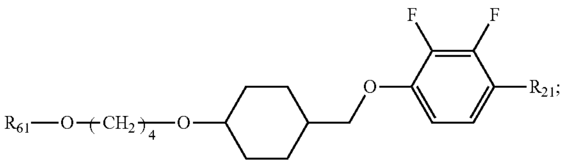
I-4-10
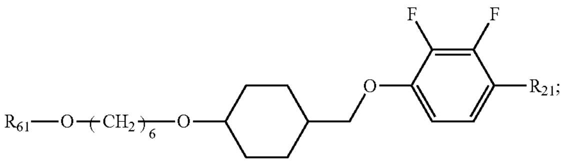

I-4-11
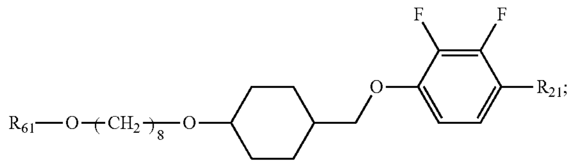
I-4-12
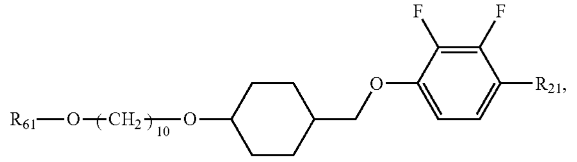
the compound of general formula I-5 is selected from a group consisting of the following compounds:
I-5-1
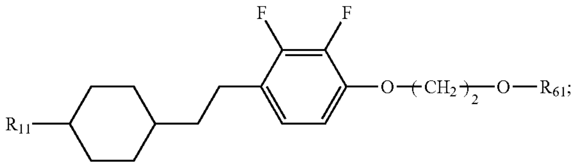
I-5-2
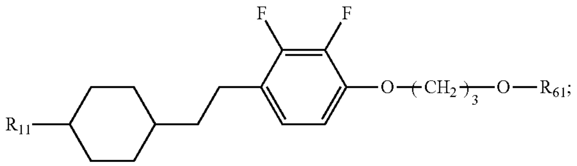
I-5-3
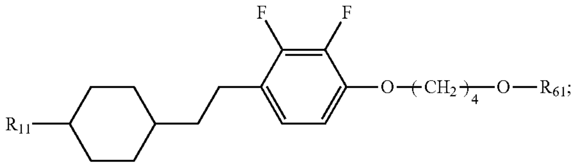
I-5-4
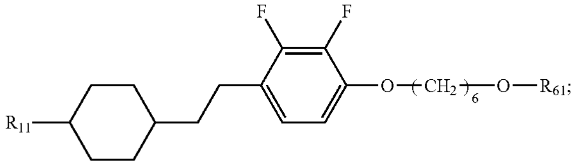
I-5-5
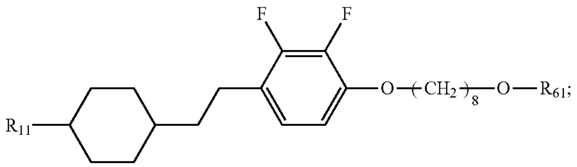
I-5-6
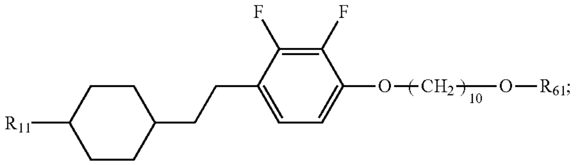
I-5-7
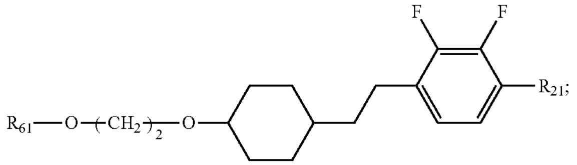
I-5-8
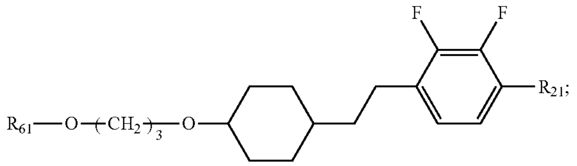
I-5-9
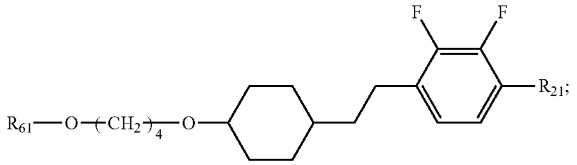
I-5-10
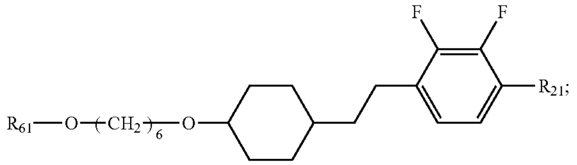
I-5-11
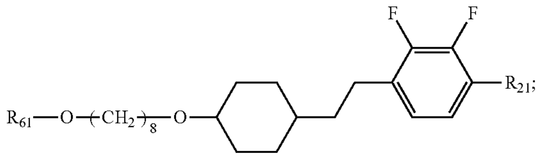
and
I-5-12
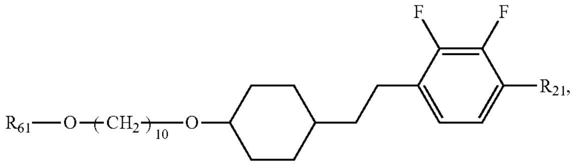
the compound of general formula I-6 is selected from a group consisting of the following compounds:
I-6-1
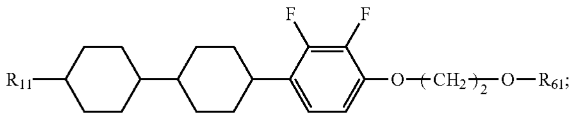

-continued
I-6-2
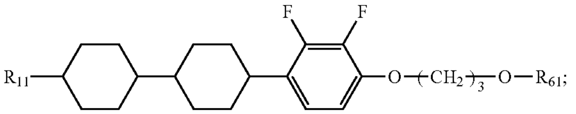
I-6-3
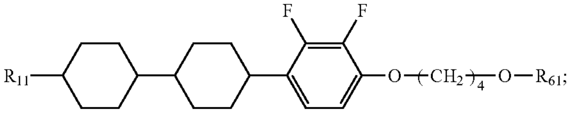
I-6-4
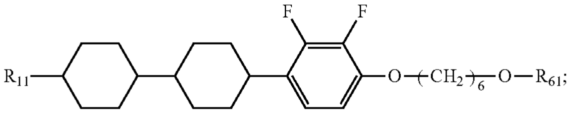
I-6-5
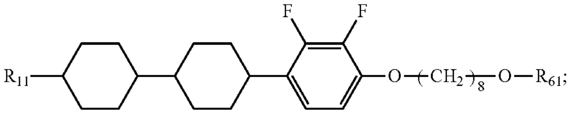
I-6-6
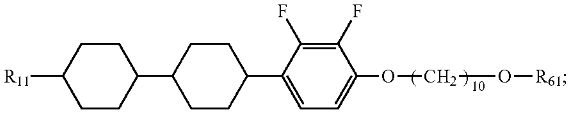
I-6-7
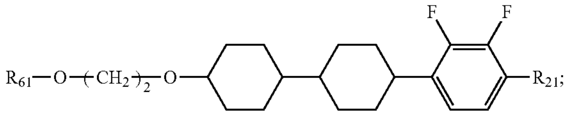
I-6-8
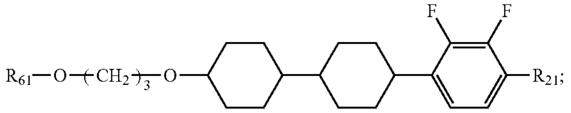
I-6-9
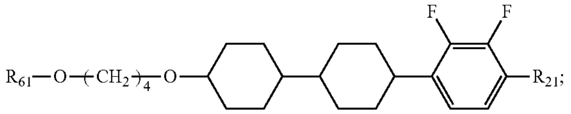
I-6-10
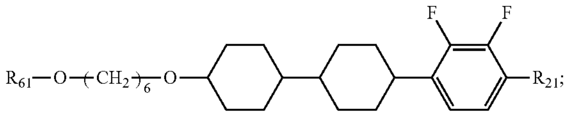
I-6-11
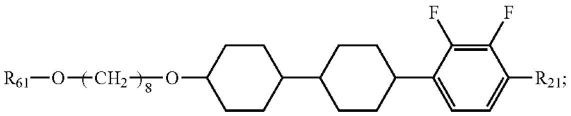
I-6-12
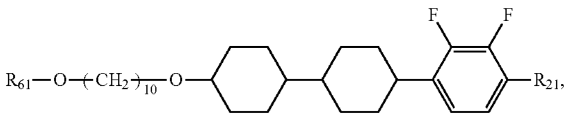
the compound of general formula I-7 is selected from a group consisting of the following compounds:
I-7-1
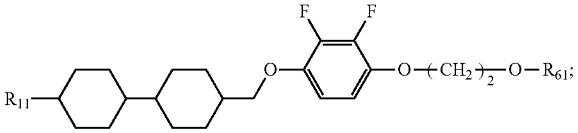
I-7-2
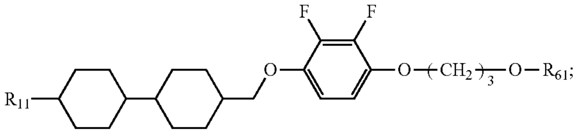
I-7-3
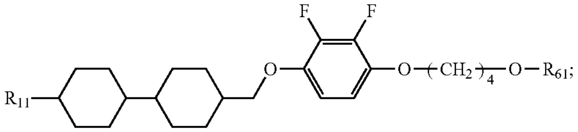
I-7-4
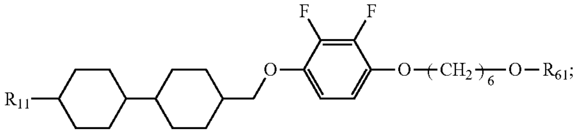
I-7-5
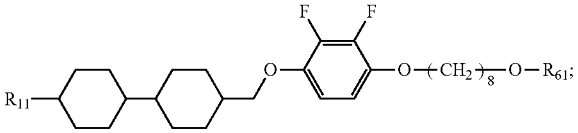
I-7-6
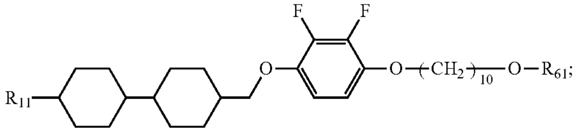
I-7-7
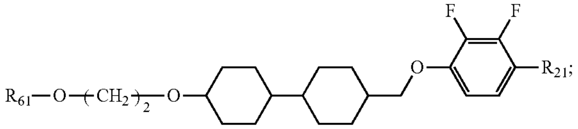
I-7-8
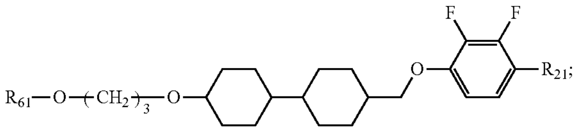
I-7-9
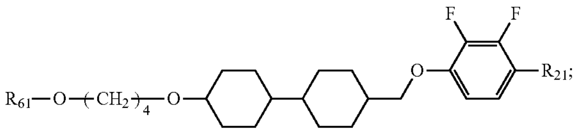

-continued
I-7-10
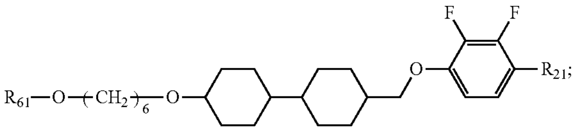
I-7-11
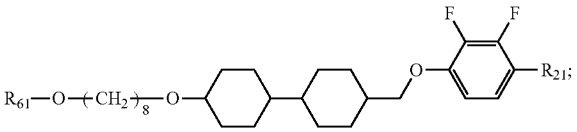
I-7-12
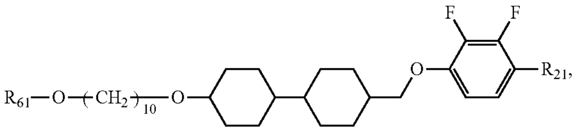
the compound of general formula I-8 is selected from a group consisting of the following compounds:
I-8-1
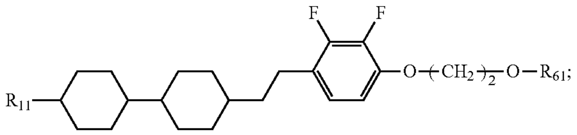
I-8-2
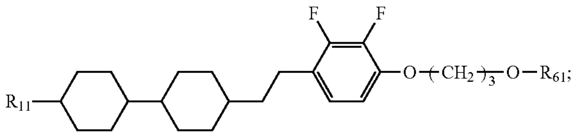
I-8-3
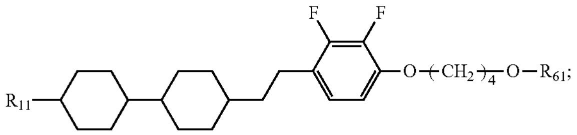
I-8-4
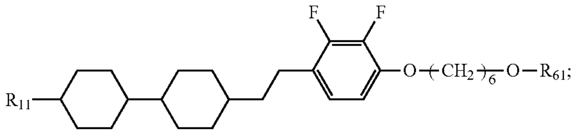
I-8-5
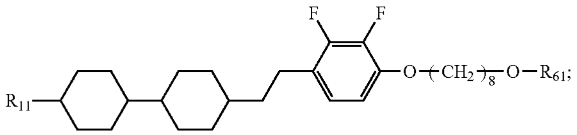
I-8-6
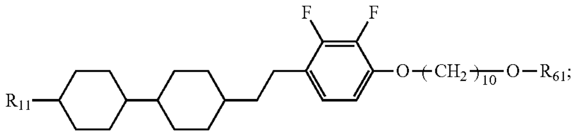
-continued
I-8-7
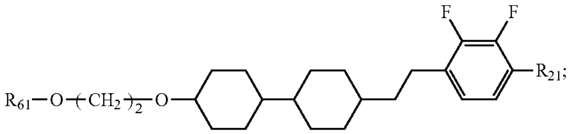
I-8-8
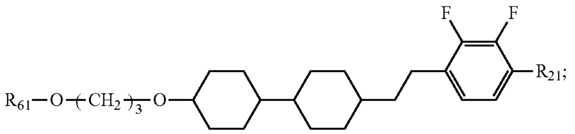
I-8-9
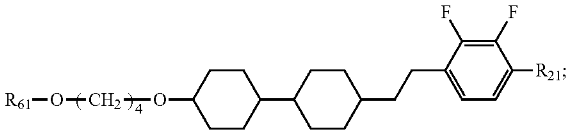
I-8-10
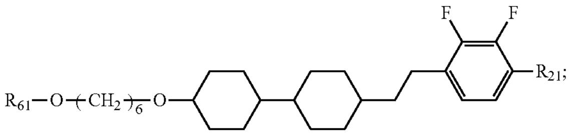
I-8-11
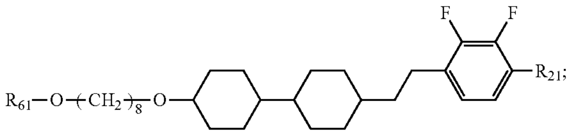
I-8-12
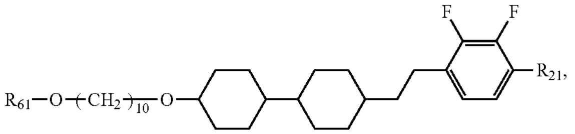
the compound of general formula I-9 is selected from a group consisting of the following compounds:
I-9-1
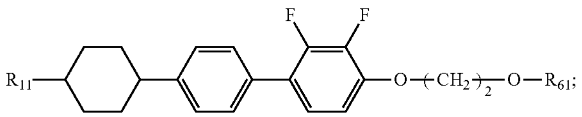
I-9-2
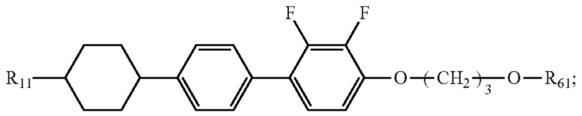
I-9-3
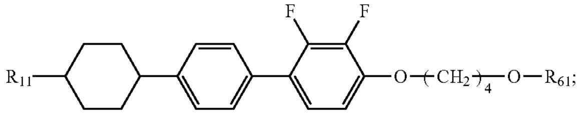

-continued
I-9-4
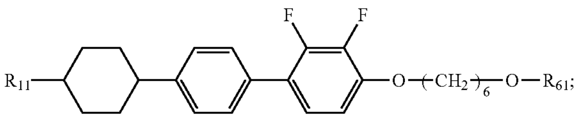
I-9-5
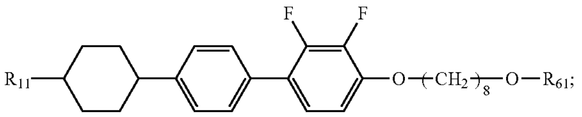
I-9-6
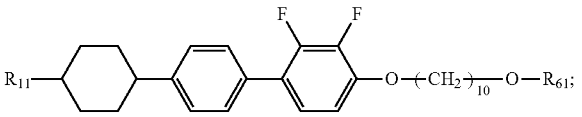
I-9-7
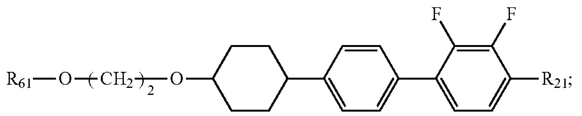
I-9-8
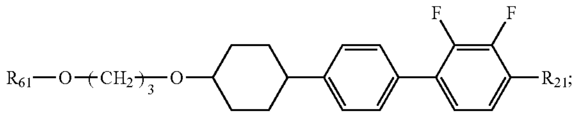
I-9-9
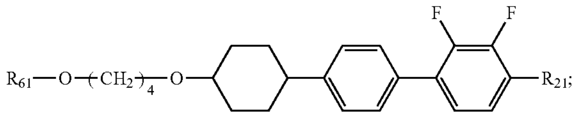
I-9-10
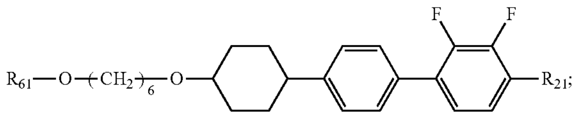
I-9-11
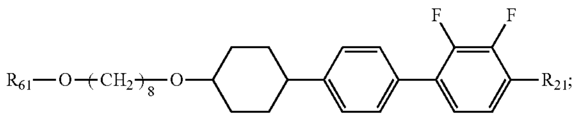
I-9-12
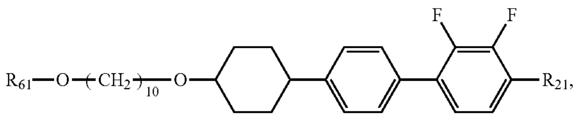
the compound of general formula I-10 is selected from a group consisting of the following compounds:
I-10-1
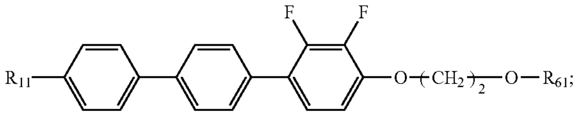
-continued
I-10-2
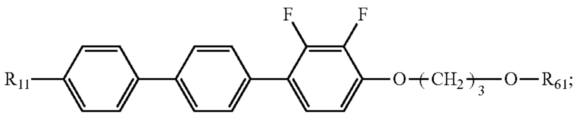
I-10-3
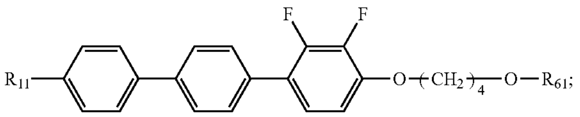
I-10-4
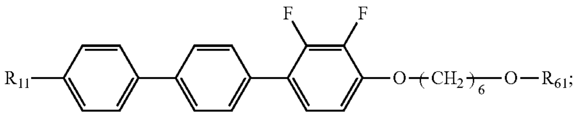
I-10-5
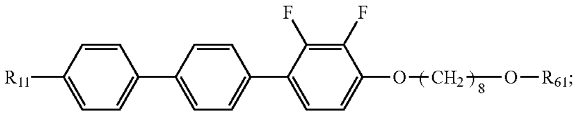
I-10-6
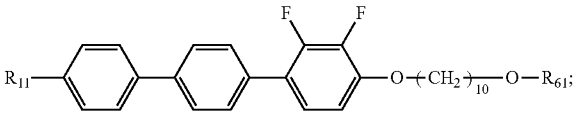
I-10-7
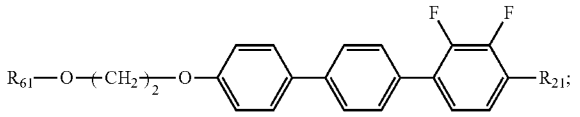
I-10-8
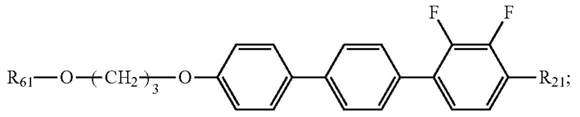
I-10-9
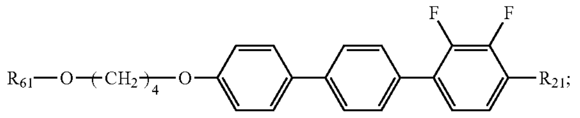
I-10-10
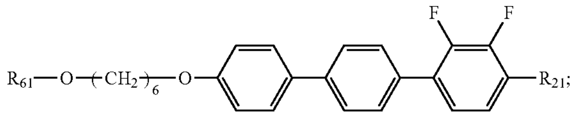
I-10-11
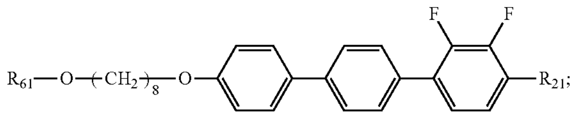
I-10-12
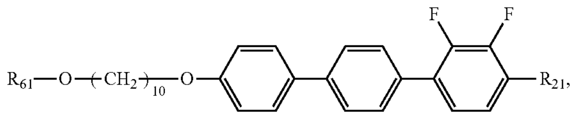

the compound of general formula I-11 is selected from a group consisting of the following compounds:
I-11-1
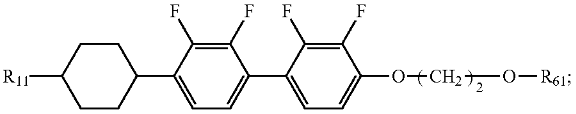
I-11-2
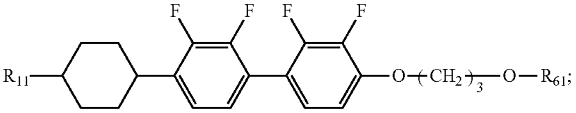
I-11-3
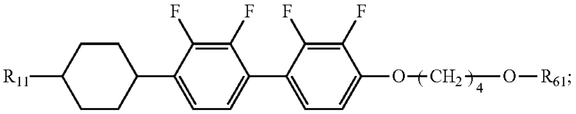
I-11-4
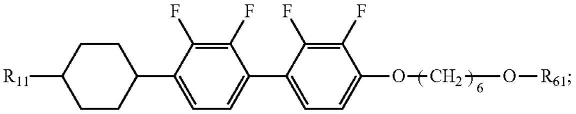
I-11-5
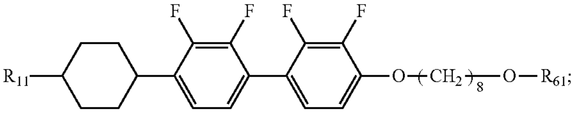
I-11-6
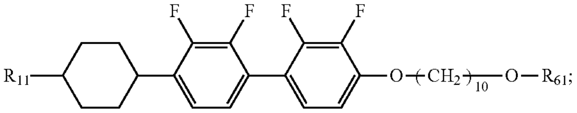
I-11-7
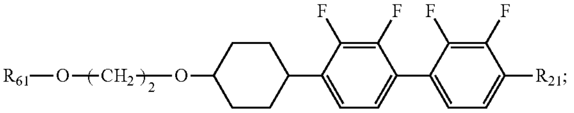
I-11-8
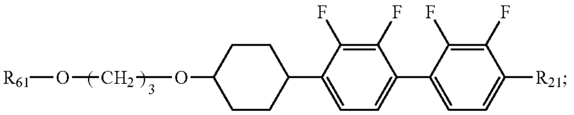
I-11-9
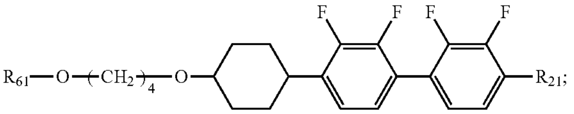
I-11-10
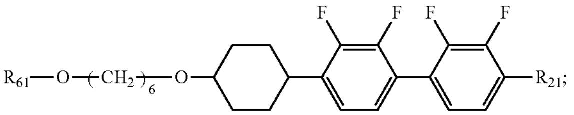
-continued
I-11-11
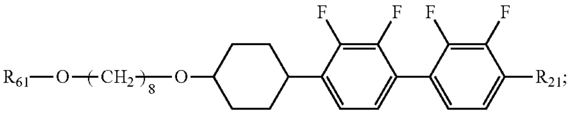
I-11-12
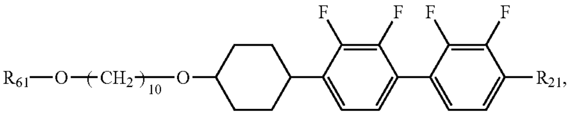
the compound of general formula I-12 is selected from a group consisting of the following compounds:
I-12-1
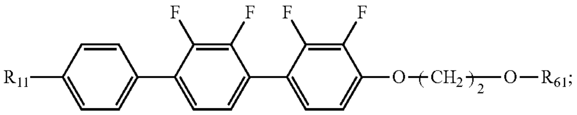
I-12-2
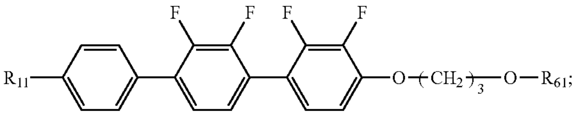
I-12-3
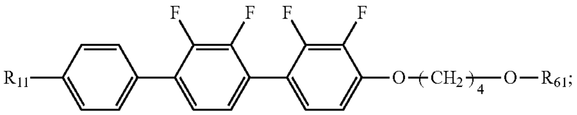
I-12-4
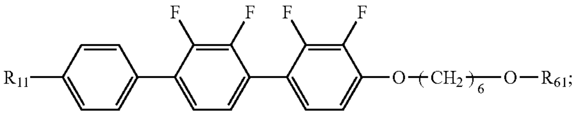
I-12-5
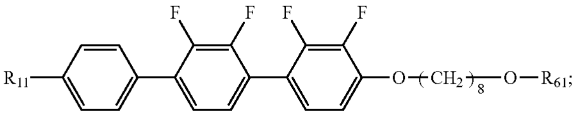
I-12-6
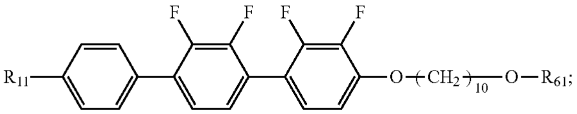
I-12-7
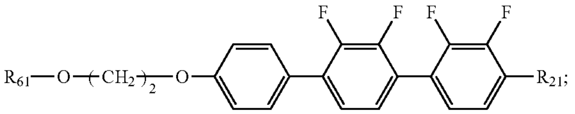
I-12-8
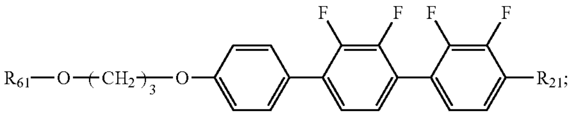

-continued
I-12-9
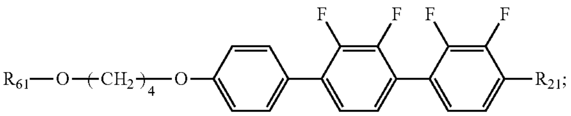
I-12-10
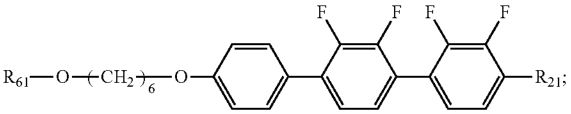
I-12-11
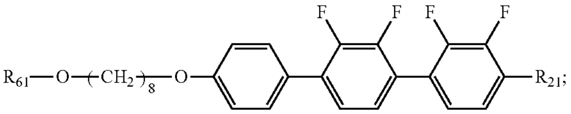
I-12-12
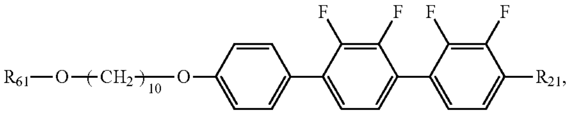
the compound of general formula I-13 is selected from a group consisting of the following compounds:
I-13-1
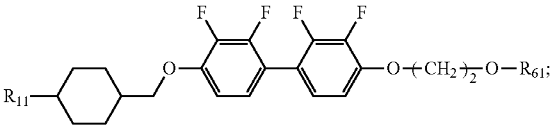
I-13-2
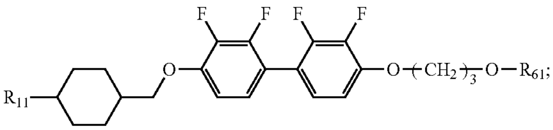
I-13-3
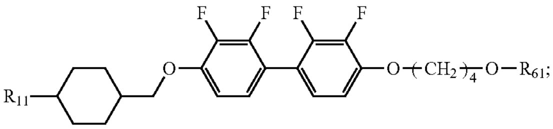
I-13-4
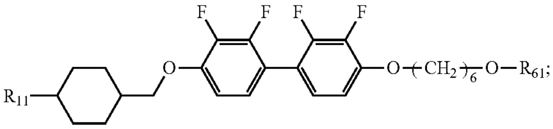
-continued
I-13-5
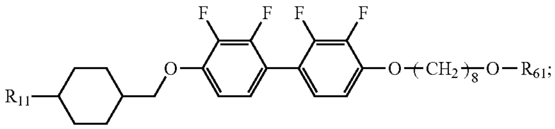
I-13-6
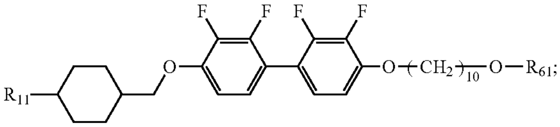
I-13-7
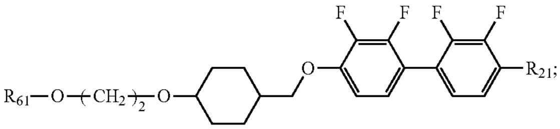
I-13-8
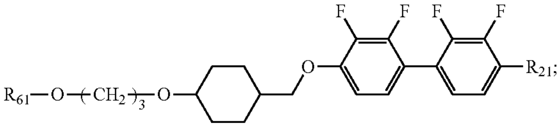
I-13-9
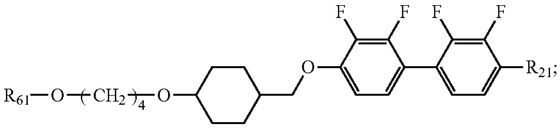
I-13-10
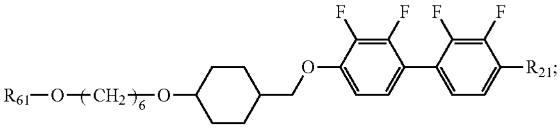
I-13-11
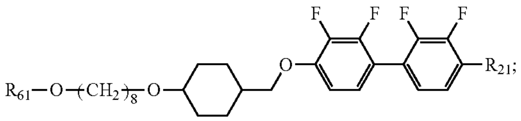
and
I-13-12
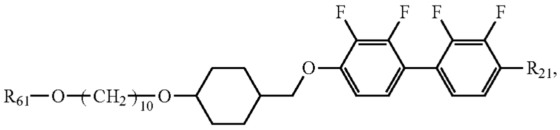
the compound of general formula I-14 is selected from a group consisting of the following compounds:
I-14-1
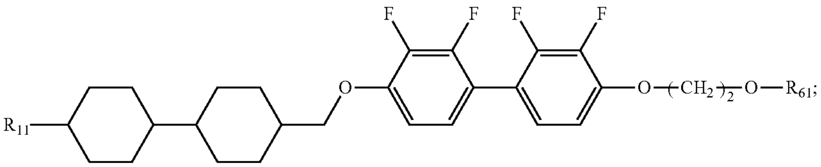

-continued
I-14-2
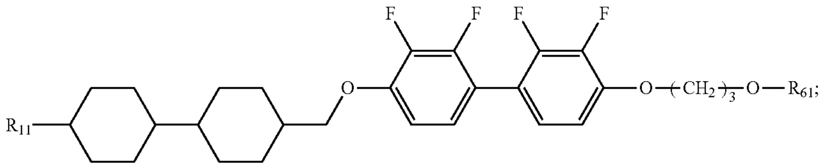
I-14-3
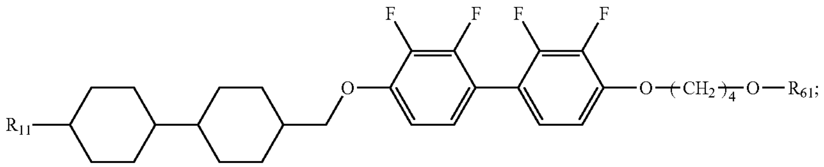
I-14-4
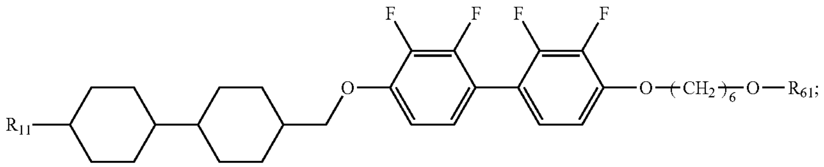
I-14-5
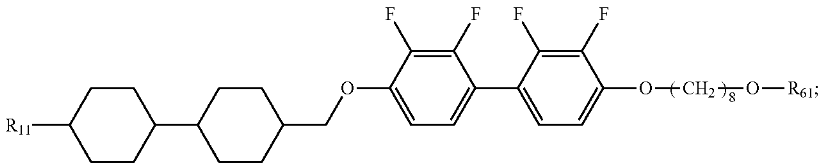
I-14-6
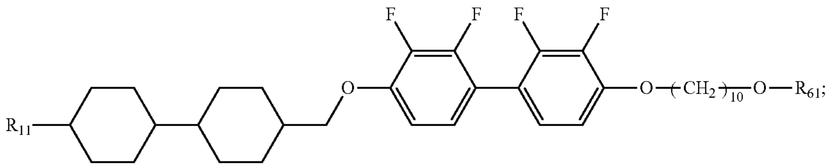
I-14-7
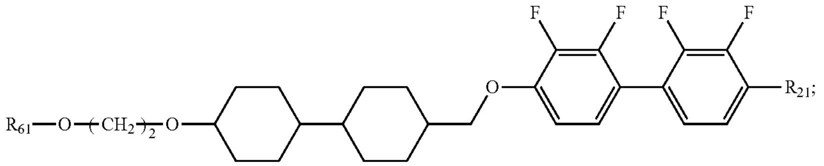
I-14-8
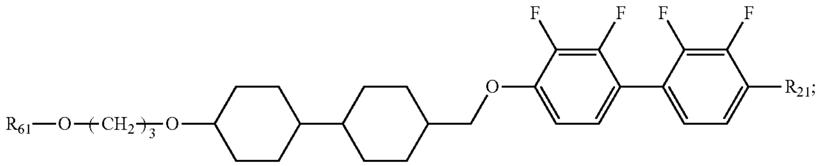
I-14-9
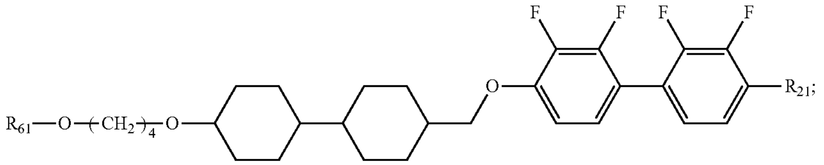
I-14-10
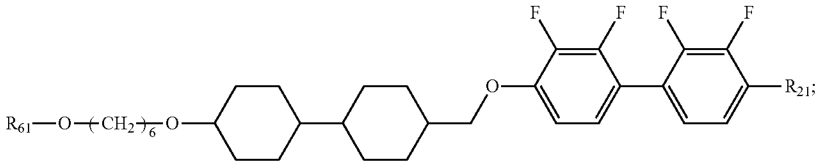

-continued
I-14-11
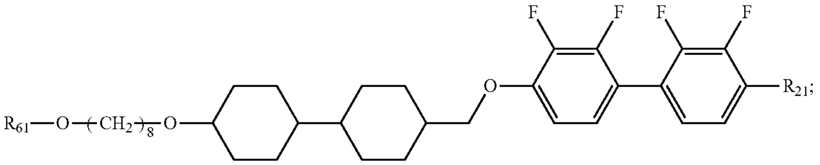
and
I-14-12
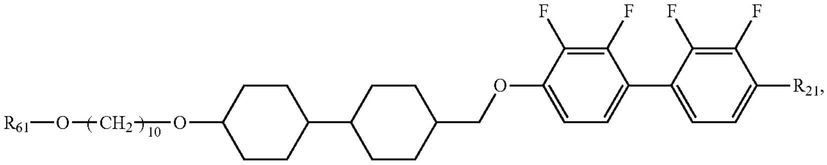
the compound of general formula I-15 is selected from a group consisting of the following compounds:
I-15-1
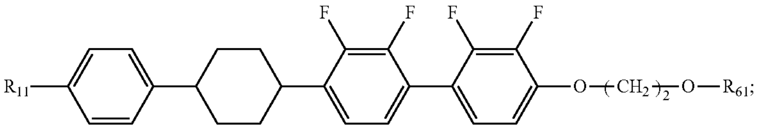
I-15-2
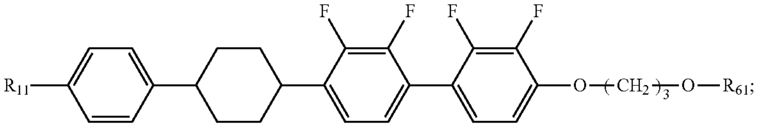
I-15-3
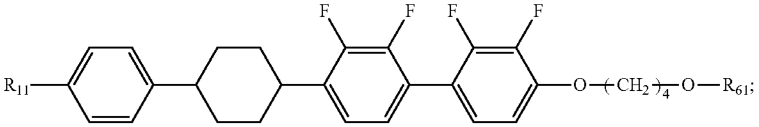
I-15-4
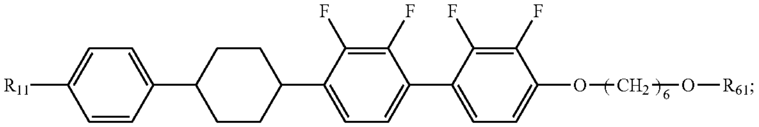
I-15-5
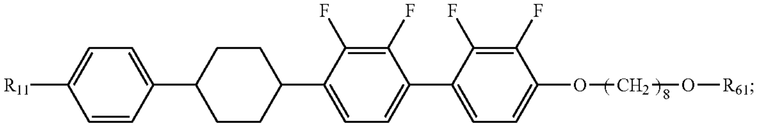
I-15-6
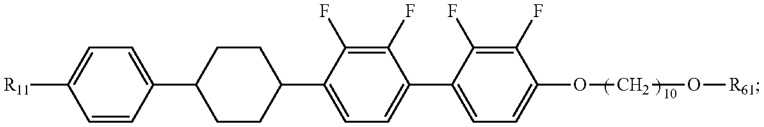
I-15-7
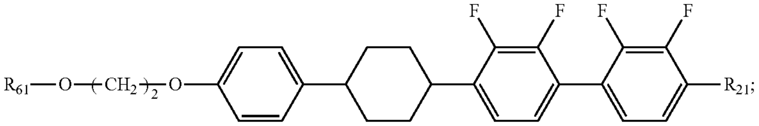
I-15-8
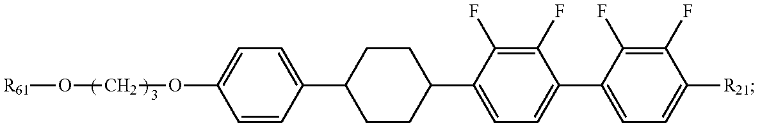

-continued
I-15-9
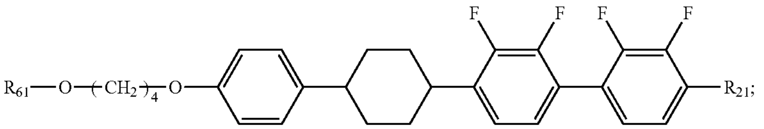
I-15-10
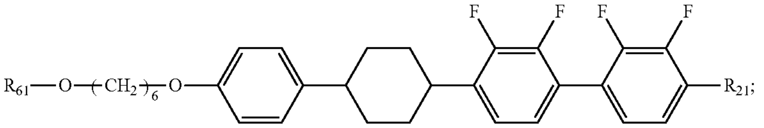
I-15-11
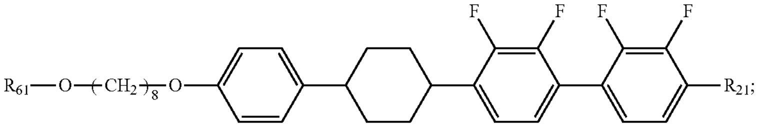
and
I-15-12
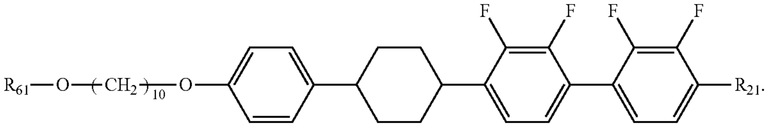
Preferably, $P_1$ and $P_2$ in the general formula II each independently represents
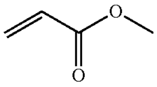
or
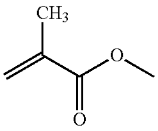
,
More preferably, the compound of general formula II is selected from a group consisting of the following compounds:
II-1
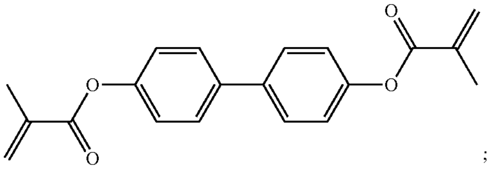
;
II-2
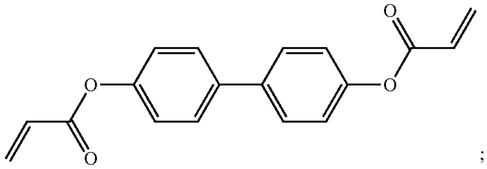
;
II-3
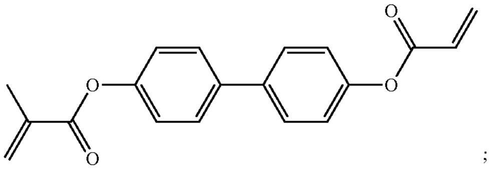
;
II-4
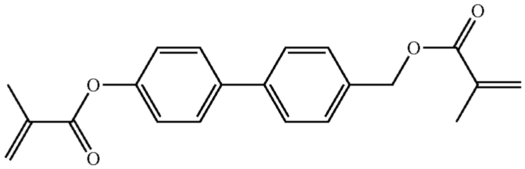
;
II-5
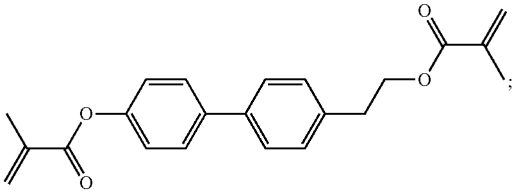
;
II-6
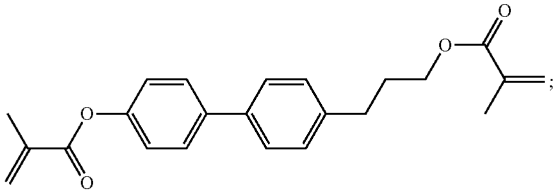
;

-continued
II-7
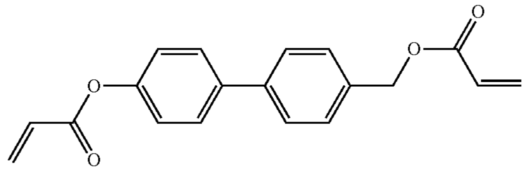
;
II-8
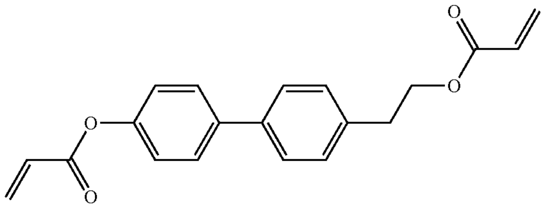
;
II-9
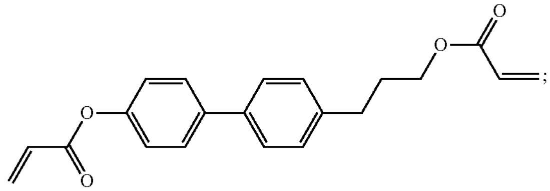
;
II-10
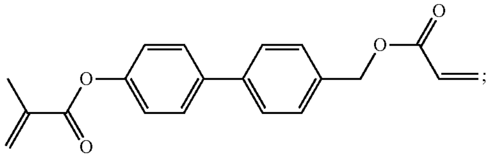
;
II-11
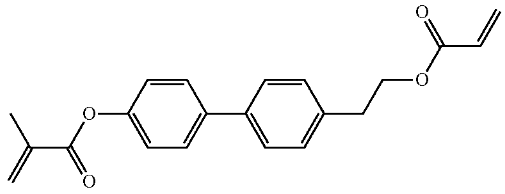
;
II-12
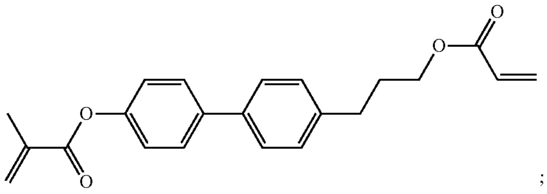
;
II-13
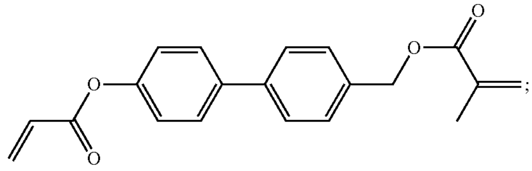
;
II-14
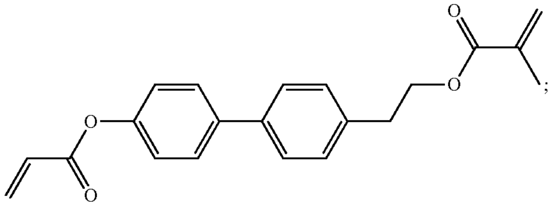
;
II-15
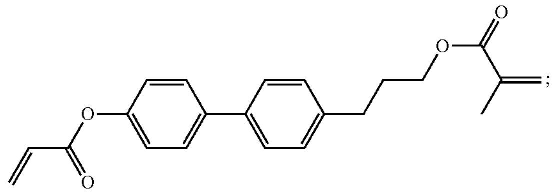
;
II-16
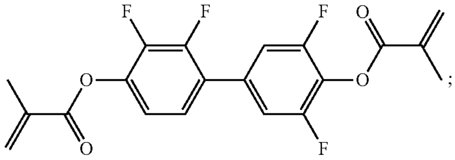
;
II-17
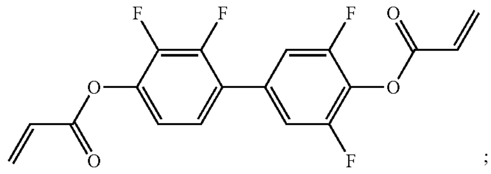
;
II-18
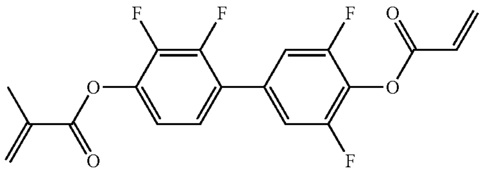
;
II-19
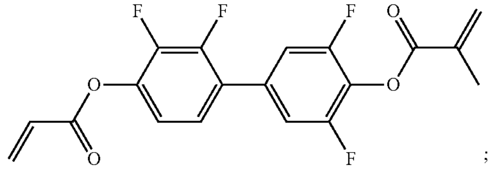
;
II-20
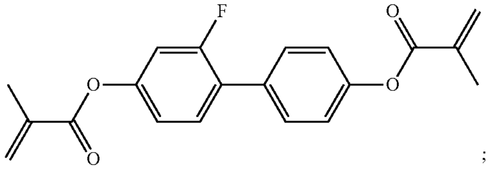
;

-continued
II-21
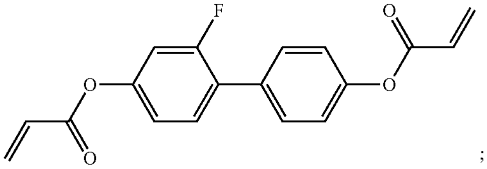
;
II-21′
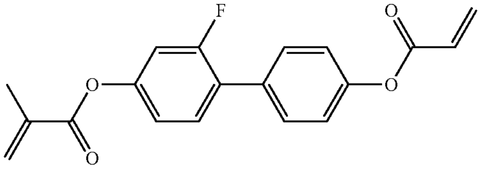
;
II-22
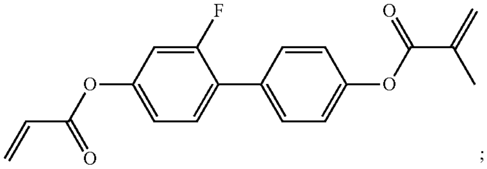
;
II-23
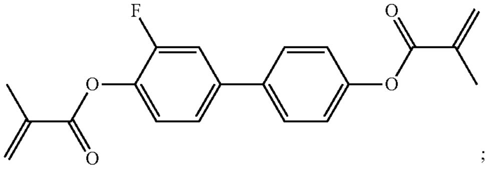
;
II-24
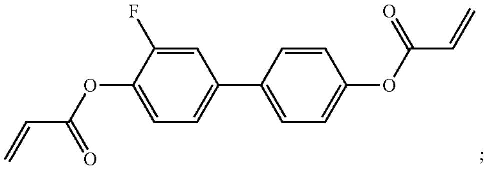
;
II-25
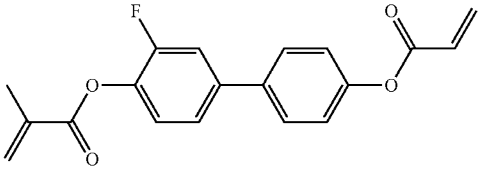
;
II-26
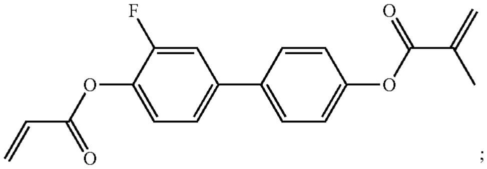
;
II-27
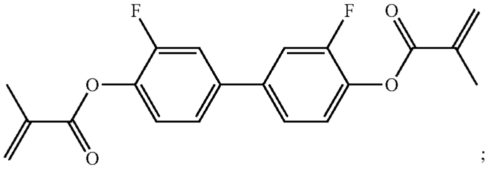
;
II-28
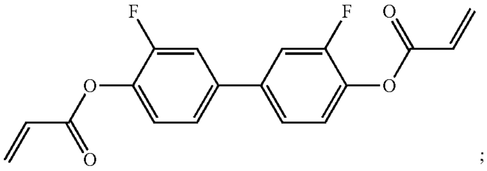
;
II-29
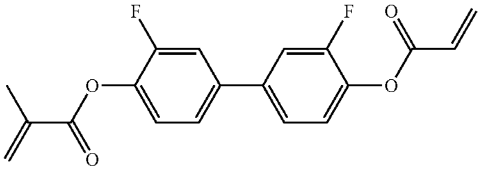
;
II-30
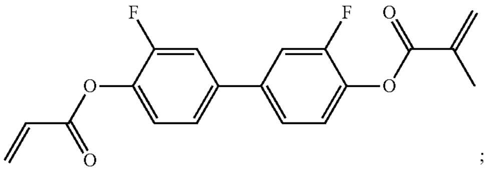
;
II-31
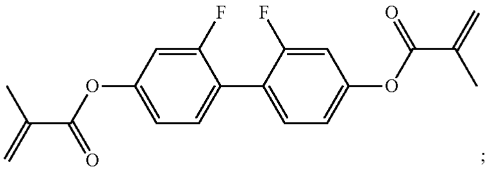
;
II-32
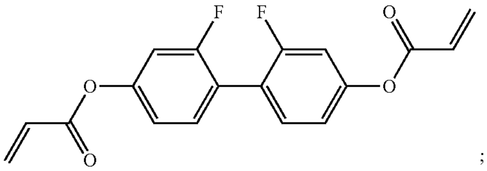
;
II-33
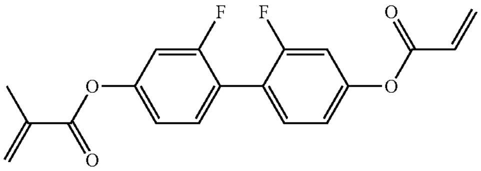
;
II-34
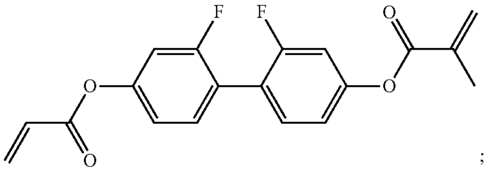
;
II-35
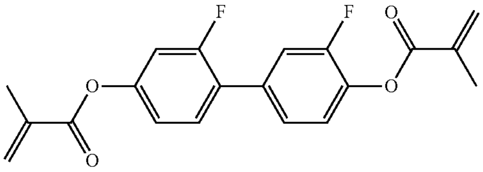
;
II-36
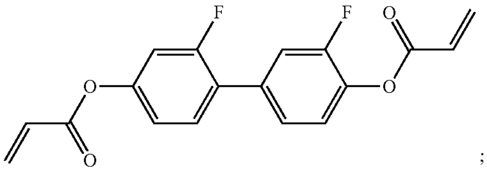
;
II-37
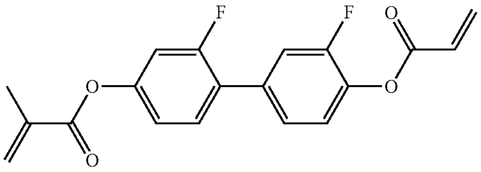
;

-continued
II-38
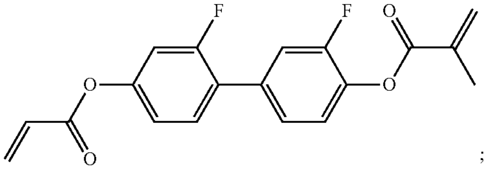
;
II-39
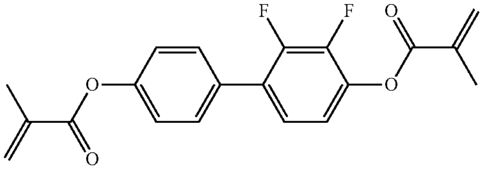
;
II-40
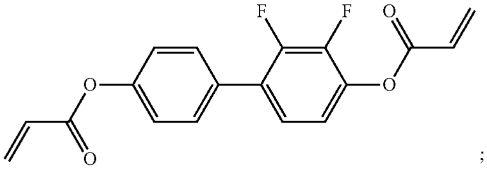
;
II-41
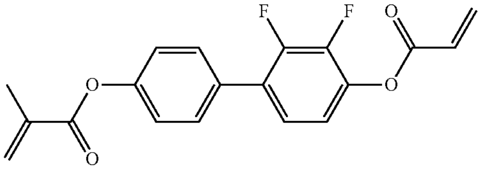
;
II-42
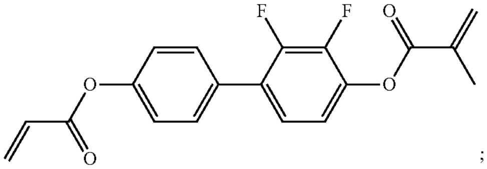
;
II-43
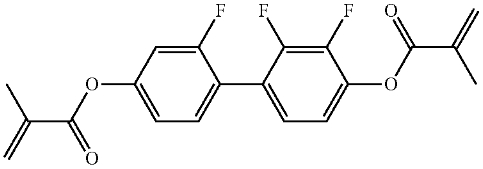
;
II-44
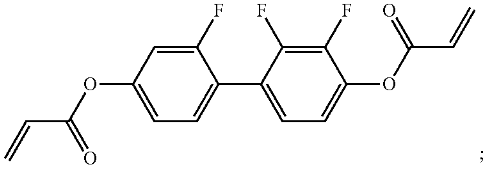
;
II-45
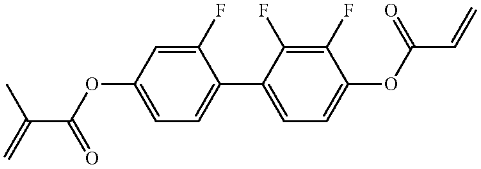
;
II-46
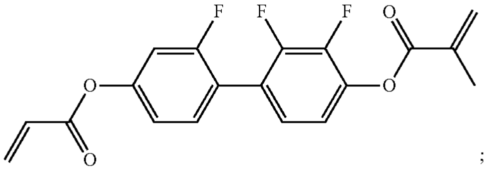
;
II-47
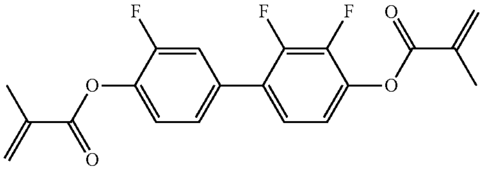
;
II-48
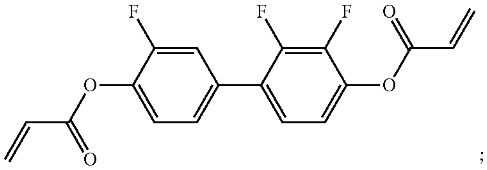
;
II-49
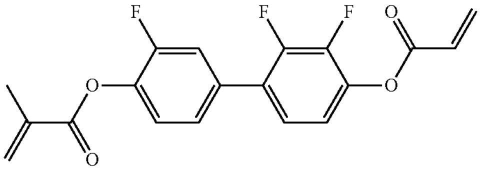
;
II-50
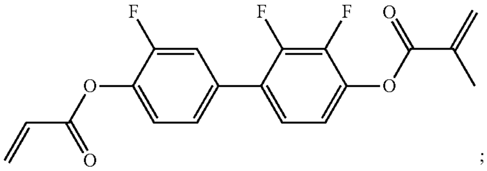
;
II-51
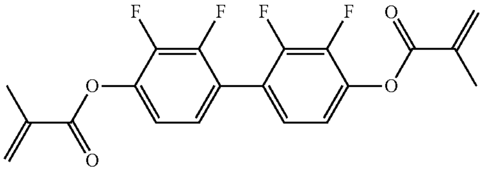
;
II-52
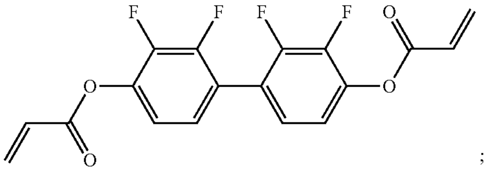
;
II-53
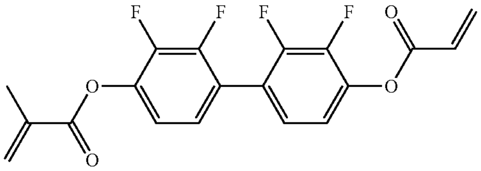
;
II-54
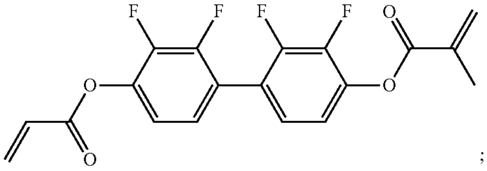
;

-continued
II-55
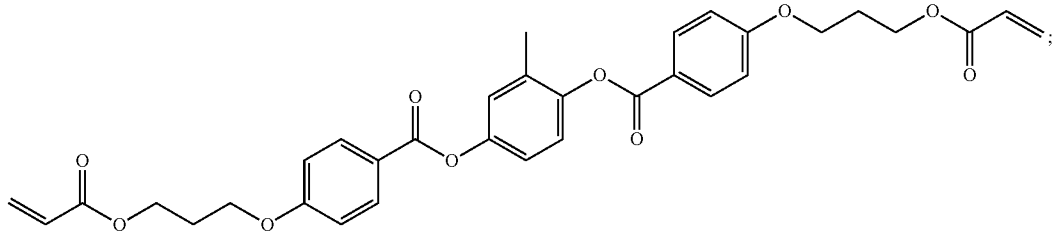
II-56
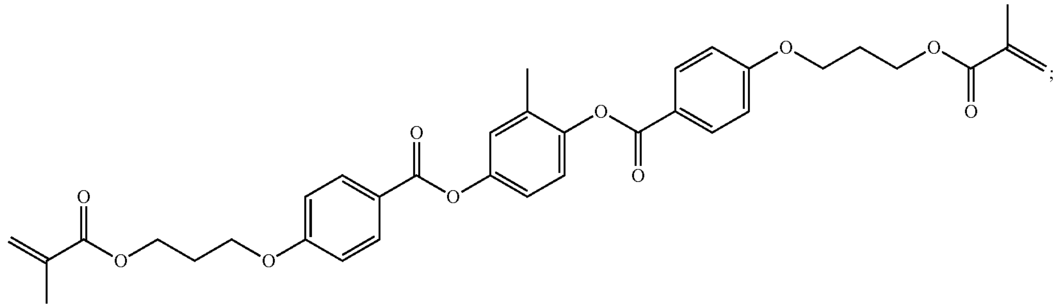
II-57
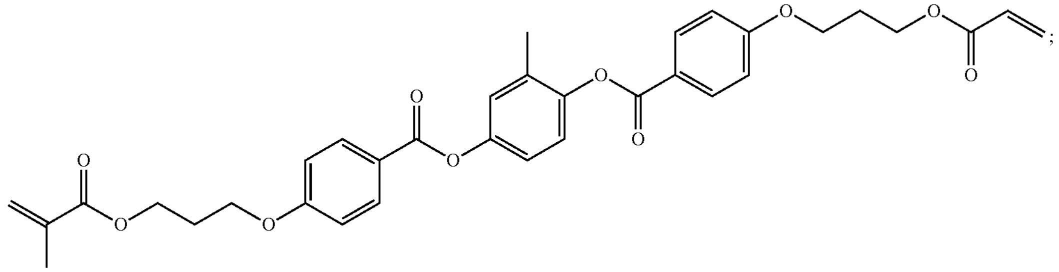
II-58
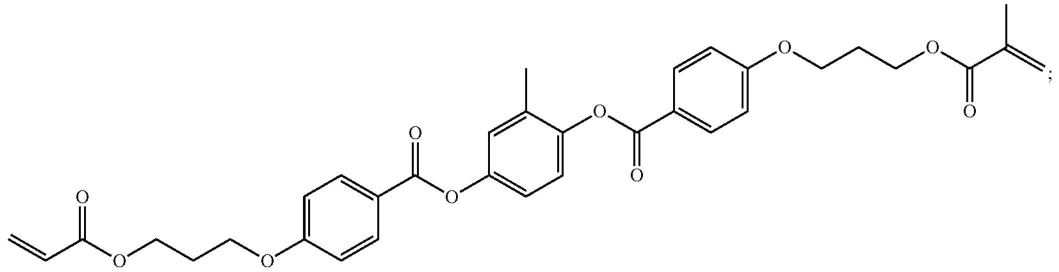
II-59
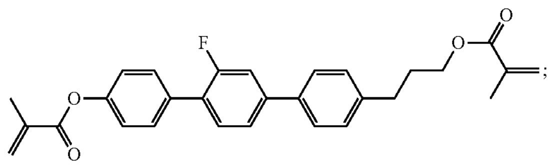
II-60
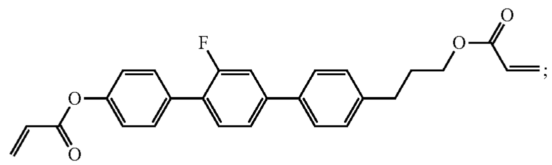
II-61
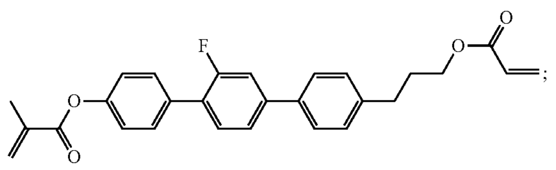
II-62
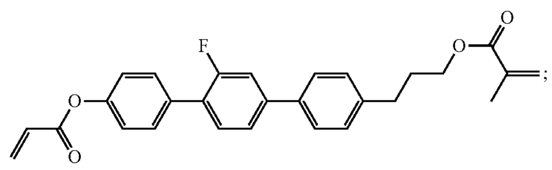

-continued

II-63

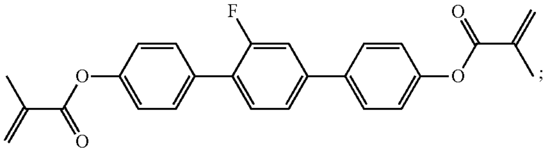

;

II-64

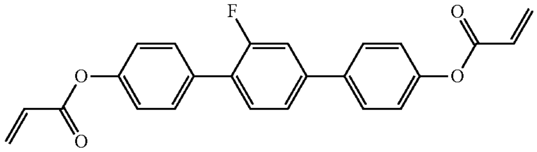

;

II-65

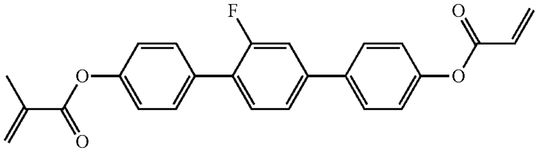

;

II-66

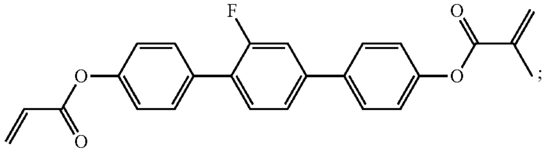

;

II-67

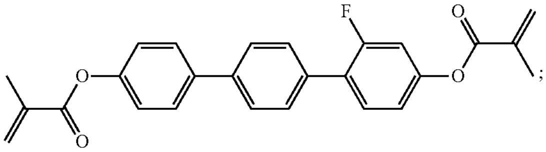

;

II-68

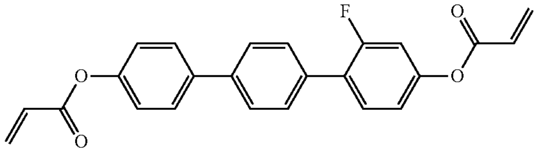

;

II-69

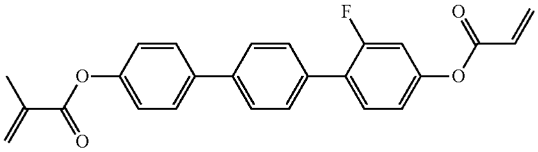

;

II-70

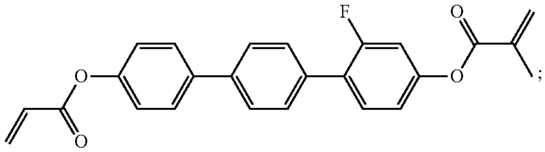

;

II-71

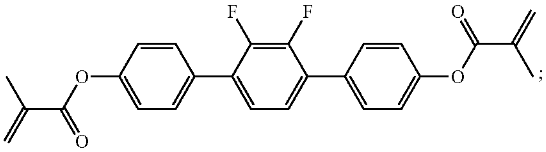

;

II-72

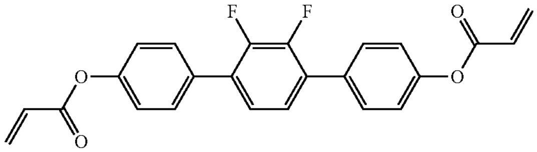

;

II-73

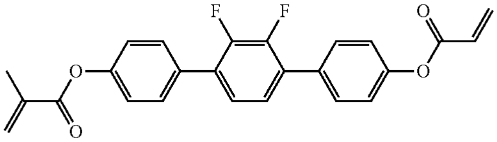

; and

II-74

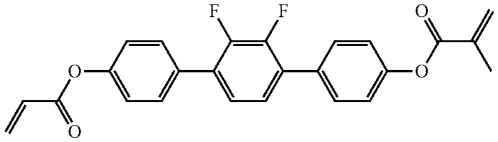

.

Further, the liquid crystal composition also comprises at least one compound of general formula III

III

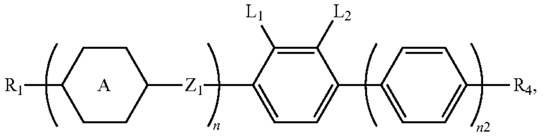

$R_3$ and $R_4$ each independently represents —H, —F, $C_{1-12}$ alkyl or alkoxy, $C_{2-12}$ alkenyl or alkenoxy,

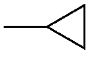

,

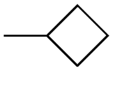

or

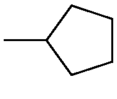

, wherein one or more H on the alkyl or alkoxy and the alkenyl or alkenoxy can be substituted by F;

$Z_3$ represents single bond, —COO—, —OCO—, —$CH_2O$—, —$OCH_2$— or —$CH_2CH_2$—;

$L_3$ and $L_4$ each independently represents —F, —Cl, —CN or —NCS;

ring

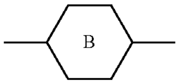

represents

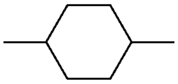

or

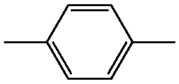

, wherein one or more $-CH_2-$ in

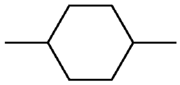

can be replaced by —O—, one or more H on

can be substituted by halogen;

n1 represent 0, 1, 2 or 3, and when n1 is 2 or 3, ring

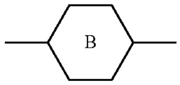

can be same or different, $Z_3$ can be same or different;

n2 represent 0 or 1.

More preferably, the compound of general formula III is selected from a group consisting of the following compounds:

III-1

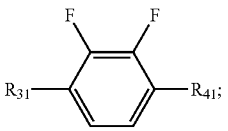

III-2

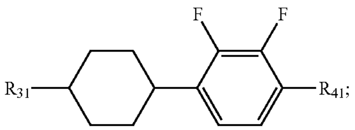

III-3

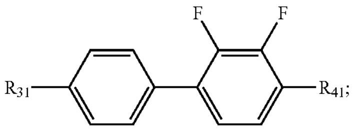

III-4

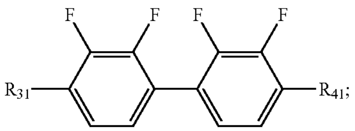

III-5

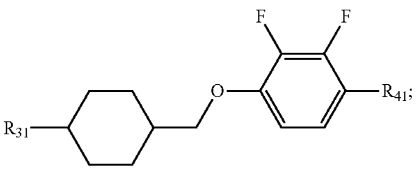

-continued

III-6

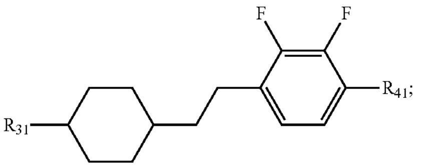

III-7

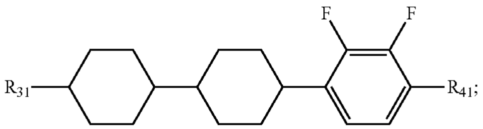

III-8

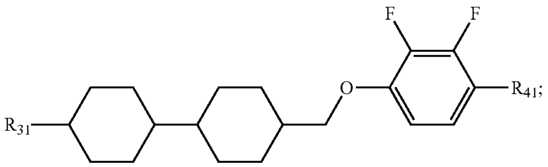

III-9

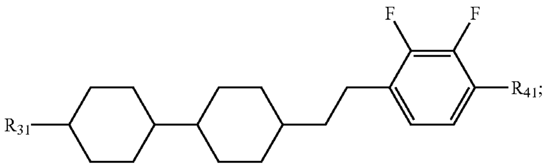

III-10

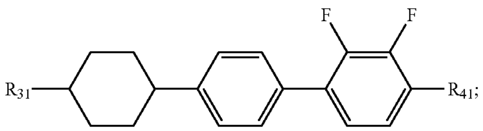

III-11

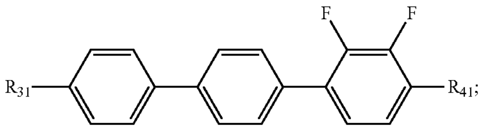

III-12

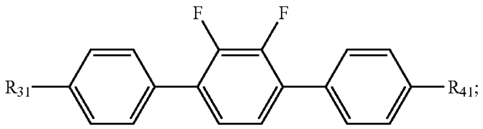

III-13

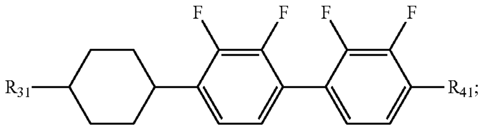

III-14

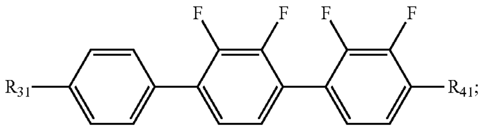

-continued

III-15

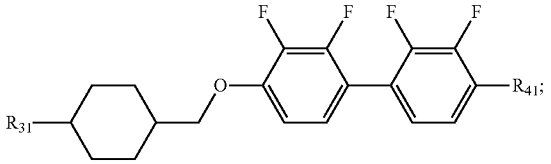

III-16

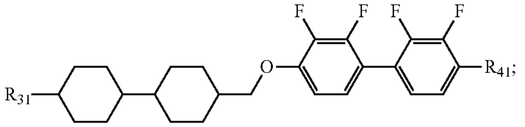

and

III-17

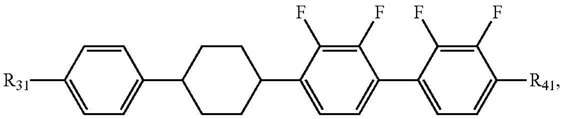

in which, $R_{31}$ and $R_{41}$ each independently represents —H, —F, $C_{1-7}$ alkyl or alkoxy, $C_{2-7}$ alkenyl or alkenoxy,

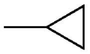

,

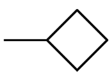

or

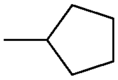

, wherein one or more H on the alkyl or alkoxy and the alkenyl or alkenoxy can be substituted by F.

Further, the liquid crystal composition also comprises at least one compound of general formula IV

IV

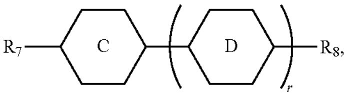

in which, $R_7$ and $R_8$ each independently represents H, $C_{1-12}$ alkyl or alkoxy, or $C_{2-12}$ alkenyl or alkenoxy; ring

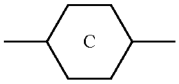

and ring

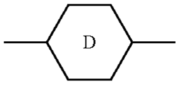

each independently represents

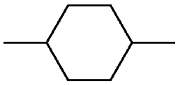

,

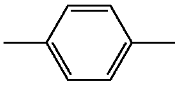

,

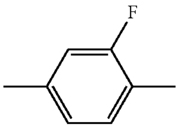

or

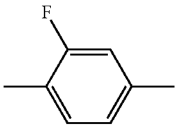

;

r represents 1, 2 or 3.

Preferably, the compound of general formula IV is selected from a group consisting of the following compounds:

IV-1

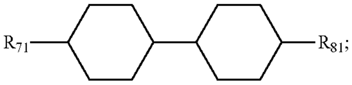

IV-2

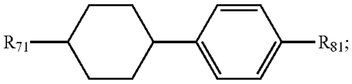

IV-3

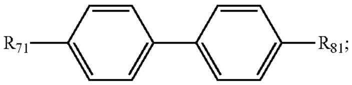

IV-4

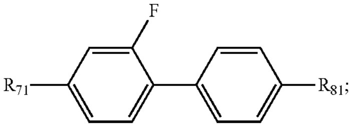

IV-5

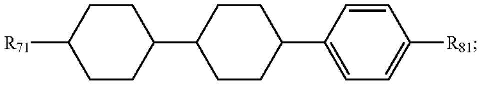

IV-6

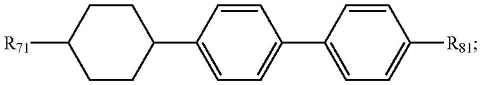

IV-7

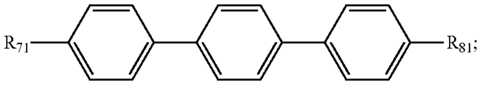

IV-8

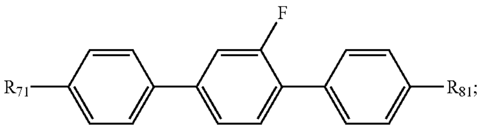

IV-9

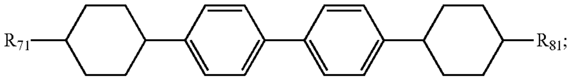

IV-10

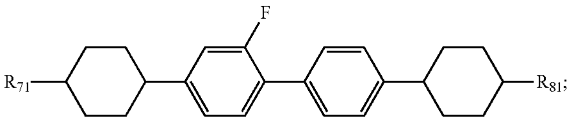

-continued

IV-11

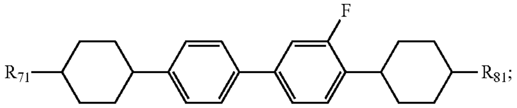

and

IV-12

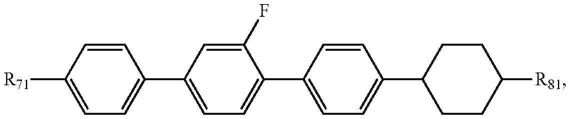

in which, $R_{71}$ and $R_{81}$ each independently represents H, $C_{1-7}$ alkyl or alkoxy, or $C_{2-7}$ alkenyl or alkenoxy.

In some embodiments of the present invention, preferably, the compound of general formula IV-1 is selected from a group consisting of the following compounds:

IV-1-1

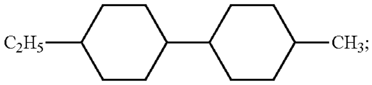

IV-1-2

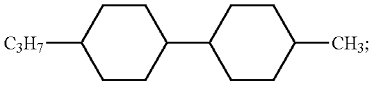

IV-1-3

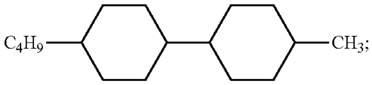

IV-1-4

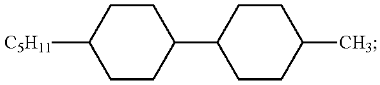

IV-1-5

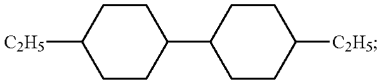

IV-1-6

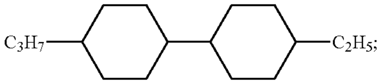

IV-1-7

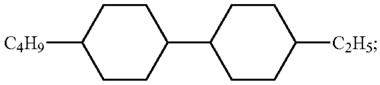

IV-1-8

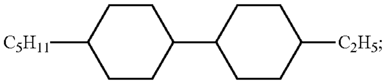

IV-1-9

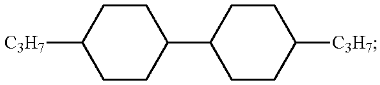

IV-1-10

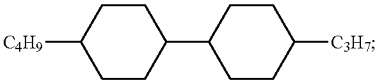

IV-1-11

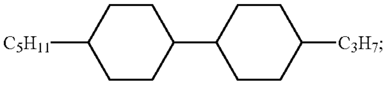

-continued

IV-1-12

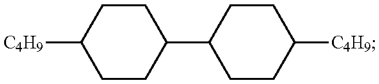

IV-1-13

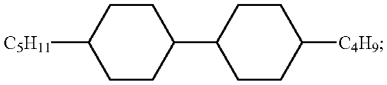

IV-1-14

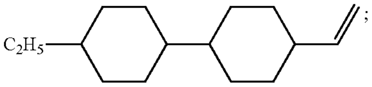

IV-1-15

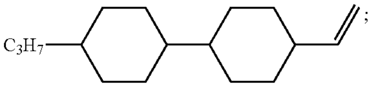

IV-1-16

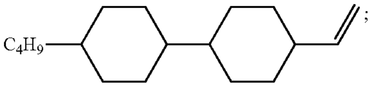

IV-1-17

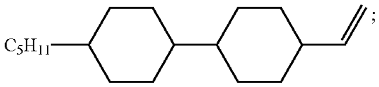

IV-1-18

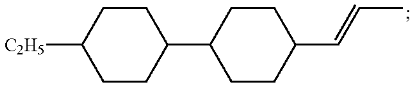

IV-1-19

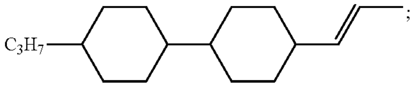

IV-1-20

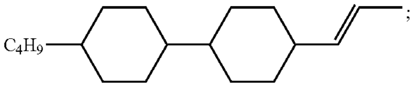

and

IV-1-21

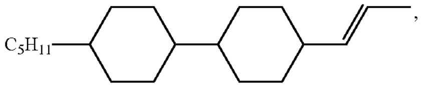

the compound of general formula IV-2 is selected from a group consisting of the following compounds:

IV-2-1

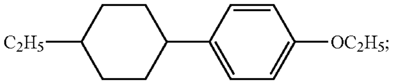

IV-2-2

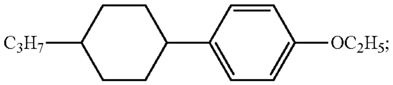

IV-2-3

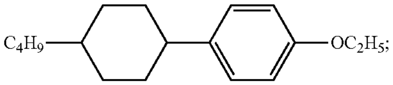

IV-2-4

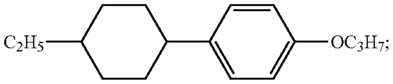

-continued
IV-2-5
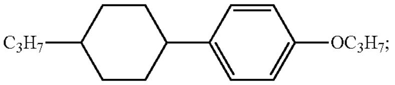
IV-2-6
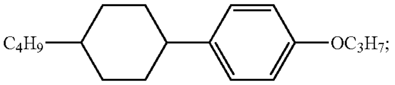
IV-2-7
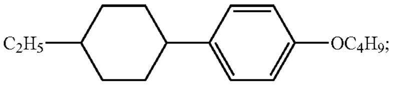
IV-2-8
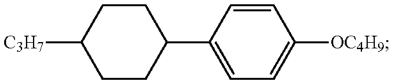 and
IV-2-9
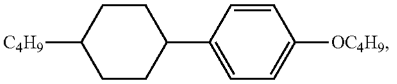
the compound of general formula IV-3 is selected from a group consisting of the following compounds:
IV-3-1
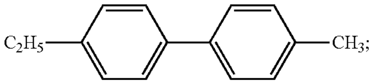
IV-3-2
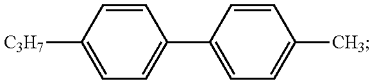
IV-3-3
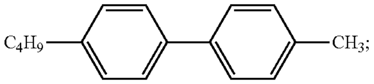
IV-3-4
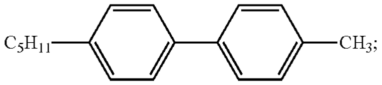
IV-3-5
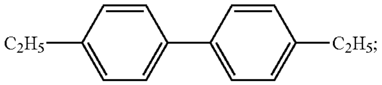
IV-3-6
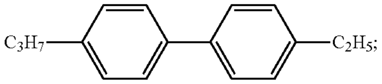
IV-3-7
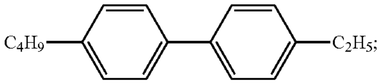
IV-3-8
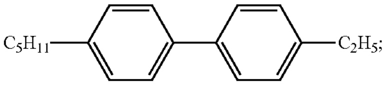
IV-3-9
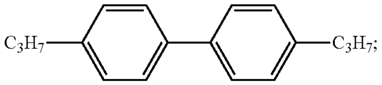
IV-3-10
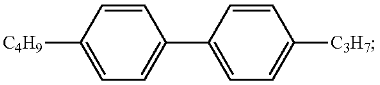
-continued
IV-3-11
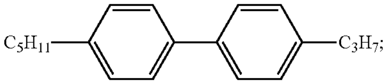
IV-3-12
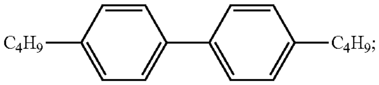
IV-3-13
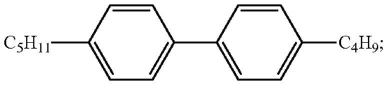
IV-3-14
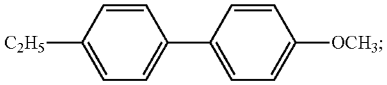
IV-3-15
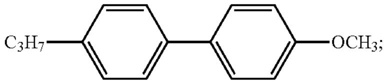
IV-3-16
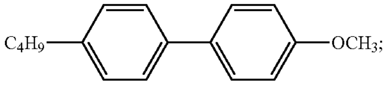
IV-3-17
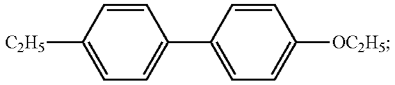
IV-3-18
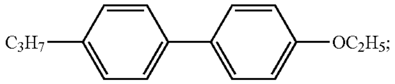
IV-3-19
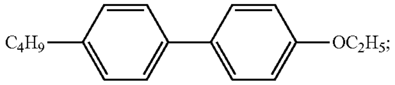
IV-3-20
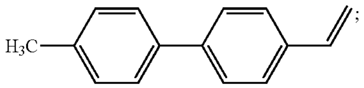
IV-3-21
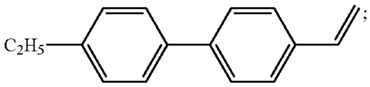
IV-3-22
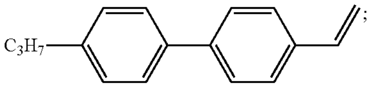
IV-3-23
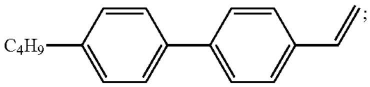
IV-3-24
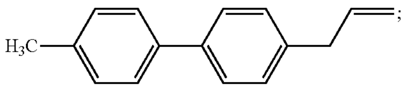
IV-3-25
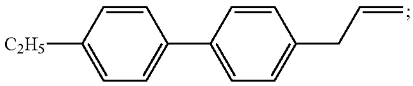
IV-3-26
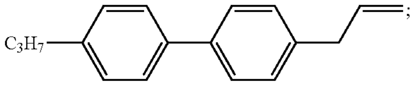

-continued
IV-3-27
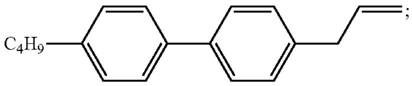
IV-3-28
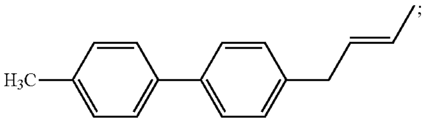
IV-3-29
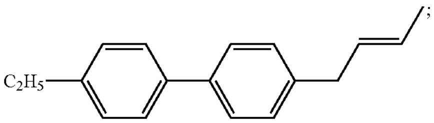
IV-3-30
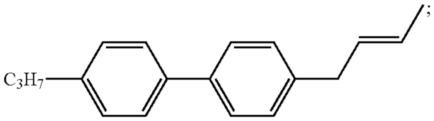
IV-3-31
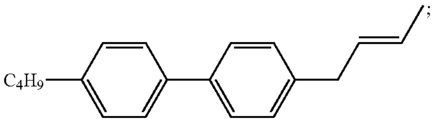
IV-3-32
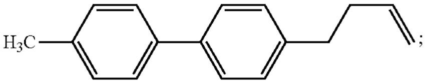
IV-3-33
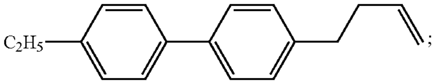
IV-3-34
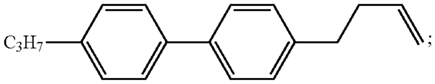
IV-3-35
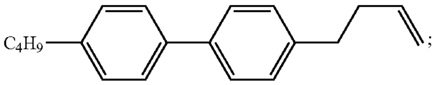
IV-3-36
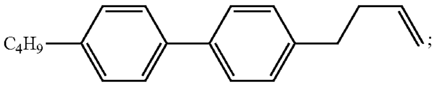
IV-3-37
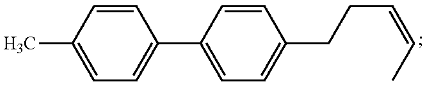
IV-3-38
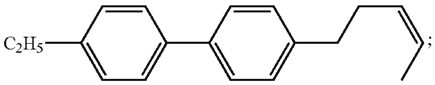
IV-3-39
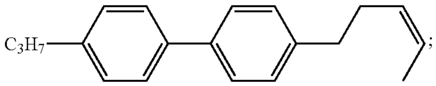 and
IV-3-40
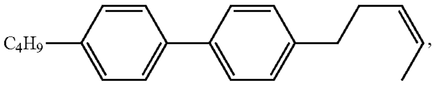
the compound of general formula IV-4 is selected from a group consisting of the following compounds:
IV-4-1
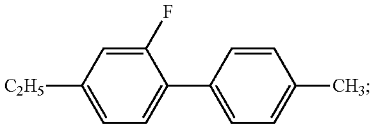
IV-4-2
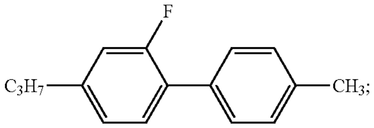
IV-4-3
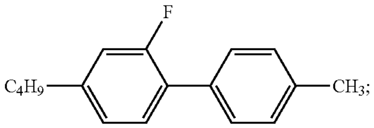
IV-4-4
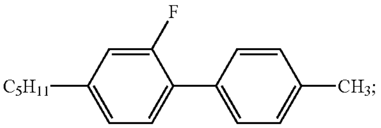
IV-4-5
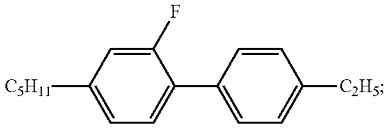
IV-4-6
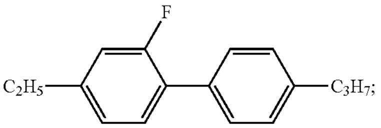
IV-4-7
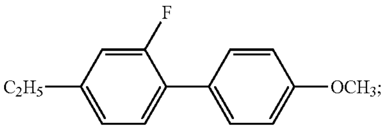
IV-4-8
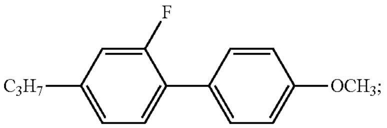
IV-4-9
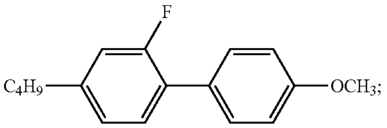
IV-4-10
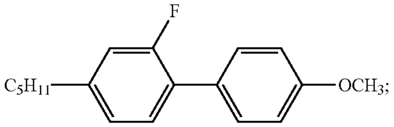
IV-4-11
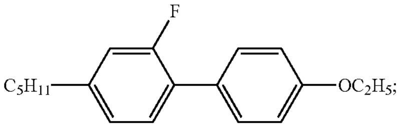 and -continued
IV-4-12
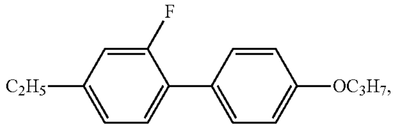
the compound of general formula IV-5 is selected from a group consisting of the following compounds:
IV-5-1
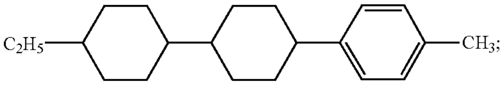
IV-5-2
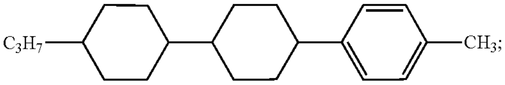
IV-5-3
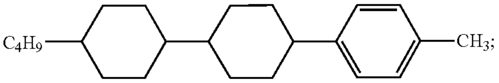
IV-5-4
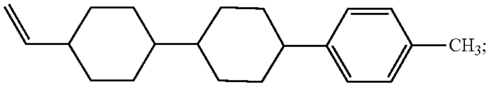
IV-5-5
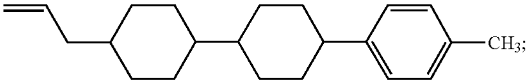
IV-5-6
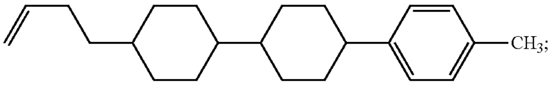
IV-5-7
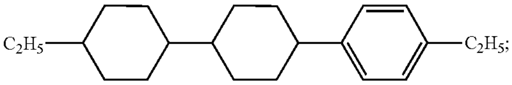
IV-5-8
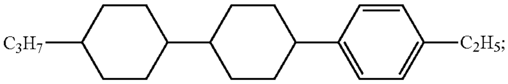
IV-5-9
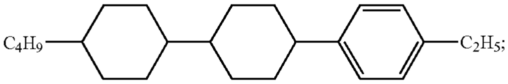
IV-5-10
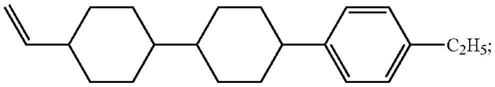
IV-5-11
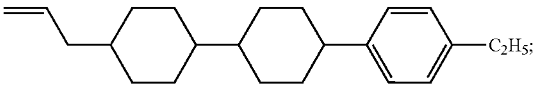
-continued
IV-5-12
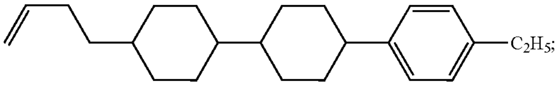
IV-5-13
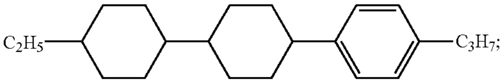
IV-5-14
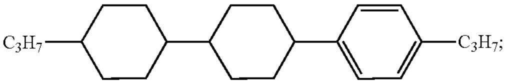
IV-5-15
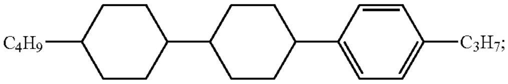
IV-5-16
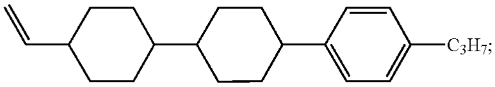
IV-5-17
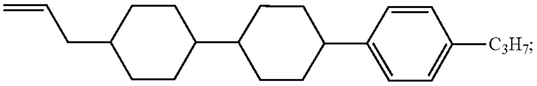
and
IV-5-18
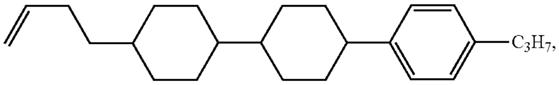
the compound of general formula IV-6 is selected from a group consisting of the following compounds:
IV-6-1
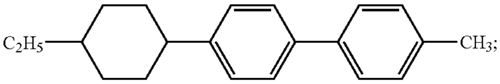
IV-6-2
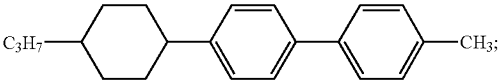
IV-6-3
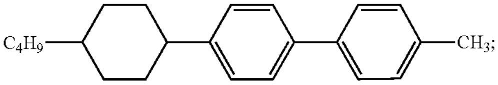
IV-6-4
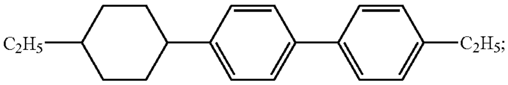
IV-6-5
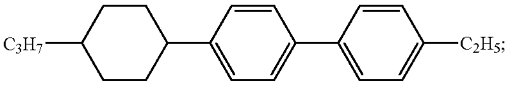

-continued
IV-6-6
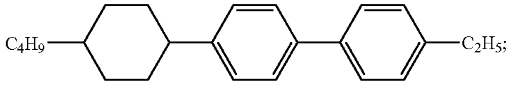
IV-6-7
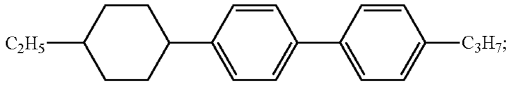
IV-6-8
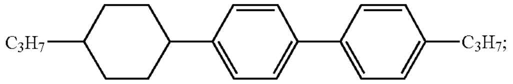
IV-6-9
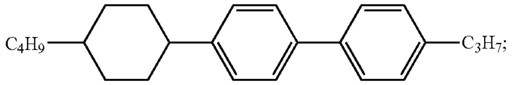
IV-6-10
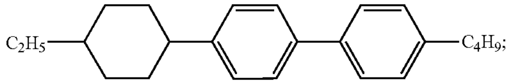
IV-6-11
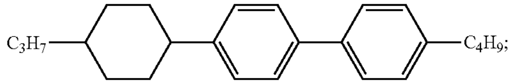
and
IV-6-12
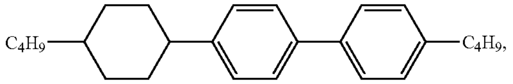
the compound of general formula IV-7 is selected from a group consisting of the following compounds:
IV-7-1
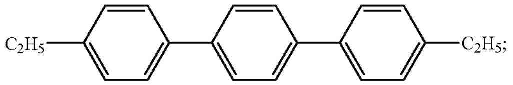
IV-7-2
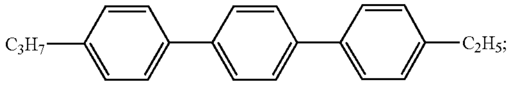
IV-7-3
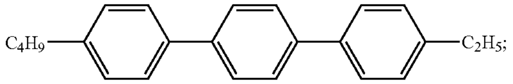
IV-7-4
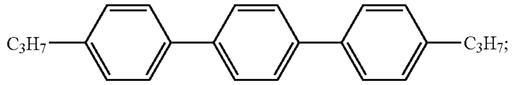
and
IV-7-5
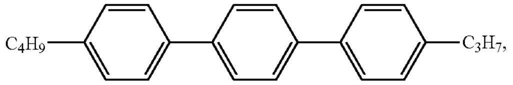
the compound of general formula IV-8 is selected from a group consisting of the following compounds:
IV-8-1
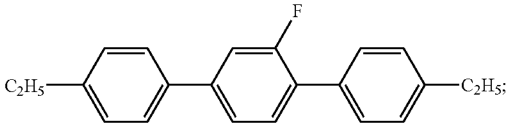
IV-8-2
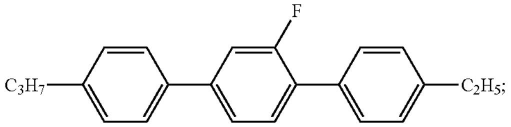
IV-8-3
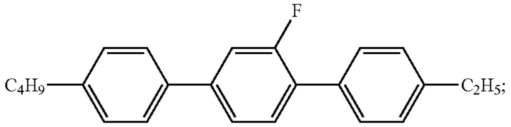
IV-8-4
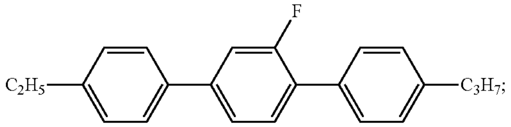
IV-8-5
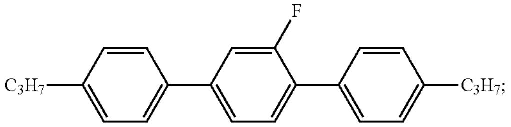
IV-8-6
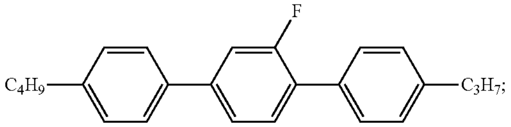
IV-8-7
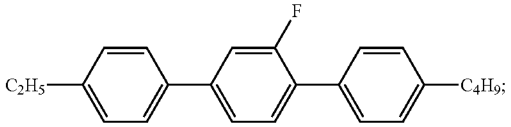
IV-8-8
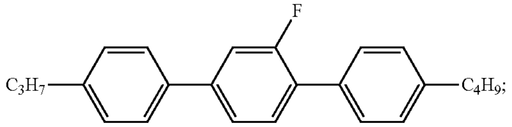
and
IV-8-9
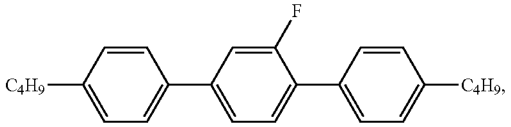

the compound of general formula IV-9 is selected from a group consisting of the following compounds:
IV-9-1
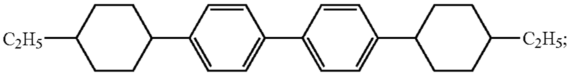
IV-9-2
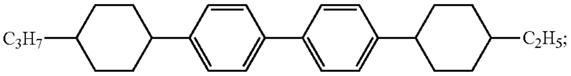
IV-9-3
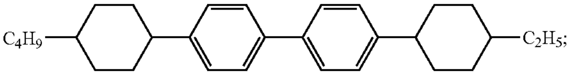
IV-9-4
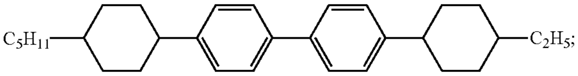
IV-9-5
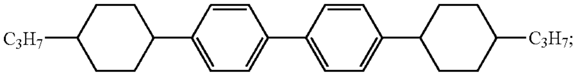
IV-9-6
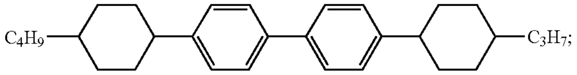
IV-9-7
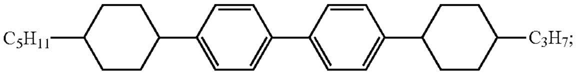
IV-9-8
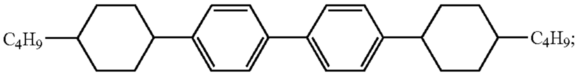
IV-9-9
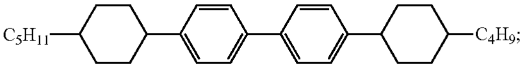 and
IV-9-10
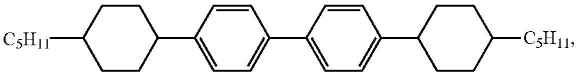
the compound of general formula IV-10 is selected from a group consisting of the following compounds:
IV-10-1
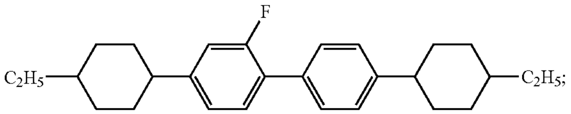
IV-10-2
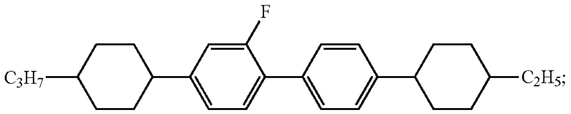
-continued
IV-10-3
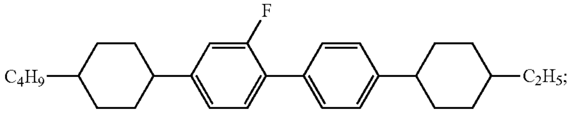
IV-10-4
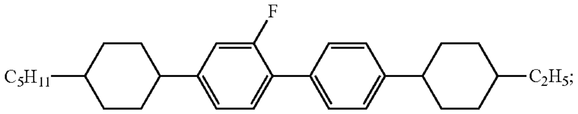
IV-10-5
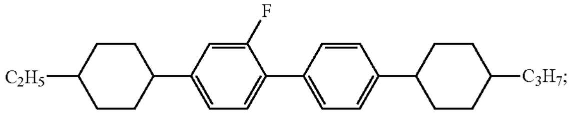
IV-10-6
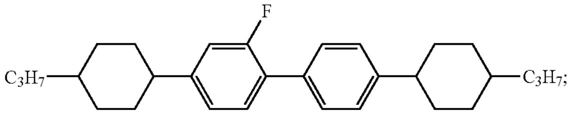
IV-10-7
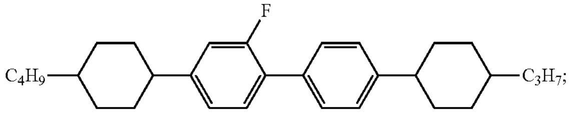
IV-10-8
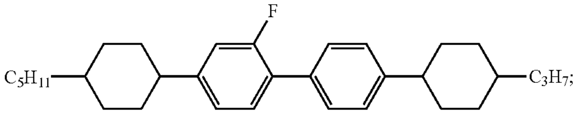
IV-10-9
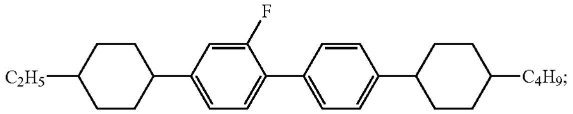
IV-10-10
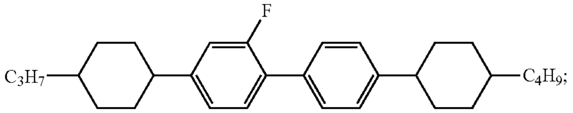
IV-10-11
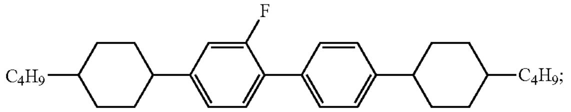
IV-10-12
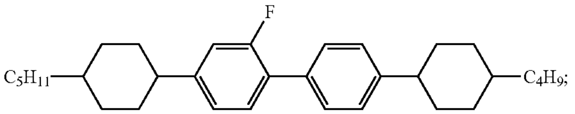
IV-10-13
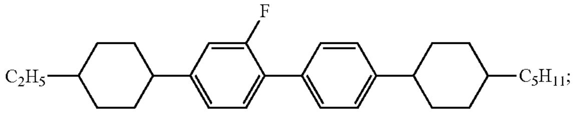

-continued
IV-10-14
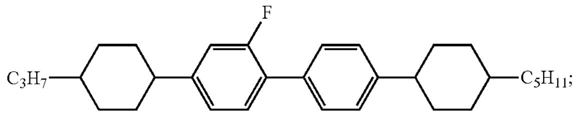
IV-10-15
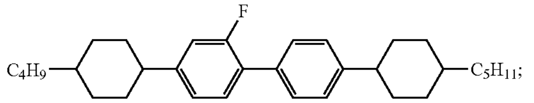 and
IV-10-16
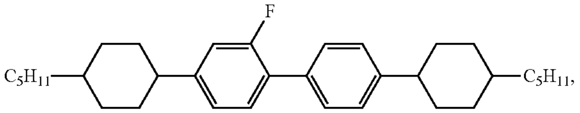
the compound of general formula IV-11 is selected from a group consisting of the following compounds:
IV-11-1
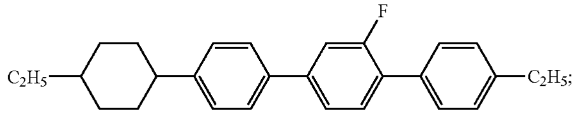
IV-11-2
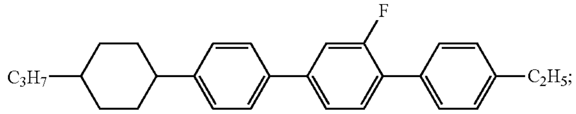
IV-11-3
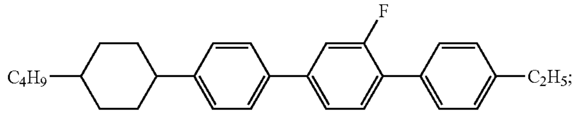
IV-11-4
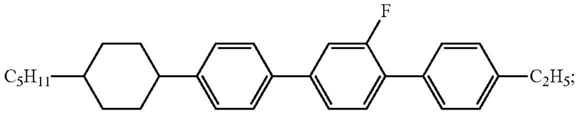
IV-11-5
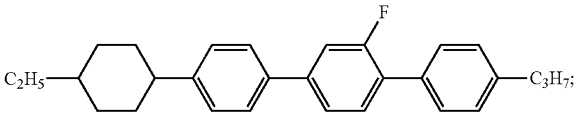
IV-11-6
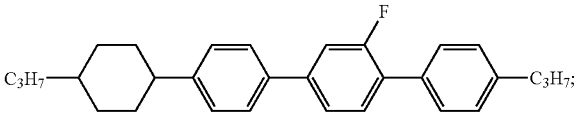
IV-11-7
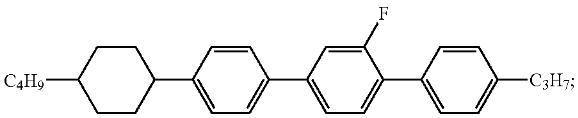
-continued
IV-11-8
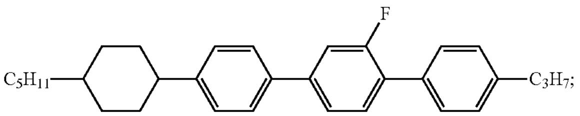
IV-11-9
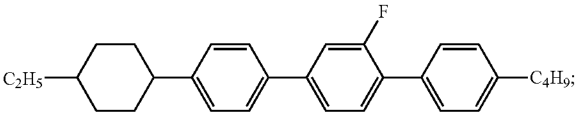
IV-11-10
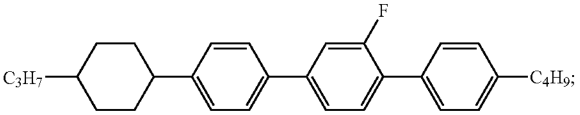
IV-11-11
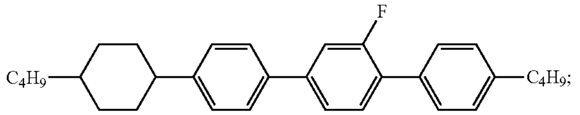
IV-11-12
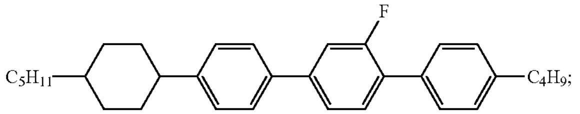
IV-11-13
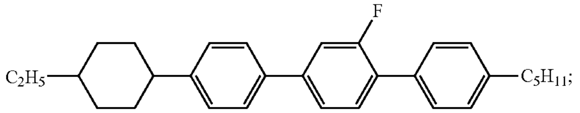
IV-11-14
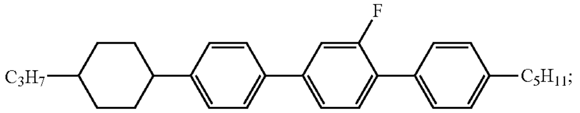
IV-11-15
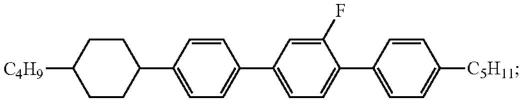 and
IV-11-16
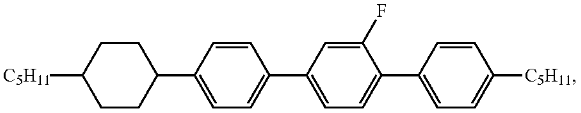
the compound of general formula IV-12 is selected from a group consisting of the following compounds:
IV-12-1
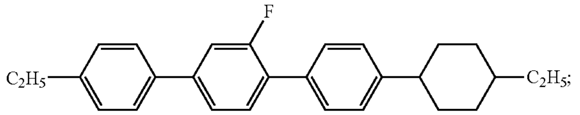

-continued

IV-12-2

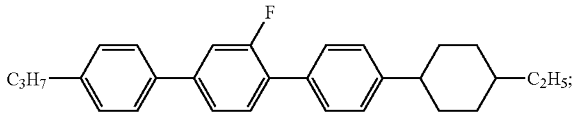

IV-12-3

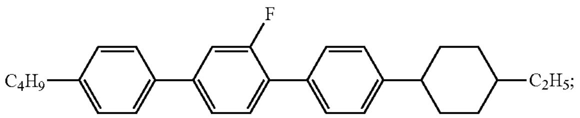

IV-12-4

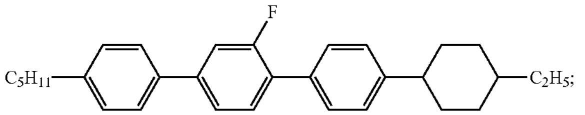

IV-12-5

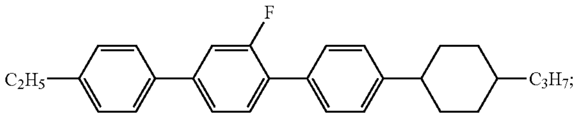

IV-12-6

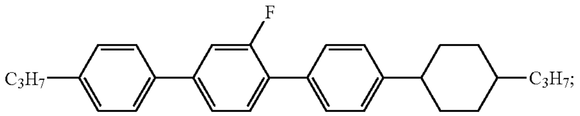

IV-12-7

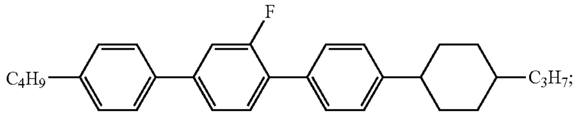

IV-12-8

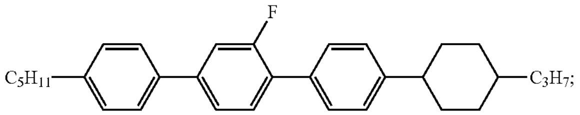

IV-12-9

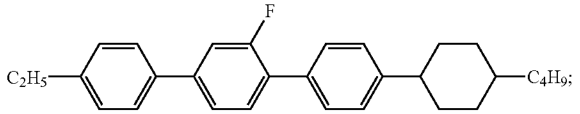

IV-12-10

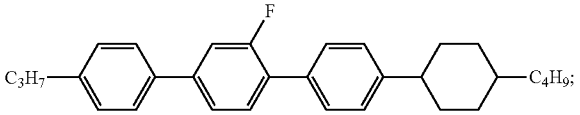

IV-12-11

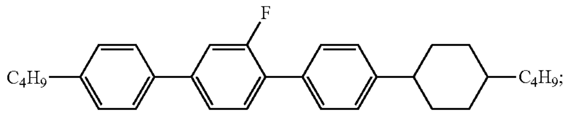

IV-12-12

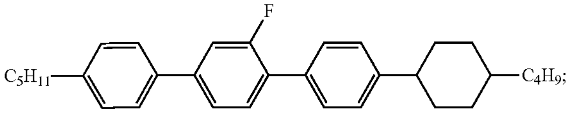

-continued

IV-12-13

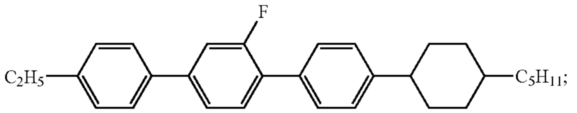

IV-12-14

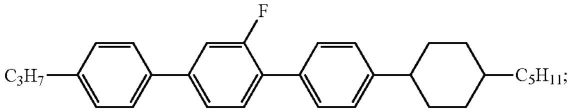

IV-12-15

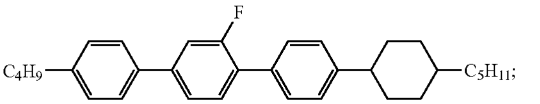

and

IV-12-16

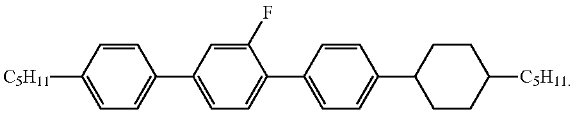

In some embodiments of the present invention, the compound of general formula I provides 1~30% by weight of the total amount of the liquid crystal composition, the compound of general formula II provides 0.001~5% by weight of the total amount of the liquid crystal composition, the compound of general formula III provides 0~70% by weight of the total amount of the liquid crystal composition, and the compound of general formula IV provides 0~70% by weight of the total amount of the liquid crystal composition.

Further, in some embodiments of the present invention, the compound of general formula I provides 1~30% by weight of the total amount of the liquid crystal composition, the compound of general formula II provides 0.001~5% by weight of the total amount of the liquid crystal composition, the compound of general formula III provides 10~70% by weight of the total amount of the liquid crystal composition, and the compound of general formula IV provides 20~70% by weight of the total amount of the liquid crystal composition.

Still further, in some embodiments of the present invention, the compound of general formula I provides 1~15% by weight of the total amount of the liquid crystal composition, the compound of general formula II provides 0.001~1% by weight of the total amount of the liquid crystal composition, the compound of general formula III provides 20~60% by weight of the total amount of the liquid crystal composition, and the compound of general formula IV provides 30~65% by weight of the total amount of the liquid crystal composition.

Through a large number of experiments, it was found that when applying the above liquid crystal composition to a liquid crystal display, there was better pretilt angle uniformity at different positions in the panel and a good performance in drop mura.

In another aspect, the present invention provides a liquid crystal composition which also comprises one or more additives known to those skilled in the art and described in the literatures. For example, polychromatic dye and/or chiral dopant can be added in an amount of 0-15% by weight, based on the total weight of the liquid crystal composition.

Dopants which can be preferably added to the mixture according to the present invention are shown below.

C 15
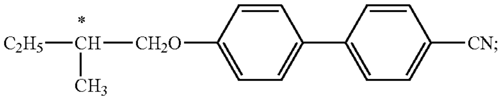
CB 15
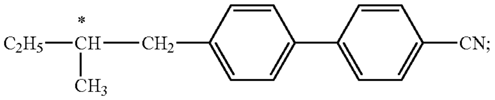
CM 21
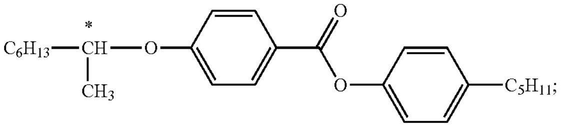
R/S-811
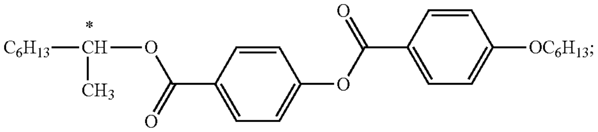
CM 44
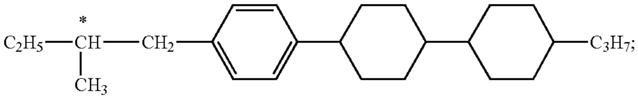
CM 45
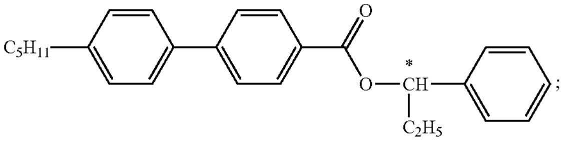
CM 47
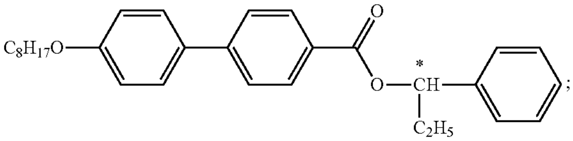
CN
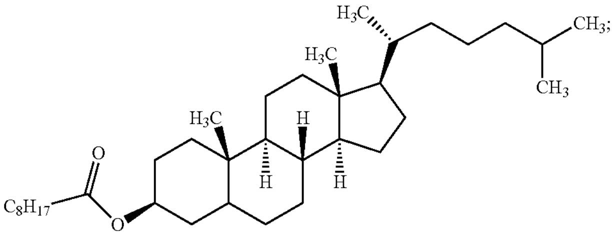
R/S-2011
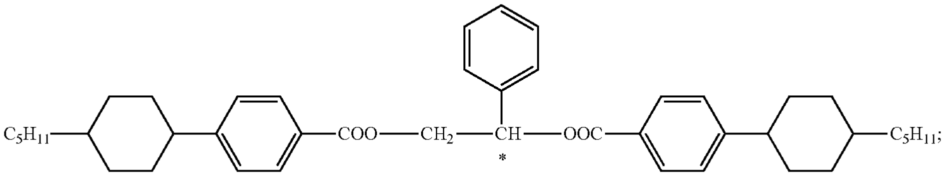
R/S-2011
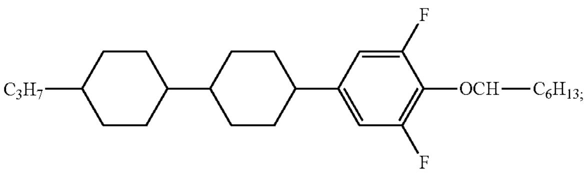

-continued

R/S-3011

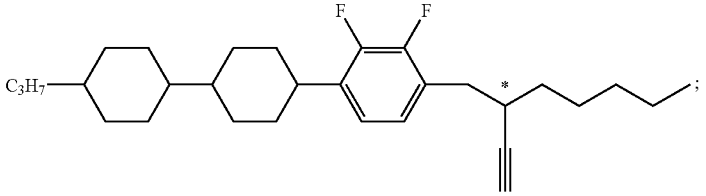

R/S-4011

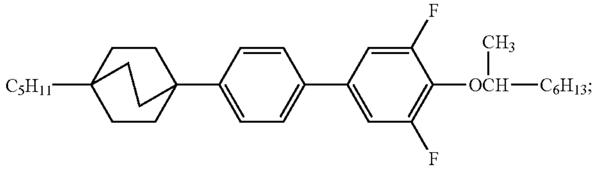 and

R/S-5011

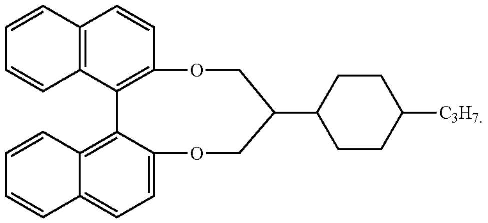

In an embodiment of the present invention, preferably, the dopant provides 0-5% by weight of the total amount of the liquid crystal composition; more preferably, the dopant provides 0-1% by weight of the total amount of the liquid crystal composition.

Stabilizers which can be added, for example, to the mixture according to the present invention are mentioned below.

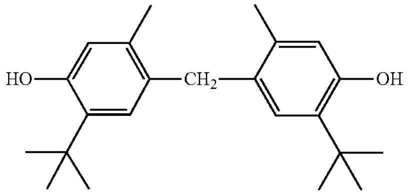

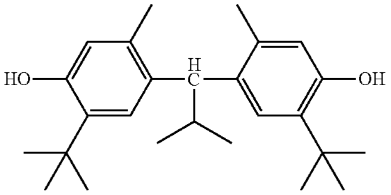

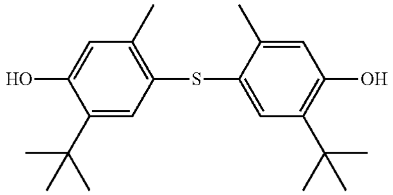

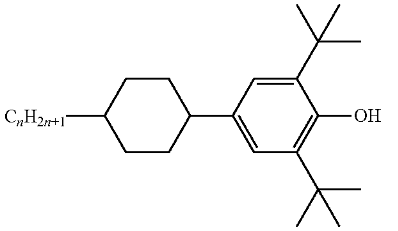

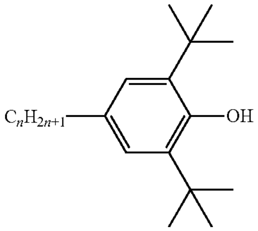

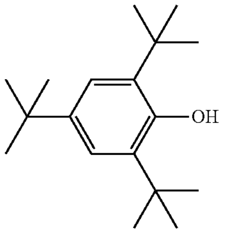

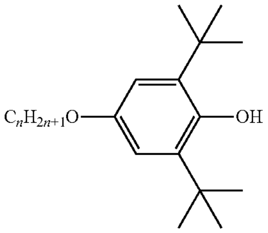

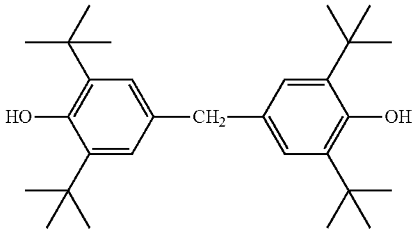

-continued
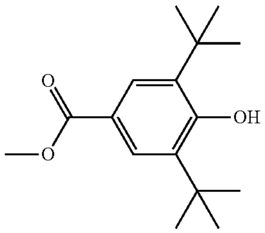
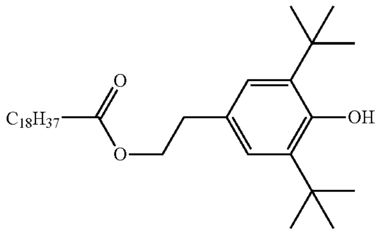
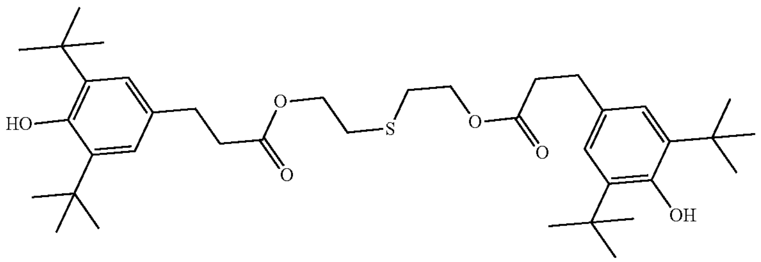
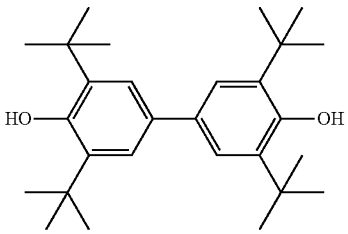
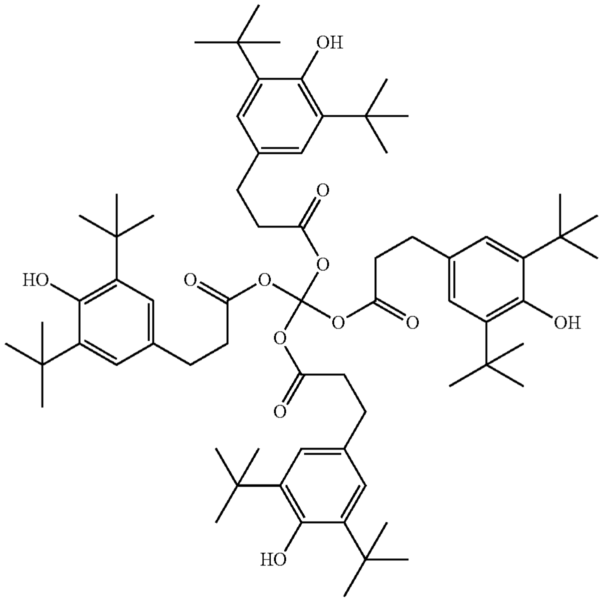
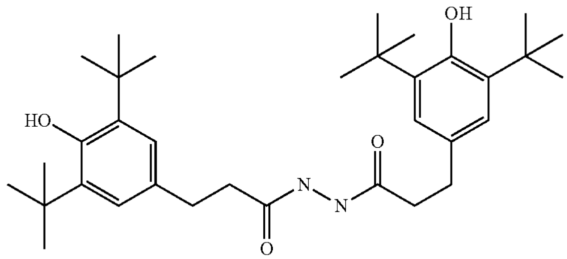
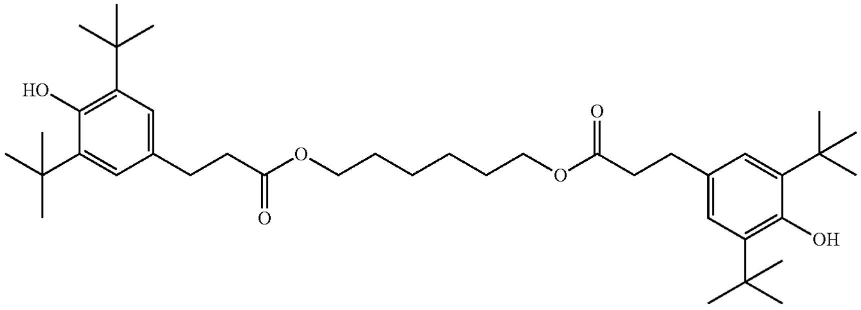
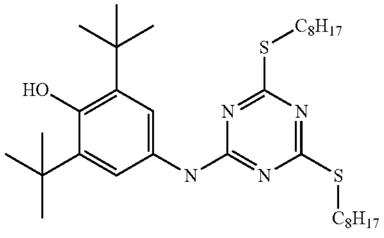

-continued
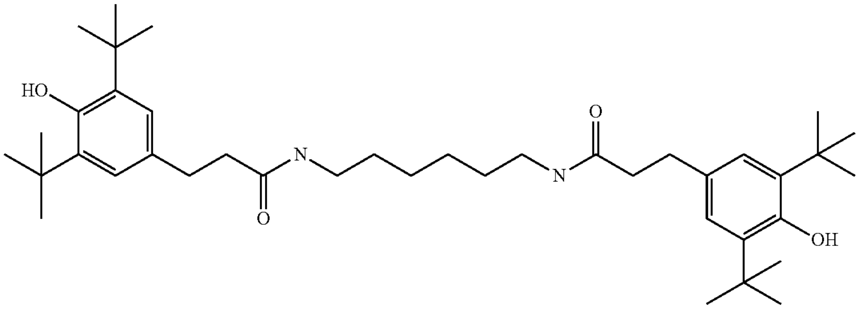
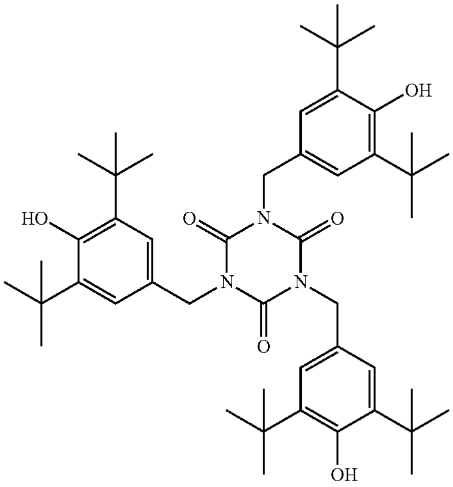
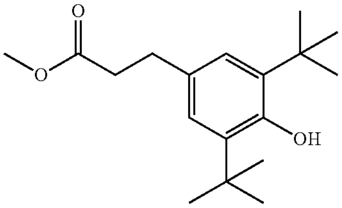
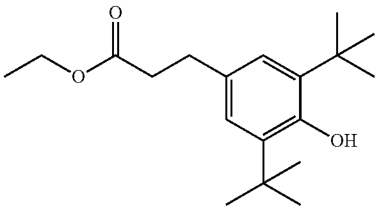
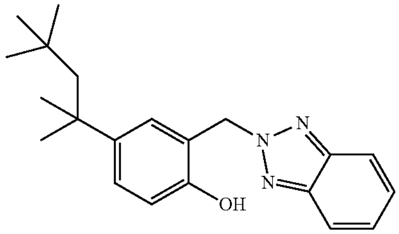
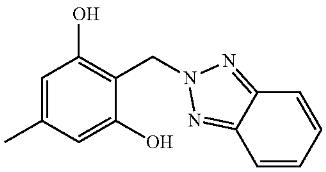
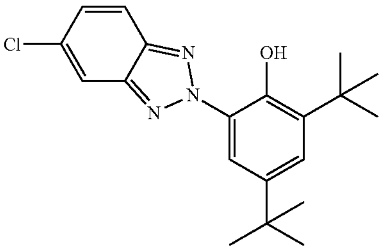
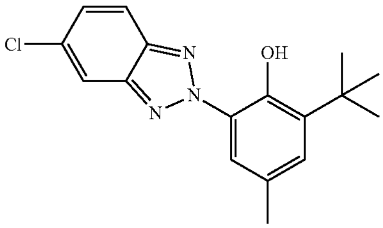
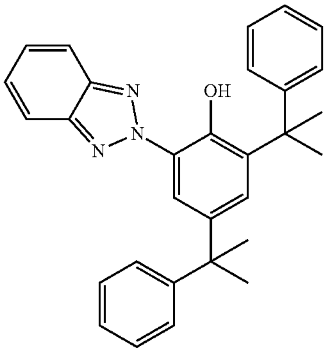
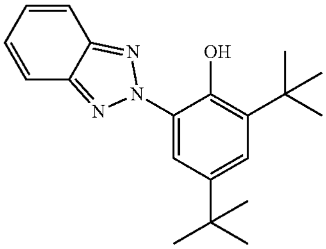
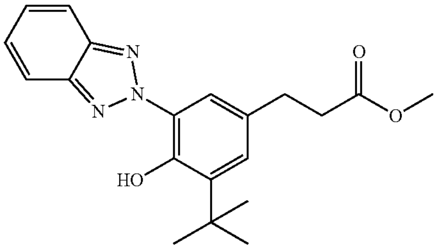

-continued
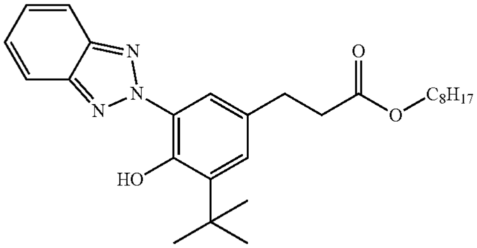
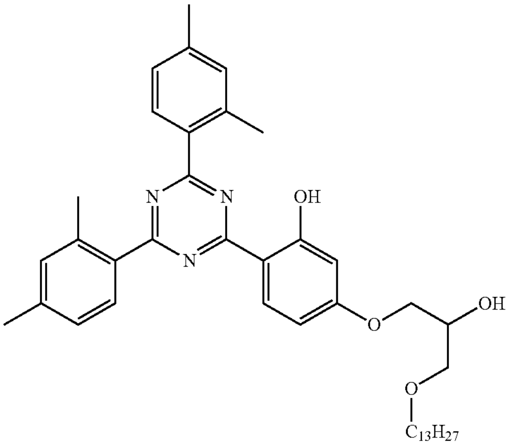
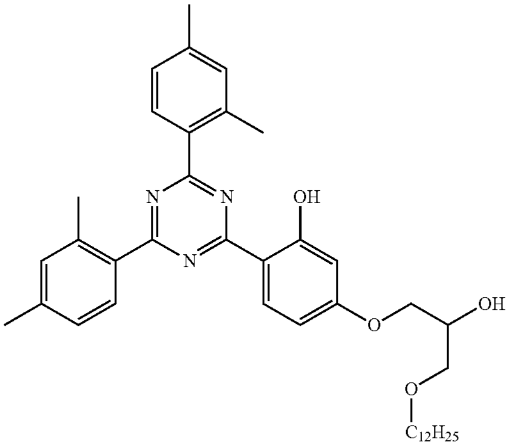
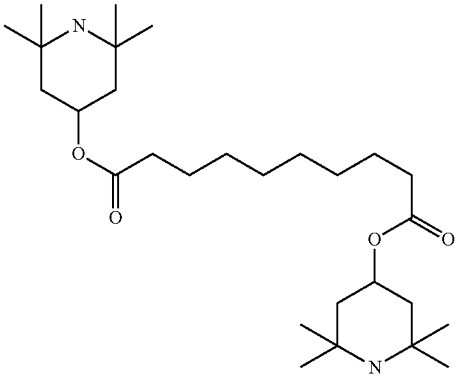
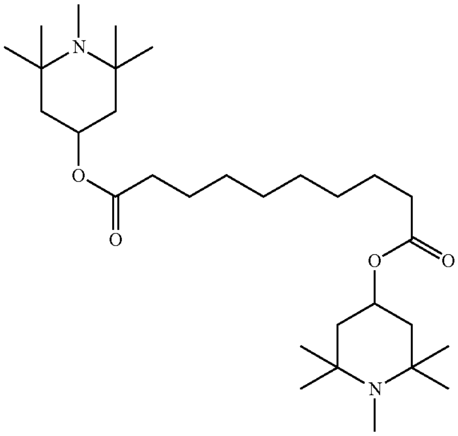

Preferably, the stabilizer is selected from stabilizers as shown below.

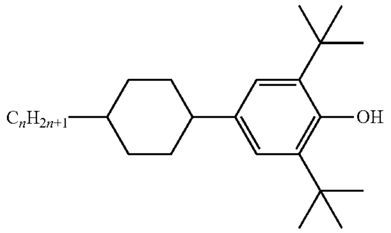

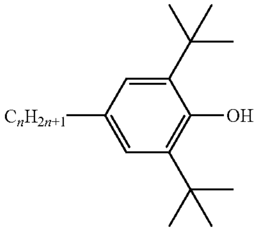

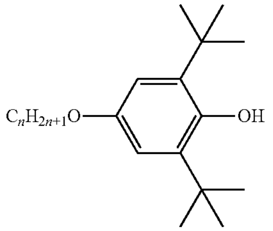

In the embodiments of the present invention, preferably, the stabilizer provides 0-5% by weight of the total amount of the liquid crystal composition; more preferably, the stabilizer provides 0-1% by weight of the total amount of the liquid crystal composition; and as a particularly preferred embodiment, the stabilizer provides 0-0.1% by weight of the total amount of the liquid crystal composition.

In still another aspect, the present invention further provides a liquid crystal display device comprising the above liquid crystal composition.

Beneficial effects:

The liquid crystal composition provided by the present invention has suitable optical anisotropy, suitable dielectric anisotropy, relatively high clearing point, better pretilt angle consistency and good performance in drop mura. When the liquid crystal composition is applied to a PSA type liquid crystal display, there will be an excellent display effect.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 1:

TABLE 1

| Codes of the group structures of liquid crystal compounds | | |
|---|---|---|
| Unit structure of group | Code | Name of group |
| 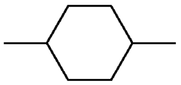 | C | 1,4-cyclohexylidene |
|  | P | 1,4-phenylene |
| 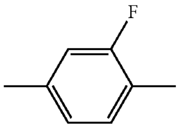 | G | 2-fluoro-1,4-phenylene |
| 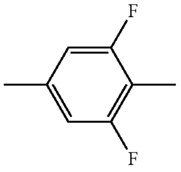 | U | 2,5-difluoro-1,4-phenylene |
| 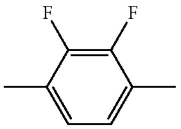 | W | 2,3-difluoro-1,4-phenylene |
| 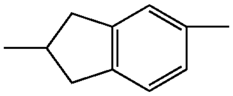 | I | indan-2,5-diyl |
| $—CH_2CH_2—$ | 2 | ethyl bridge bond |
| $—OCF_3$ | OCF3 | trifluoromethoxy |
| —F | F | fluorine substituent |
| —O— | O | oxygen substituent |
| $—CF_2O—$ | 1(2F)O | difluoro ether group |
| —COO— | E | ester bridge bond |
| $—C_nH_{2n+1}$ or $—C_mH_{2m+1}$ | n or m | alkyl |
| —CH═CH— or $—CH═CH_2$ | V | alkenyl |

Take a compound with the following structural formula as an example:

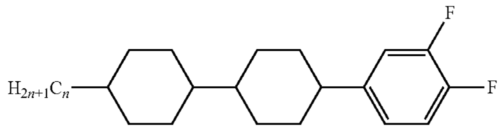

Represented by the codes listed in Table 1, this structural formula can be expressed as nCCGF, in which, n in the code represents the number of the carbon atoms of the alkyl on the left, for example, n is "3", meaning that the alkyl is $—C_3H_7$; C in the code represents cyclohexyl, G represents 2-fluoro-1,4-phenylene, and F represents fluoro.

The abbreviated codes of the test items in the following Examples are as follows:

Cp (° C.) clearing point (nematic-isotropy phases transition temperature)

Δn optical anisotropy (589 nm, 25° C.)

Δε dielectric anisotropy (1 KHz, 25° C.)

In which, the optical anisotropy is tested and obtained by using abbe refractometer under sodium lamp (589 nm) light source at 25° C.;

$\Delta\varepsilon=\varepsilon\|-\varepsilon\perp$, in which, $\varepsilon_1$ is a dielectric constant parallel to the molecular axis, $\varepsilon\perp$ is a dielectric constant perpendicular to the molecular axis, with the test conditions: 25° C., 1 KHz, TN90 type test cell with a cell gap of 7 μm.

Drop mura test: The uniformity of the liquid crystal panel is observed using a light shielding plate having a transmittance of 8%, 4% and 2%, respectively, under 48 gray scales. If the drop mura is observed, it is marked as "Yes"; if the drop mura is not observed, it is marked as "No". The easness of the observation of drop mura for light shielding plates with different transmittances can be ranked as 8%>4%>2%.

The ingredients used in the following Examples can be synthesized by well-known methods or obtained by commercial means. These synthetic techniques are routine, and the test results show that the liquid crystal compounds thus prepared meet the criteria for the electronic compounds.

Several liquid crystal compositions are prepared according to the formulations of the liquid crystal compositions specified in the following Examples. The preparation of the liquid crystal compositions is proceeded according to the conventional methods in the art, and as an example, the compositions are prepared by mixing the specified formulation via the processing modes, such as heating, ultrasonic processing, suspending processing and so forth.

The liquid crystal compositions specified in the following Examples are prepared and studied. The formulas of the liquid crystal compositions and their test results for the performance are shown below.

Comparative Example 1

The liquid crystal composition of Comparative Example 1 is prepared according to each compound and weight percentage listed in Table 2 and is tested by filling the same between two substrates of a liquid crystal display device.

TABLE 2

| Formulation of liquid crystal composition | |
|---|---|
| Component code | Weight percent |
| 3CWO2 | 6 |
| 5CWO2 | 8 |
| 2CPWO2 | 7 |
| 3CPWO4 | 9 |
| 3CWO4 | 7 |
| 3CCWO2 | 14 |
| 4CCWO2 | 5 |
| 3CPO2 | 9 |
| 3CPP2 | 6 |
| 3CC2 | 20 |
| 4CC3 | 9 |
| Total | 100 |

The polymerizable component in Table 3 is added to 100 parts by weight of the above liquid crystal composition.

TABLE 3

| Polymerizable component | |
|---|---|
| Structural formula | Part |
| 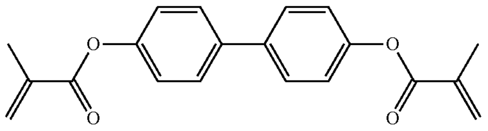 [SMILES: C=C(C)C(=O)Oc1ccc(-c2ccc(OC(=O)C(=C)C)cc2)cc1] | 0.3 |

The test results of performance parameters of the resulting composition are shown in Table 4 below.

TABLE 4

| Tests of performance parameters | |
|---|---|
| Δn | 0.094 |
| Δε | −3.1 |
| Cp | 73.7 |
| Drop mura Observation (8%) | Yes |
| Drop mura Observation (4%) | Yes |
| Drop mura Observation (2%) | Yes |

Example 1

The liquid crystal composition of Example 1 as shown in Table 5 is prepared by replacing 3CWO2 in Comparative Example 1 with 3CWO4O1 and is tested by filling the same between two substrates of a liquid crystal display device.

TABLE 5

| Formulation of liquid crystal composition | |
|---|---|
| Component code | Weight percent |
| 3CWO4O1 | 6 |
| 5CWO2 | 8 |
| 2CPWO2 | 7 |
| 3CPWO4 | 9 |
| 3CWO4 | 7 |
| 3CCWO2 | 14 |
| 4CCWO2 | 5 |
| 3CPO2 | 9 |
| 3CPP2 | 6 |
| 3CC2 | 20 |
| 4CC3 | 9 |
| Total | 100 |

The content and component of the polymerizable component are same as those of Comparative Example 1.

The test results of performance parameters of the resulting composition are shown in Table 6 below.

TABLE 6

| Tests of performance parameters | |
|---|---|
| Δn | 0.093 |
| Δε | −3.0 |
| Cp | 72.6 |
| Drop mura Observation (8%) | Yes |
| Drop mura Observation (4%) | Yes |
| Drop mura Observation (2%) | No |

Example 2

The liquid crystal composition of Example 2 as shown in Table 7 is prepared by replacing 4CCWO2 in Comparative Example 1 with 1O3OCCWO2 and is tested by filling the same between two substrates of a liquid crystal display device.

TABLE 7

Formulation of liquid crystal composition

| Component code | Weight percent |
|---|---|
| 3CWO2 | 6 |
| 5CWO2 | 8 |
| 2CPWO2 | 7 |
| 3CPWO4 | 9 |
| 3CWO4 | 7 |
| 3CCWO2 | 14 |
| 1O3OCCWO2 | 5 |
| 3CPO2 | 9 |
| 3CPP2 | 6 |
| 3CC2 | 20 |
| 4CC3 | 9 |
| Total | 100 |

The content and component of the polymerizable component are same as those of Comparative Example 1.

The test results of performance parameters of the resulting composition are shown in Table 8 below.

TABLE 8

Tests of performance parameters

| | |
|---|---|
| Δn | 0.093 |
| Δε | −3.1 |
| Cp | 73.5 |
| Drop mura Observation (8%) | Yes |
| Drop mura Observation (4%) | Yes |
| Drop mura Observation (2%) | No |

Example 3

The liquid crystal composition of Example 3 as shown in Table 9 is prepared by replacing 3CWO2 and 4CCWO2 in Comparative Example 1 with 3CWO4O1 and 1O3OCCWO2 respectively and is tested by filling the same between two substrates of a liquid crystal display device.

TABLE 9

Formulation of liquid crystal composition

| Component code | Weight percent |
|---|---|
| 3CWO4O1 | 6 |
| 5CWO2 | 8 |
| 2CPWO2 | 7 |
| 3CPWO4 | 9 |
| 3CWO4 | 7 |
| 3CCWO2 | 14 |
| 1O3OCCWO2 | 5 |
| 3CPO2 | 9 |
| 3CPP2 | 6 |

TABLE 9-continued

Formulation of liquid crystal composition

| Component code | Weight percent |
|---|---|
| 3CC2 | 20 |
| 4CC3 | 9 |
| Total | 100 |

The content and component of the polymerizable component are same as those of Comparative Example 1.

The test results of performance parameters of the resulting composition are shown in Table 10 below.

TABLE 10

Tests of performance parameters

| | |
|---|---|
| Δn | 0.094 |
| Δε | −3.1 |
| Cp | 73.7 |
| Drop mura Observation (8%) | Yes |
| Drop mura Observation (4%) | No |
| Drop mura Observation (2%) | No |

It is clear from the comparison of the above Comparative Example 1 and Examples 1-3 that the liquid crystal composition comprising the compound(s) of general formula I of the present invention has a more excellent performance in drop mura.

Comparative Example 2

The liquid crystal composition of Comparative Example 2 is prepared according to each compound and weight percentage listed in Table 11 and is tested by filling the same between two substrates of a liquid crystal display device.

TABLE 11

Formulation of liquid crystal composition

| Component code | Weight percent |
|---|---|
| 3CC2 | 23 |
| 4CC3 | 3 |
| 5PP1 | 11 |
| 3PWO2 | 10 |
| 5CC3 | 4 |
| 3C1OWO2 | 4 |
| 3CCP1 | 3 |
| 3CPP2 | 15 |
| 3CPWO2 | 9 |
| 2CC1OWO2 | 7 |
| 3CC1OWO2 | 11 |
| Total | 100 |

The polymerizable component in Table 12 is added to 100 parts by weight of the above liquid crystal composition.

TABLE 12

| Polymerizable component | |
|---|---|
| Structural formula | Part |
| 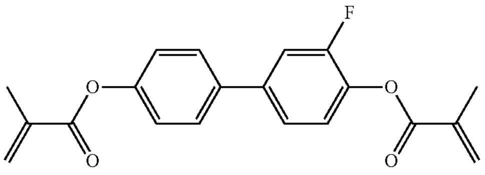 [SMILES: C=C(C)C(=O)Oc1ccc(-c2ccc(OC(=O)C(=C)C)c(F)c2)cc1] | 0.35 |

The test results of performance parameters of the resulting composition are shown in Table 13 below.

TABLE 13

| Tests of performance parameters | |
|---|---|
| Δn | 0.109 |
| Δε | −3.2 |
| Cp | 75.6 |
| Drop mura Observation (8%) | Yes |
| Drop mura Observation (4%) | Yes |
| Drop mura Observation (2%) | No |

Example 4

The liquid crystal composition of Example 4 as shown in Table 14 is prepared by replacing 3PWO2 and 3C1OWO2 in Comparative Example 2 with 3PWO3O1 and 3C1OWO4O1 respectively and is tested by filling the same between two substrates of a liquid crystal display device.

TABLE 14

| Formulation of liquid crystal composition | |
|---|---|
| Component code | Weight percent |
| 3CC2 | 23 |
| 4CC3 | 3 |
| 5PP1 | 11 |
| 3PWO3O1 | 10 |
| 5CC3 | 4 |
| 3C1OWO4O1 | 4 |
| 3CCP1 | 3 |
| 3CPP2 | 15 |
| 3CPWO2 | 9 |
| 2CC1OWO2 | 7 |
| 3CC1OWO2 | 11 |
| Total | 100 |

The content and component of the polymerizable component are same as those of Comparative Example 2.

The test results of performance parameters of the resulting composition are shown in Table 15 below.

TABLE 15

| Tests of performance parameters | |
|---|---|
| Δn | 0.109 |
| Δε | −3.2 |
| Cp | 75.6 |
| Drop mura Observation (8%) | No |
| Drop mura Observation (4%) | No |
| Drop mura Observation (2%) | No |

Example 5

The liquid crystal composition of Example 5 as shown in Table 16 is prepared by replacing 3CPWO2 in Comparative Example 2 with 3CPWO3O1 and is tested by filling the same between two substrates of a liquid crystal display device.

TABLE 16

| Formulation of liquid crystal composition | |
|---|---|
| Component code | Weight percent |
| 3CC2 | 23 |
| 4CC3 | 3 |
| 5PP1 | 11 |
| 3PWO2 | 10 |
| 5CC3 | 4 |
| 3C1OWO2 | 4 |
| 3CCP1 | 3 |
| 3CPP2 | 15 |
| 3CPWO3O1 | 9 |
| 2CC1OWO2 | 7 |
| 3CC1OWO2 | 11 |
| Total | 100 |

The content and component of the polymerizable component are same as those of Example 1.

The test results of performance parameters of the resulting composition are shown in Table 17 below.

TABLE 17

| Tests of performance parameters | |
|---|---|
| Δn | 0.1085 |
| Δε | −3.2 |
| Cp | 74.2 |
| Drop mura Observation (8%) | No |
| Drop mura Observation (4%) | No |
| Drop mura Observation (2%) | No |

Example 6

The liquid crystal composition of Example 6 as shown in Table 18 is prepared by replacing 3C1OWO2 and 3CPWO2 in Comparative Example 2 with 3C1OWO4O1 and 3CPWO3O1 respectively and is tested by filling the same between two substrates of a liquid crystal display device.

TABLE 18

| Formulation of liquid crystal composition | |
|---|---|
| Component code | Weight percent |
| 3CC2 | 23 |
| 4CC3 | 3 |
| 5PP1 | 11 |
| 3PWO2 | 10 |
| 5CC3 | 4 |
| 3C1OWO4O1 | 4 |
| 3CCP1 | 3 |
| 3CPP2 | 15 |
| 3CPWO3O1 | 9 |
| 2CC1OWO2 | 7 |
| 3CC1OWO2 | 11 |
| Total | 100 |

The content and component of the polymerizable component are same as those of Example 1.

The test results of performance parameters of the resulting composition are shown in Table 19 below.

TABLE 19

| Tests of performance parameters | |
|---|---|
| Δn | 0.107 |
| Δε | −3.0 |
| Cp | 73.9 |
| Drop mura Observation (8%) | No |
| Drop mura Observation (4%) | No |
| Drop mura Observation (2%) | No |

It is clear from the comparison of the above Comparative Example 2 and Examples 4-6 that the liquid crystal composition comprising the compound(s) of general formula I of the present invention has a more excellent performance in drop mura.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

INDUSTRIAL APPLICABILITY

The liquid crystal compositions related in the present invention can be applied to the field of liquid crystal.

The invention claimed is:

1. A liquid crystal composition, wherein the liquid crystal composition comprises:

(i) at least one compound selected from a group consisting of the following compounds

I-3

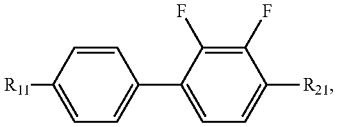

I-4

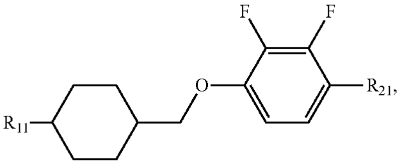

I-9

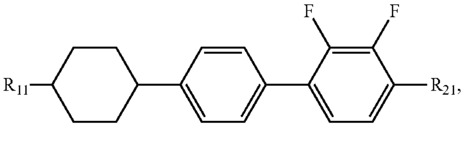

and combinations thereof;

in which $R_{11}$ represents —H, —F, $C_{1-7}$ alkyl or alkoxy, $C_{2-7}$ alkenyl or alkenoxy, $—OR_{51}OR_{61}$,

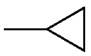, 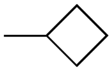 or 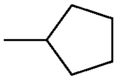, wherein one or more H on the alkyl or alkoxy and the alkenyl or alkenoxy can be substituted by F, $R_{21}$ is $—OR_{51}OR_{61}$;

wherein $R_{51}$ represents $C_{3-12}$ alkyl or $C_{3-12}$ alkenyl and $R_{61}$ represents a linear $C_{1-10}$ alkyl or $C_{2-10}$ alkenyl;

(ii) at least one polymerizable compound of general formula II

II

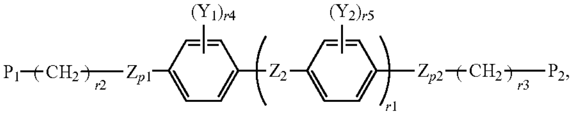

in which, $P_1$ and $P_2$ each independently represents

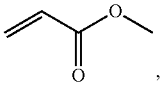, 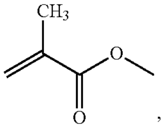, 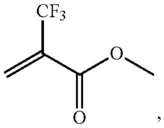,

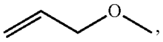, 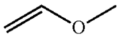, 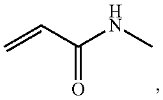,

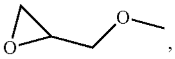, 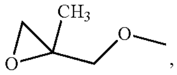, 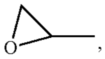,

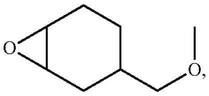 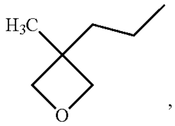,

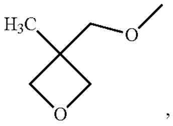, 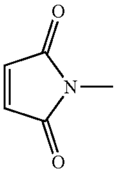

or —SH;

$r_1$ represents 1, 2 or 3;

$r_2$ and $r_3$ each independently represents a positive integer of 0~6;

$r_4$ and $r_5$ each independently represents 0, 1, 2, 3 or 4;

$Z_2$ represents single bond, $—CH_2CH_2—$, —COO—, —OCO—, $—CH_2O—$, $—OCH_2—$ or —CH=CH—COO—;

$Z_{p1}$ and $Z_{p2}$ are same or different and each independently selected from a group consisting of single bond, —O—, —S—, —NH—, —NHCOO—, —OCONH—, $—CF_2O—$, $—OCF_2—$, $—CF_2S—$, $—SCF_2—$, $—CH_2CH_2—$, $—CF_2CH_2—$, $—CH_2CF_2—$, $—CF_2CF_2—$, —CF=CH—, —CH=CF—, —CF=CF—, —CO—, —COO—, —OCO—, —OCOO—, $—CH_2—$, $—OCH_2—$, $—SCH_2—$, $—CH_2S—$, —CH=CH—, —C≡C—, —CH=CH—COO— and —OCO—CH=CH—;

$Y_1$ and $Y_2$ each independently represents H, halogen, $C_{1-3}$ alkyl or alkoxy, provided that if $Z_{p1}$ or $Z_{p2}$ is a single bond, then either $Y_1$ or $Y_2$ is halogen or $r_1$ is 2 or 3;

(iii) at least one compound of general formula III

III

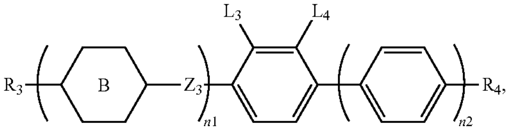

$R_3$ and $R_4$ each independently represents —H, —F, $C_{1-12}$ alkyl or alkoxy, $C_{2-12}$ alkenyl or alkenoxy,

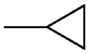, 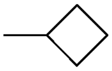 or 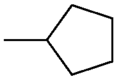, wherein one or more H on the alkyl or alkoxy and the alkenyl or alkenoxy can be substituted by F;

$Z_3$ represents single bond, —COO—, —OCO—, —$CH_2O$—, —$OCH_2$— or —$CH_2CH_2$—;

$L_3$ and $L_4$ each independently represents —F, —Cl, —CN or —NCS;

ring

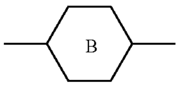

represents

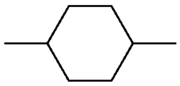 or , wherein one or more —$CH_2$— in

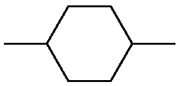

can be replaced by —O—, one or more H on

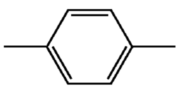

can be substituted by halogen;

n1 represent 0, 1, 2 or 3, and when n1 is 2 or 3, ring

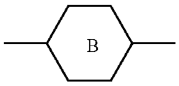

can be same or different, $Z_3$ can be same or different;

n2 represent 0 or 1; and (iv) at least one compound of general formula IV

IV

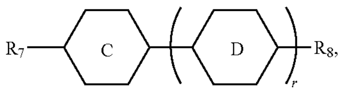

in which, $R_7$ and $R_8$ each independently represents H, $C_{1-12}$ alkyl or alkoxy, or $C_{2-12}$ alkenyl or alkenoxy;

ring

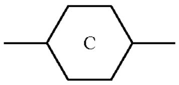

and ring

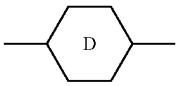

each independently represents

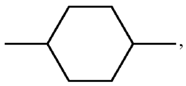, 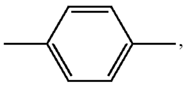,

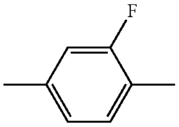 or 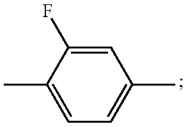;

r represents 1, 2 or 3;

wherein the compound of formula I-3, I-4, and/or I-9 provides 1 to 30% by weight of the total amount of the liquid crystal composition, the compound of general formula II provides 0.001 to 5% by weight of the total amount of the liquid crystal composition, the compound of general formula III provides up to 70% by weight of the total amount of the liquid crystal composition, and the compound of general formula IV provides up to 70% by weight of the total amount of the liquid crystal composition.

2. The liquid crystal composition according to claim 1, further comprising compounds selected from a group consisting of the following compounds:

I-1

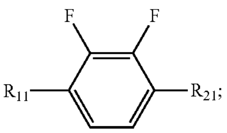

-continued

I-2

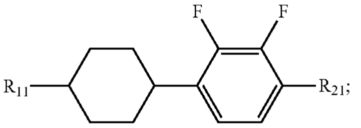

I-5

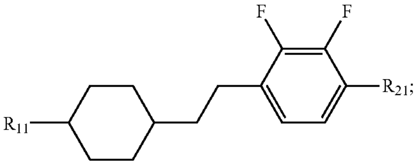

I-6

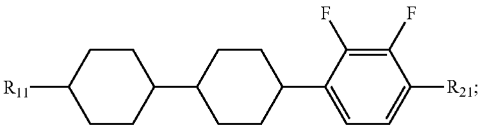

I-7

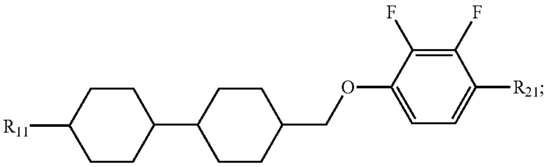

I-8

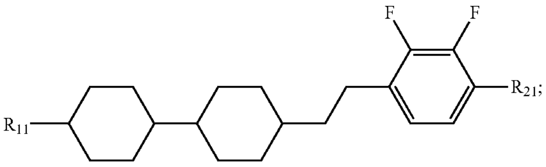

I-10

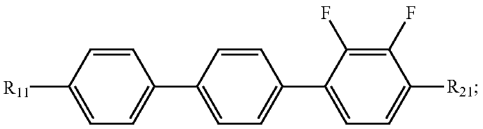

I-11

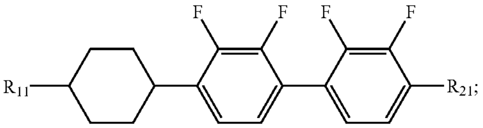

I-12

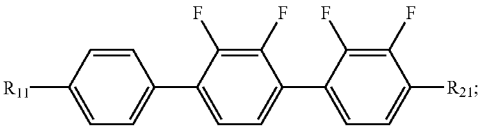

II-4

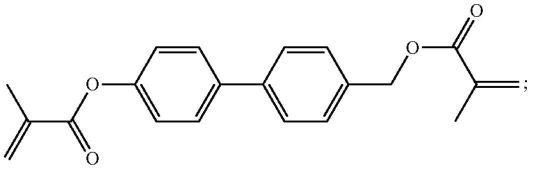

-continued

I-13

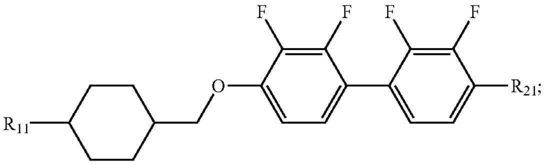

I-14

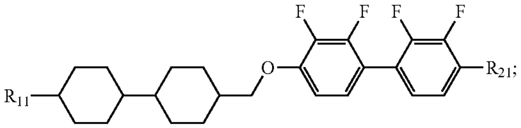

and

I-15

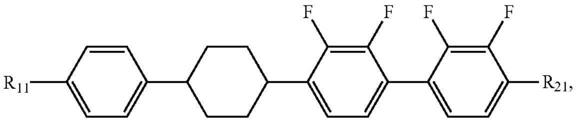

in which, $R_{11}$ represents —H, —F, $C_{1-7}$ alkyl or alkoxy, $C_{2-7}$ alkenyl or alkenoxy, —$OR_{51}OR_{61}$;

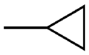
,
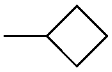
or
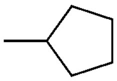
, wherein one or more H on the alkyl or alkoxy and the alkenyl or alkenoxy can be substituted by F, and $R_{21}$ is —$OR_{51}OR_{61}$;

$R_{51}$ represents $C_{3-12}$ alkyl or $C_{3-12}$ alkenyl and $R_{61}$ represents a linear $C_{1-10}$ alkyl or $C_{2-10}$ alkenyl.

3. The liquid crystal composition according to claim 1, wherein $P_1$ and $P_2$ in the general formula II each independently represents

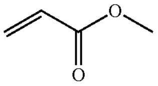
or
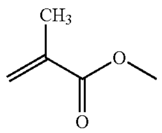
.

4. The liquid crystal composition according to claim 3, wherein the compound of general formula II is selected from a group consisting of the following compounds:

-continued
II-5
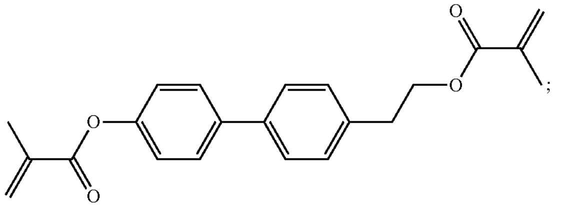
II-6
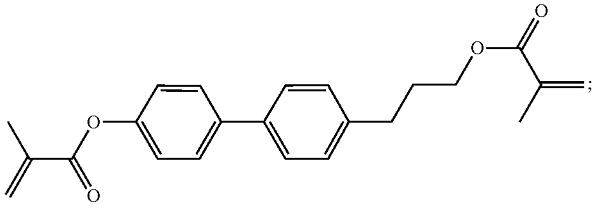
II-7
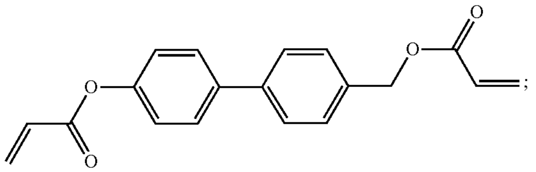
II-8
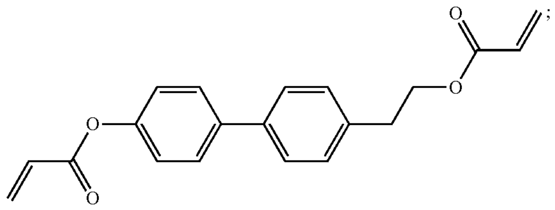
II-9
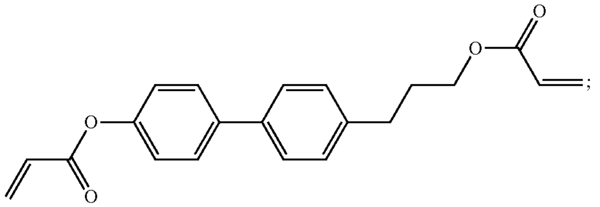
II-10
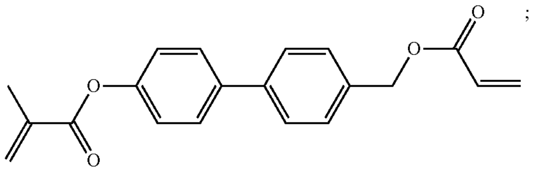
II-11
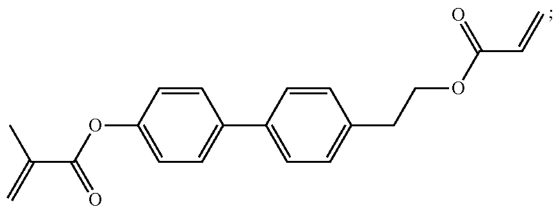
II-12
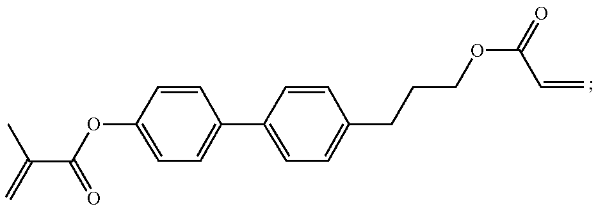
II-13
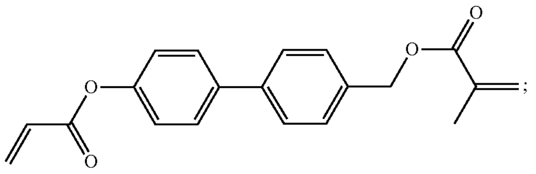
II-14
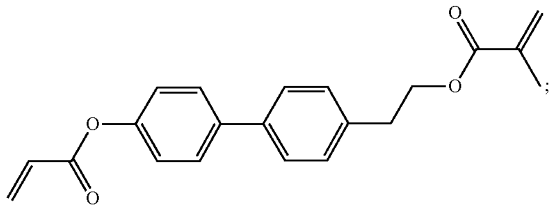

-continued
II-15
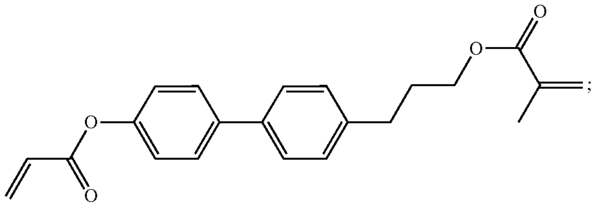
II-16
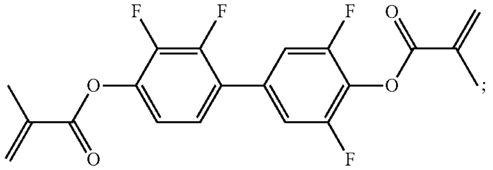
II-17
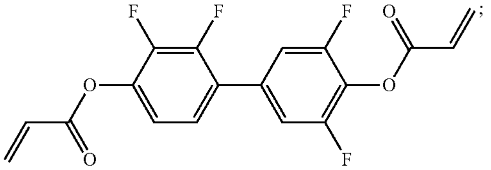
II-18
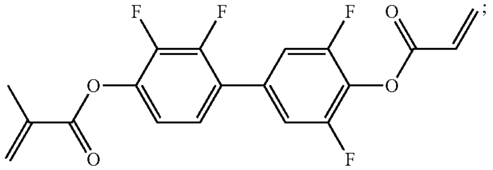
II-19
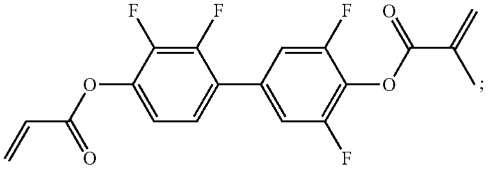
II-20
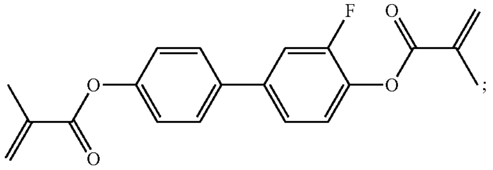
II-21
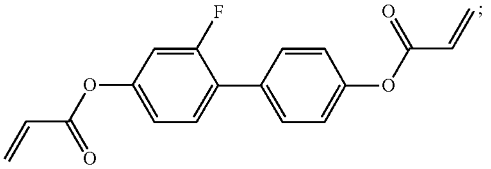
II-21′
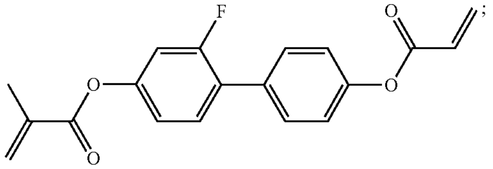
II-22
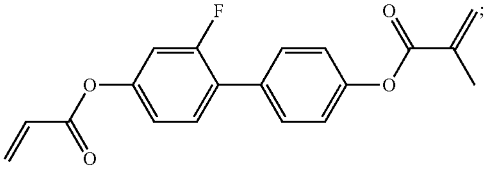
II-23
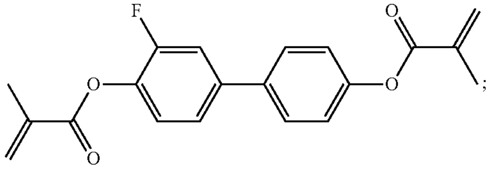
II-24
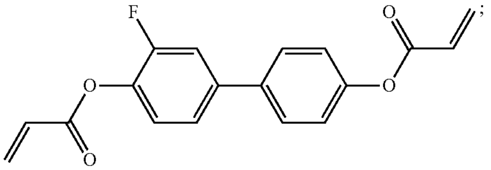
II-25
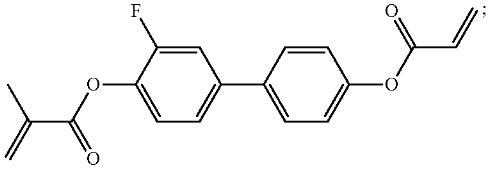
II-26
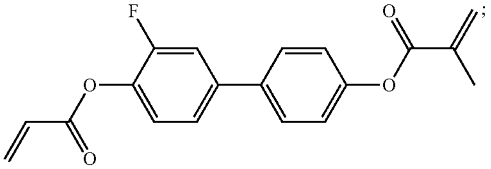
II-27
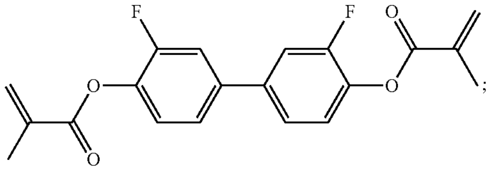
II-28
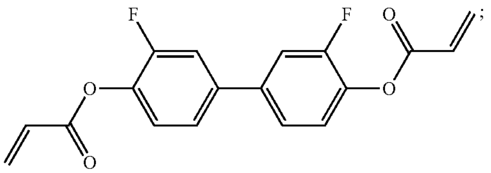

-continued
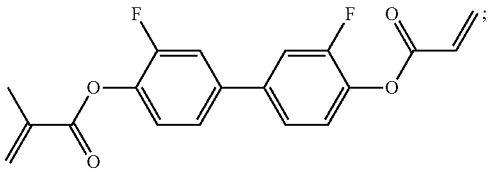
II-29
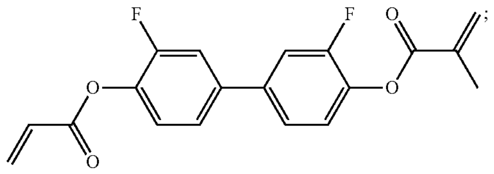
II-30
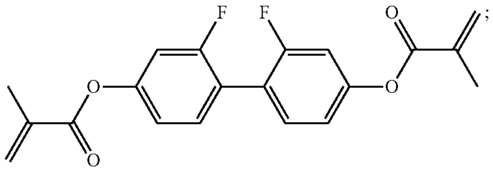
II-31
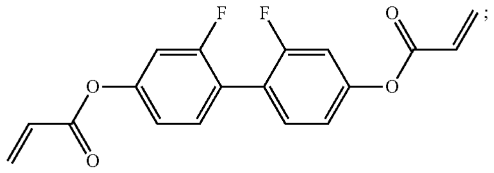
II-32
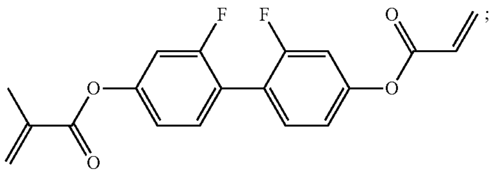
II-33
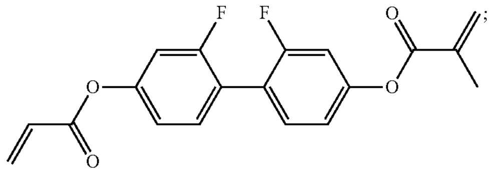
II-34
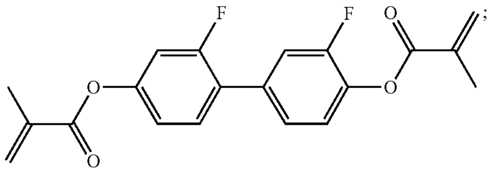
II-35
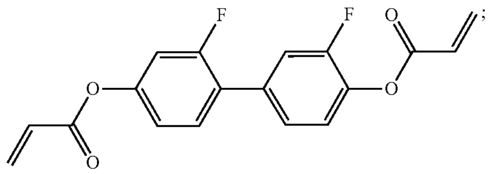
II-36
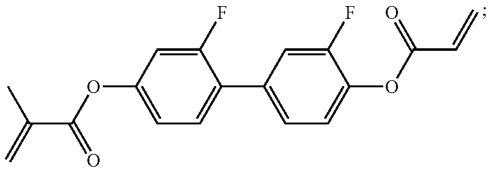
II-37
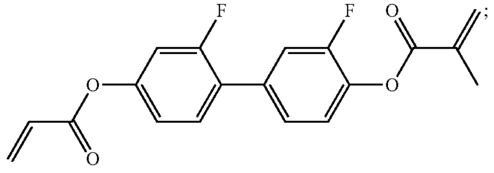
II-38
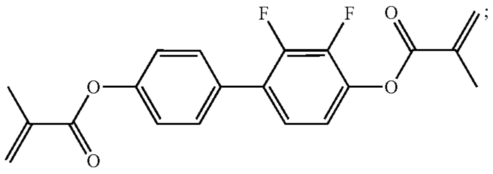
II-39
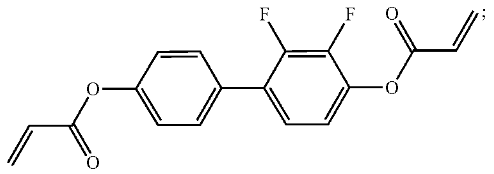
II-40
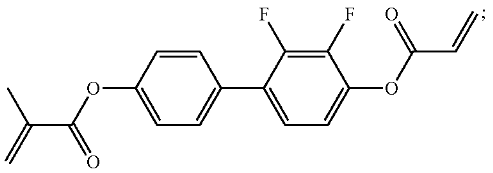
II-41
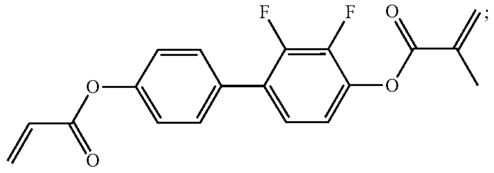
II-42
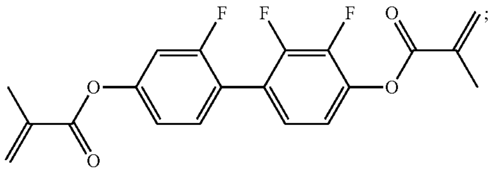
II-43
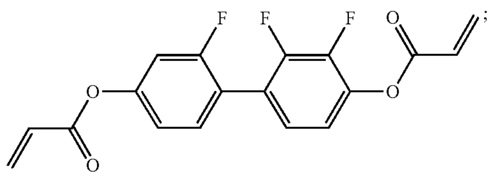
II-44

-continued
II-45
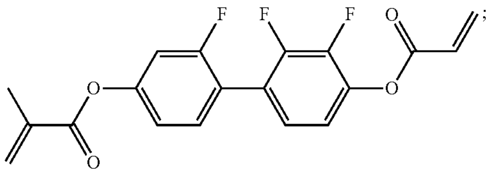
II-46
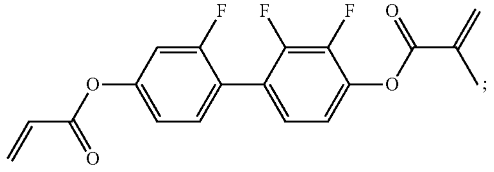
II-47
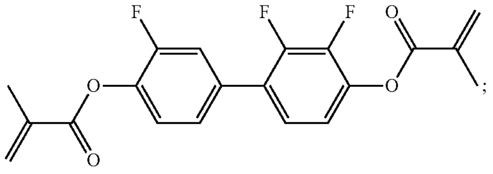
II-48
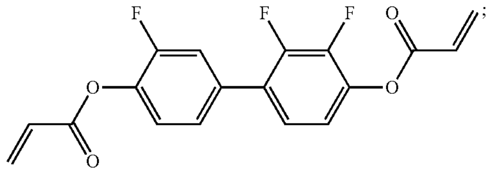
II-49
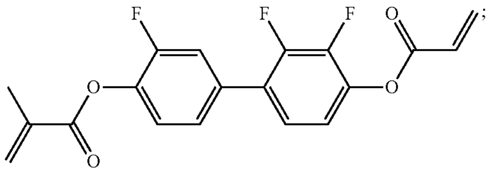
II-50
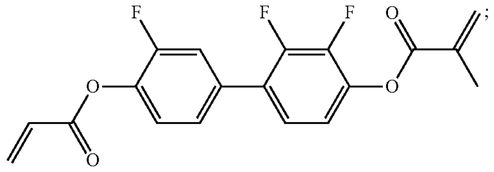
II-51
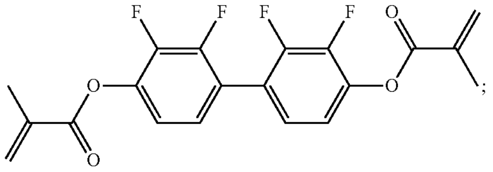
II-52
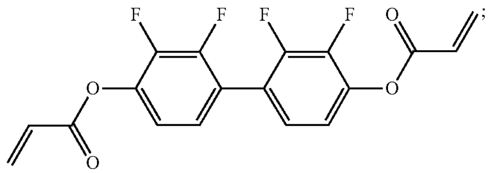
II-53
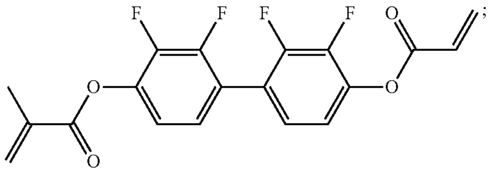
II-54
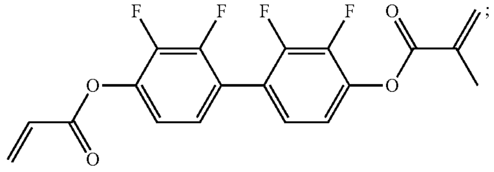
II-55
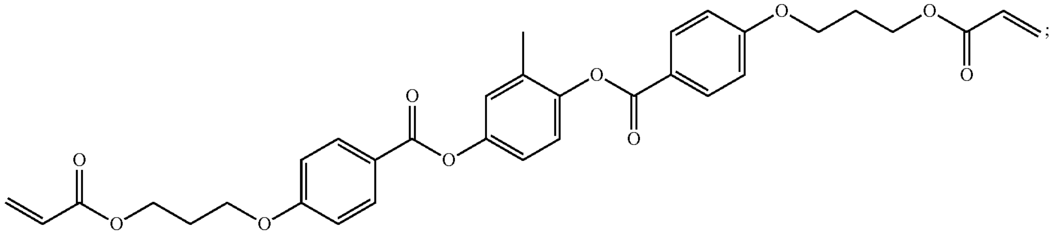
II-56
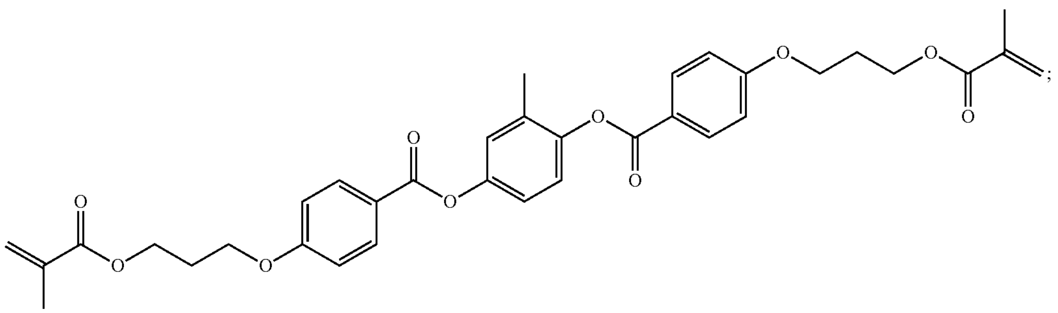

-continued
II-57
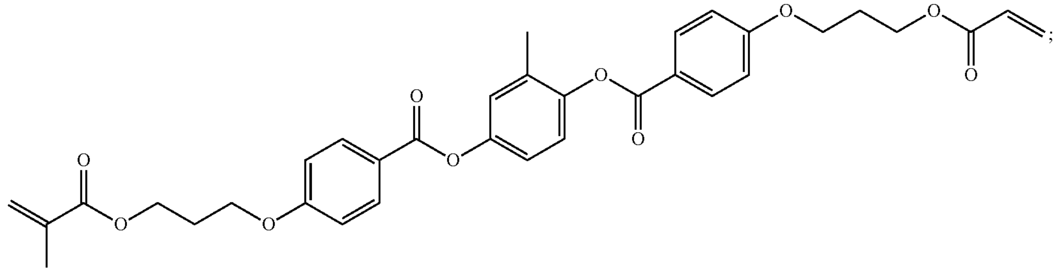
II-58
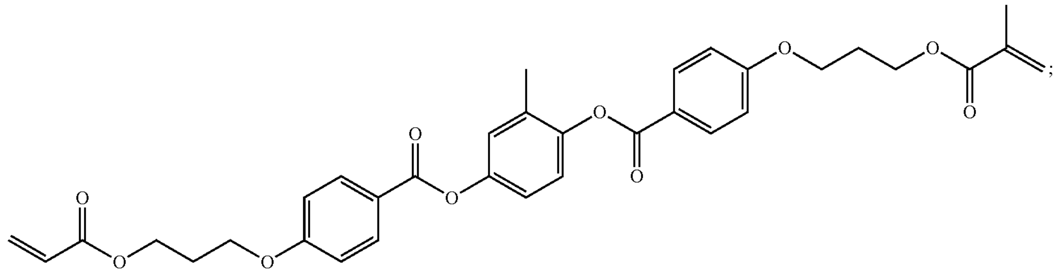
II-59
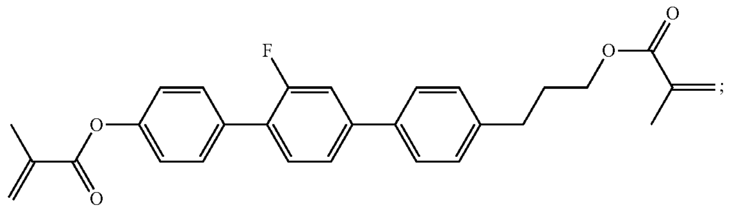
II-60
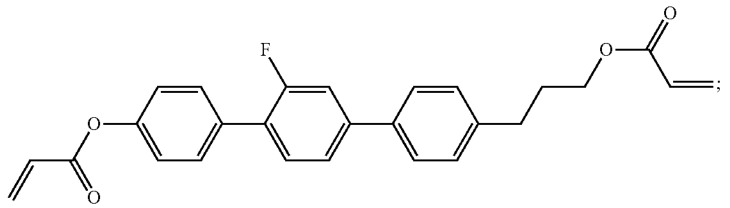
II-61
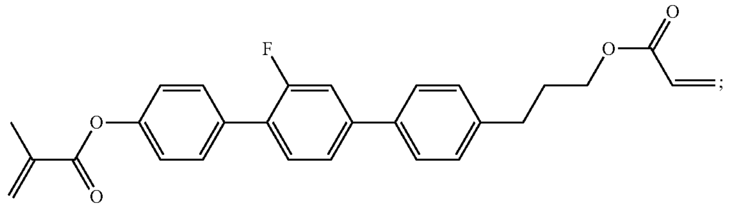
II-62
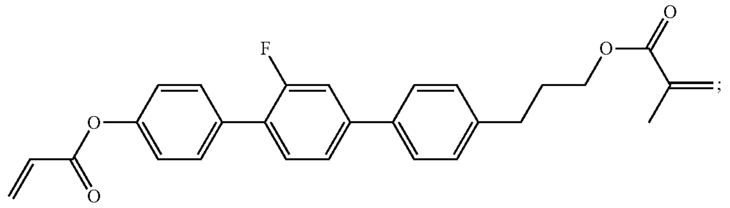
II-63
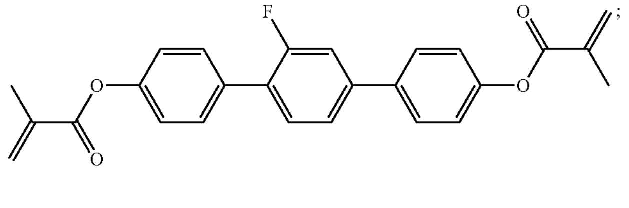

-continued
II-64
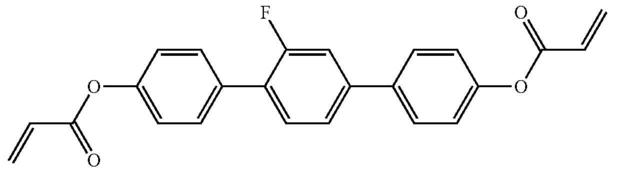
II-65
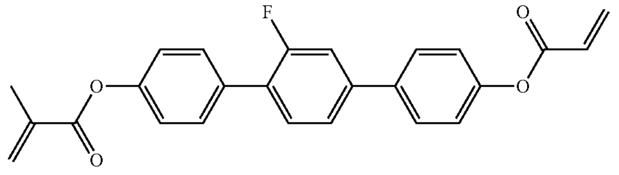
II-66
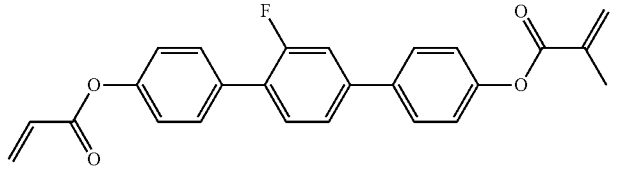
II-67
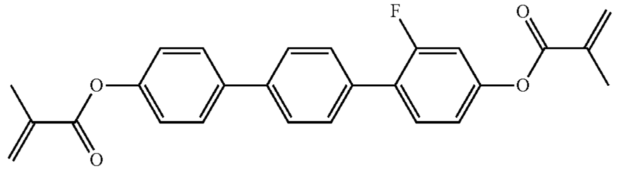
II-68
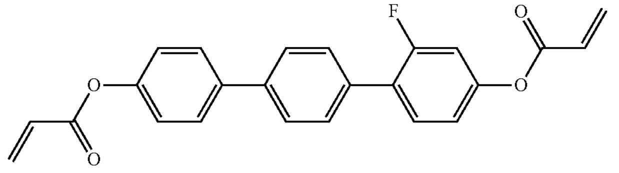
II-69
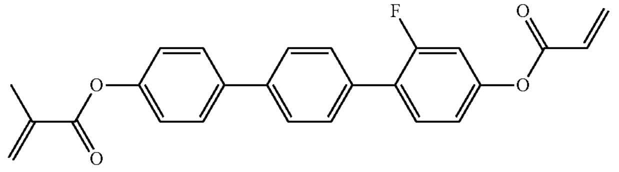
II-70
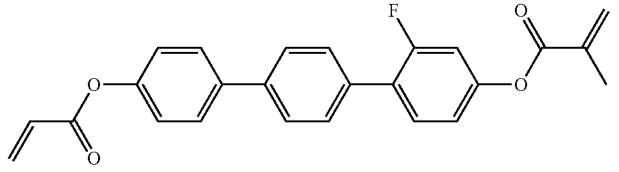
II-71
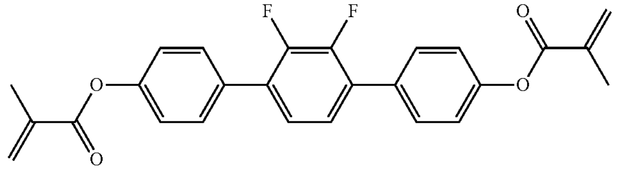

-continued

II-72

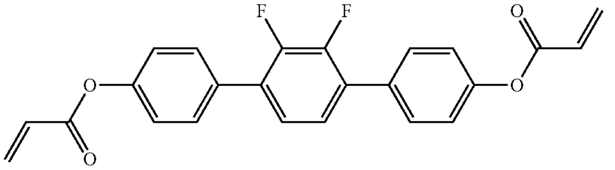

II-73

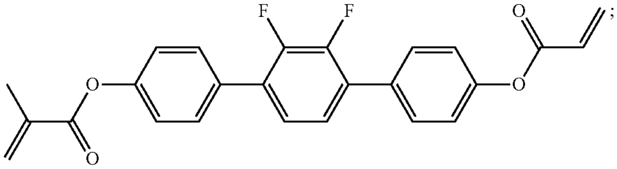

; and

II-74

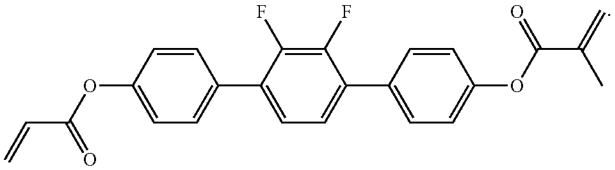

5. The liquid crystal composition according to claim 1, wherein the compound of general formula IV is selected from a group consisting of the following compounds:

IV-1

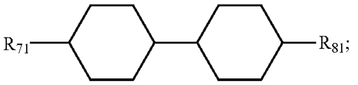

IV-2

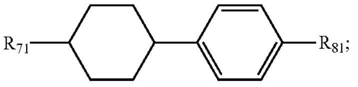

IV-3

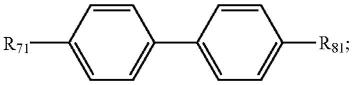

IV-4

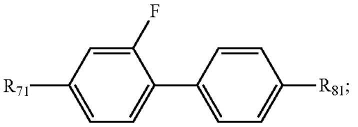

IV-5

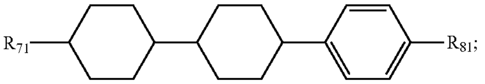

IV-6

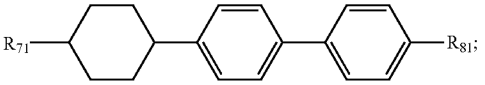

IV-7

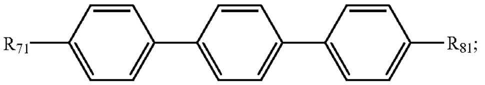

IV-8

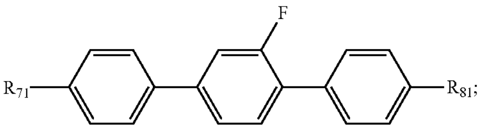

-continued

IV-9

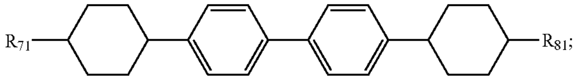

IV-10

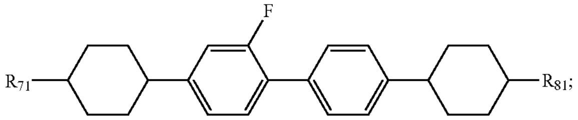

IV-11

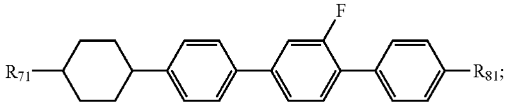

and

IV-12

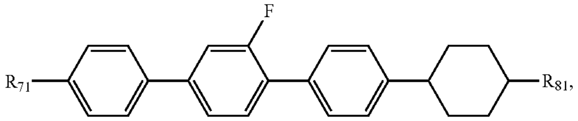

in which, $R_{71}$ and $R_{81}$ each independently represents H, $C_{1-7}$ alkyl or alkoxy, or $C_{2-7}$ alkenyl or alkenoxy.

6. A liquid crystal display device comprising the liquid crystal composition of claim 1.

7. A PSA liquid crystal display device comprising the liquid crystal composition of claim 6.

8. The liquid crystal display device according to claim 6, wherein the composition provides for pretilt angle uniformity and drop mura performance with drop mura not being observable using a light shielding plate having a transmittance of 2% under 48 gray scales.

* * * * *